US012677131B2

(12) United States Patent
Ryu et al.

(10) Patent No.: US 12,677,131 B2
(45) Date of Patent: Jul. 7, 2026

(54) SERVICE AUTHORIZATION

(71) Applicant: Ofinno, LLC, Reston, VA (US)

(72) Inventors: Jinsook Ryu, Oakton, VA (US);
Esmael Hejazi Dinan, McLean, VA
(US); Kyungmin Park, Vienna, VA
(US); Peyman Talebi Fard, Vienna, VA
(US); Taehun Kim, Fairfax, VA (US);
Weihua Qiao, Herndon, VA (US)

(73) Assignee: Ofinno, LLC, Reston, VA (US)

( * ) Notice: Subject to any disclaimer, the term of this
patent is extended or adjusted under 35
U.S.C. 154(b) by 365 days.

(21) Appl. No.: 18/105,115

(22) Filed: Feb. 2, 2023

(65) Prior Publication Data

US 2023/0232204 A1 Jul. 20, 2023

Related U.S. Application Data

(63) Continuation of application No.
PCT/US2021/044757, filed on Aug. 5, 2021.
(Continued)

(51) Int. Cl.
*H04W 8/18* (2009.01)
*H04W 28/02* (2009.01)
*H04W 64/00* (2009.01)

(52) U.S. Cl.
CPC ......... *H04W 8/18* (2013.01); *H04W 28/0236*
(2013.01); *H04W 64/006* (2013.01)

(58) Field of Classification Search
CPC ......... H04W 8/00; H04W 8/18; H04W 28/00;
H04W 28/02; H04W 28/0231;
(Continued)

(56) References Cited

U.S. PATENT DOCUMENTS

2014/0317300 A1* 10/2014 Ludwig ................. H04W 76/34
709/226
2016/0050125 A1* 2/2016 Mattson .................. H04L 47/80
709/225
(Continued)

FOREIGN PATENT DOCUMENTS

CN 110402604 A 11/2019
KR 2019-0101923 A 9/2019
(Continued)

OTHER PUBLICATIONS

3GPP TS 22.125 V17.1.0 (Dec. 2019); Technical Specification; 3rd
Generation Partnership Project; Technical Specification Group Ser-
vices and System Aspects; Unmanned Aerial System (UAS) support
in 3GPP; Stage 1; Release 17.
(Continued)

*Primary Examiner* — Warner Wong
(74) *Attorney, Agent, or Firm* — John F. Sun; Kavon
Nasabzadeh; Jacob L. Mangan

(57) ABSTRACT

A control plane function receives subscription information
indicating that a wireless device subscribes to a service. The
control plane function receives, from an authorization
server, an authorization for the service of the wireless
device. The control plane function sends, to a base station,
one or more messages indicating an activation of one or
more radio access network functions related to the service of
the wireless device, based on the subscription information
indicating that the wireless device subscribes to the service
and the service being authorized.

20 Claims, 28 Drawing Sheets

Related U.S. Application Data

(60) Provisional application No. 63/061,754, filed on Aug. 5, 2020.

(58) Field of Classification Search
CPC ............. H04W 28/0236; H04W 64/00; H04W 64/006; H04W 4/00; H04W 76/00; H04W 76/10; H04L 41/50; H04L 65/00; H04L 65/40; H04L 67/00; H04L 67/50; H04L 47/70
See application file for complete search history.

(56) References Cited

U.S. PATENT DOCUMENTS

| | | | |
|---|---|---|---|
| 2018/0063564 A1 | 3/2018 | Phatak | |
| 2019/0335392 A1 | 10/2019 | Qiao et al. | |
| 2020/0007825 A1 | 1/2020 | Jeong et al. | |
| 2020/0120563 A1 | 4/2020 | Takacs et al. | |
| 2020/0192348 A1 | 6/2020 | Koziol et al. | |
| 2020/0214054 A1* | 7/2020 | Qiao | H04M 15/8228 |
| 2021/0206488 A1 | 7/2021 | Yi et al. | |
| 2021/0243602 A1 | 8/2021 | Hong | |
| 2022/0095111 A1* | 3/2022 | Fu | H04W 36/0011 |

FOREIGN PATENT DOCUMENTS

| | | |
|---|---|---|
| WO | 2018/189576 A1 | 10/2018 |
| WO | 2019/079286 A1 | 4/2019 |
| WO | 2019/148317 A1 | 8/2019 |
| WO | 2019/193469 A1 | 10/2019 |
| WO | 2019/218114 A1 | 11/2019 |

OTHER PUBLICATIONS

3GPP TR 22.825 V16.0.0 (Sep. 2018); Technical Report; 3rd Generation Partnership Project; Technical Specification Group Services and System Aspects; Remote Identification of Unmanned Aerial Systems; Stage 1; (Release 16).

3GPP TR 22.829 V17.1.0 (Sep. 2019); Technical Report; 3rd Generation Partnership Project; Technical Specification Group Services and System Aspects; Enhancement for Unmanned Aerial Vehicles; Stage 1; (Release 17).

3GPP TS 23.273 V16.3.0 (Mar. 2020); Technical Specification; 3rd Generation Partnership Project; Technical Specification Group Services and System Aspects; 5G System (5GS) Location Services (LCS); Stage 2; (Release 16).

3GPP TS 23.287 V16.3.0 (Jul. 2020); Technical Specification; 3rd Generation Partnership Project; Technical Specification Group Services and System Aspects; Architecture enhancements for 5G System (5GS) to support Vehicle-to-Everything (V2X) services; (Release 16).

3GPP TS 23.401 V16.6.0 (Mar. 2020); Technical Specification; 3rd Generation Partnership Project; Technical Specification Group Services and System Aspects; General Packet Radio Service (GPRS) enhancements for Evolved Universal Terrestrial Radio Access Network (E-UTRAN) access; (Release 16).

3GPP TS 23.501 V16.5.0 (Jul. 2020); Technical Specification; 3rd Generation Partnership Project; Technical Specification Group Services and System Aspects; System architecture for the 5G System (5GS); Stage 2; (Release 16).

3GPP TS 23.502 V16.5.0 (Jul. 2020); Technical Specification; 3rd Generation Partnership Project; Technical Specification Group Services and System Aspects; Procedures for the 5G System (5GS); Stage 2; (Release 16).

3GPP TR 23.754 V0.1.0 (Jan. 2020); Technical Report; 3rd Generation Partnership Project; Technical Specification Group Services and System Aspects; Study on supporting Unmanned Aerial Systems (UAS) connectivity, Identification and tracking; (Release 17).

3GPP TS 24.501 V15.6.0 (Dec. 2019); Technical Specification; 3rd Generation Partnership Project; Technical Specification Group Core Network and Terminals; Non-Access-Stratum (NAS) protocol for 5G System (5GS); Stage 3; (Release 15).

3GPP TS 36.300 V16.1.0 (Mar. 2020); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; (Release 16).

3GPP TS 36.331 V16.0.0 (Mar. 2020); Technical Specification; 3rd Generation Partnership Project; Technical Specification Group Radio Access Network; Evolved Universal Terrestrial Radio Access (E-UTRA); Radio Resource Control (RRC); Protocol specification; (Release 16).

3GPP TS 36.413 V15.6.0 (Jul. 2019); Technical Specification; 3rd Generation Partnership Project; Technical Specification Group Radio Access Network; Evolved Universal Terrestrial Radio Access Network (E-UTRAN); S1 Application Protocol (S1AP); (Release 15).

3GPP TR 36.777 V15.0.0 (Dec. 2017); Technical Report; 3rd Generation Partnership Project; Technical Specification Group Radio Access Network; Study on Enhanced LTE Support for Aerial Vehicles; (Release 15).

3GPP TS 38.413 V15.4.0 (Jul. 2019); Technical Specification; 3rd Generation Partnership Project; Technical Specification Group Radio Access Network; NG-RAN; NG Application Protocol (NGAP); (Release 15).

3GPP TR 23.754 V0.1.1 (Jan. 2020); Technical Report; 3rd Generation Partnership Project; Technical Specification Group Services and System Aspects; Study on supporting Unmanned Aerial Systems (UAS) connectivity, Identification and tracking; (Release 17).

Lin et al.; The Sky Is Not the Limit: LTE for Unmanned Aerial Vehicles; IEEE Communications Magazine; vol. 56; No. 4; pp. 204-210; Apr. 2018.

International Search Report and Written Opinion of the International Searching authority mailed Nov. 19, 2021, in International Application No. PCT/US2021/044757.

3GPP TR 23.754 V0.2.0 (Jun. 2020); Technical Report; 3rd Generation Partnership Project; Technical Specification Group Services and System Aspects; Study on supporting Unmanned Aerial Systems (UAS) connectivity, Identification and tracking; (Release 17).

3GPP TS 36.331 V16.1.1 (Jul. 2020); Technical Specification; 3rd Generation Partnership Project; Technical Specification Group Radio Access Network; Evolved Universal Terrestrial Radio Access (E-UTRA); Radio Resource Control (RRC); Protocol specification; (Release 16).

Office Action dated Jul. 11, 2025 in corresponding Chinese Application No. 2021800677509.

* cited by examiner

RM State Transition in UE

RM State Transition in AMF

CM State Transition in UE

CM State Transition in AMF

RRC State Transition

Interfering cells

Serving cell

| Subscription Data Types | Data Key | Data Sub Key |
|---|---|---|
| Access and mobility subscription data | SUPI | Serving PLMN ID and optionally NID |
| SMF selection subscription data | SUPI | Serving PLMN ID and optionally NID |
| UE context in SMF data | SUPI | S-NSSAI |
| SMS management subscription data | SUPI | Serving PLMN ID and optionally NID |
| Aerial UE subscription data | SUPI | Serving PLMN ID and optionally NID |

UE Subscription data types and required keys

FIG. 22

| Subscription Data Types | Field | Field |
|---|---|---|
| Access and mobility subscription data (data needed for UE registration and mobility management) | GPSI List | List of GPSI used both inside and outside of the 3GPP system to address a 3GPP subscription |
| | Subscribed-UE-AMBR | The maximum aggregated uplink and downlink MBRs to be shard across all non-GBR QoS flows according to the subscription of the user |
| | Subscribed S-NSSAIs | The network slices that the UE subscribes to. |
| | .... | .... |
| Aerial UE subscription data | Aerial UE allowed | Indicates that the subscriber is allowed for Aerial UE operation (UAV, UAV Controller) |
| | Aerial UE subject to authentication and authorization (AA) | Indicate whether the subscriber is subject to the AA or not. |

UE subscription data types

FIG. 23 receive, by a AMF from a UDM, subscription information indicating that a wireless device subscribes an unmanned aerial service receive, from an UTM, one or more first messages indicating a flight authorization for the unmanned aerial service;

Figure 27:
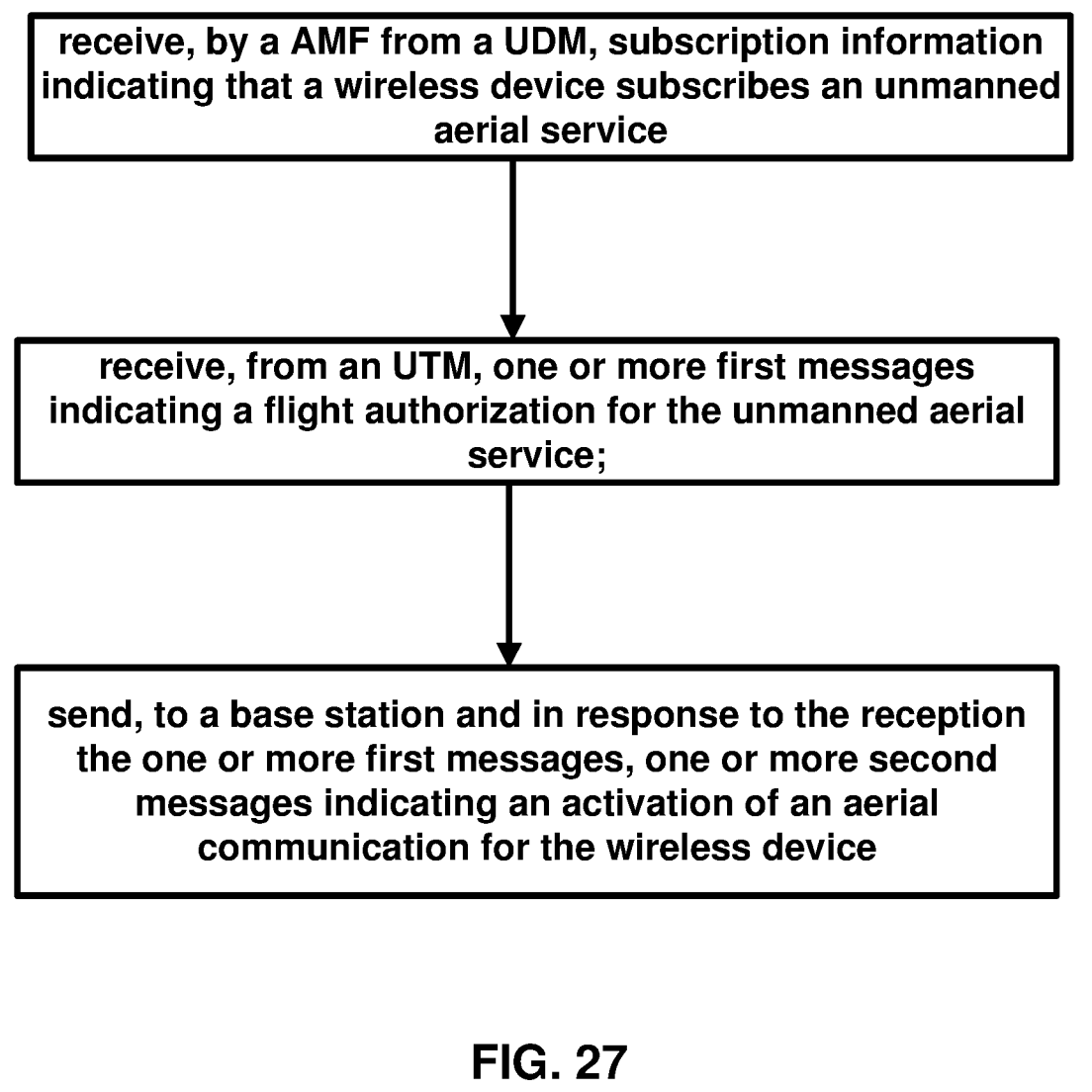

send, to a base station and in response to the reception the one or more first messages, one or more second messages indicating an activation of an aerial communication for the wireless device

FIG. 27 send, by a AMF to a UDM, one or more fist messages requesting subscription information of a wireless device

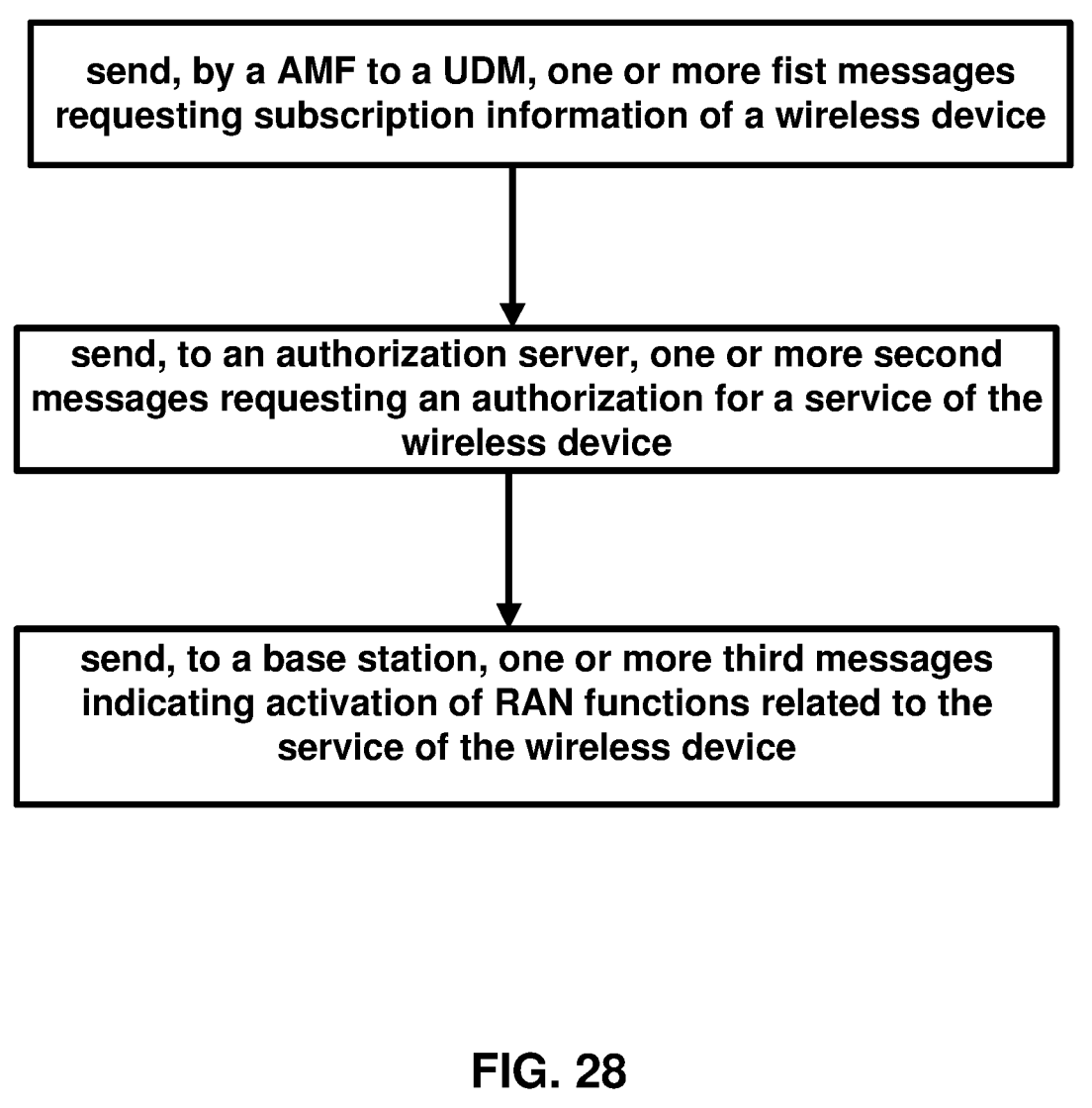

↓ send, to an authorization server, one or more second messages requesting an authorization for a service of the wireless device

↓ send, to a base station, one or more third messages indicating activation of RAN functions related to the service of the wireless device

FIG. 28

SERVICE AUTHORIZATION

CROSS-REFERENCE TO RELATED APPLICATIONS

This application is a continuation of International Application No. PCT/US2021/044757, filed Aug. 5, 2021, which claims the benefit of U.S. Provisional Application No. 63/061,754, filed Aug. 5, 2020, all of which are hereby incorporated by reference in their entireties.

BRIEF DESCRIPTION OF THE SEVERAL VIEWS OF THE DRAWINGS

Examples of several of the various embodiments of the present invention are described herein with reference to the drawings.

FIG. 22 illustrates an example user equipment (UE) subscription data types and required keys.

FIG. 23 illustrates an example subscription information corresponding to an access and mobility subscription data and an UE subscription data in accordance with embodiments of the present disclosure.

FIG. 27 illustrates an example flow chart in accordance with embodiments of the present disclosure.

FIG. 28 illustrates an example flow chart in accordance with embodiments of the present disclosure.

DETAILED DESCRIPTION OF EXAMPLES

Example embodiments of the present invention enable implementation of enhanced features and functionalities in 4G/5G systems. Embodiments of the technology disclosed herein may be employed in the technical field of 4G/5G systems and network slicing for communication systems. More particularly, the embodiments of the technology disclosed herein may relate to 5G core network and 5G systems for network slicing in communication systems. Throughout the present disclosure, UE, wireless device, and mobile device are used interchangeably.

The following acronyms are used throughout the present disclosure:

3GPP 3'rd generation partnership project
5G 5th generation mobile networks
5GC 5G Core Network
5GS 5G System
5G-AN 5G Access Network
5QI 5G QoS Indicator
ACK Acknowledgement
AF Application Function
AMF Access and Mobility Management Function
AN Access Network
CDR Charging Data Record
CCNF Common Control Network Functions
CIoT Cellular IoT
CN Core Network
CP Control Plane
DDN Downlink Data Notification
DL Downlink
DN Data Network
DNN Data Network Name
DRX Discontinuous Reception
F-TEID Fully Qualified TEID
gNB next generation Node B
GPSI Generic Public Subscription Identifier
GTP GPRS Tunneling Protocol
GUTI Globally Unique Temporary Identifier
HPLMN Home Public Land Mobile Network
IMSI International Mobile Subscriber Identity
LADN Local Area Data Network
LI Lawful Intercept
MEI Mobile Equipment Identifier
MICO Mobile Initiated Connection Only

US 12,677,131 B2

3

Figure 1:
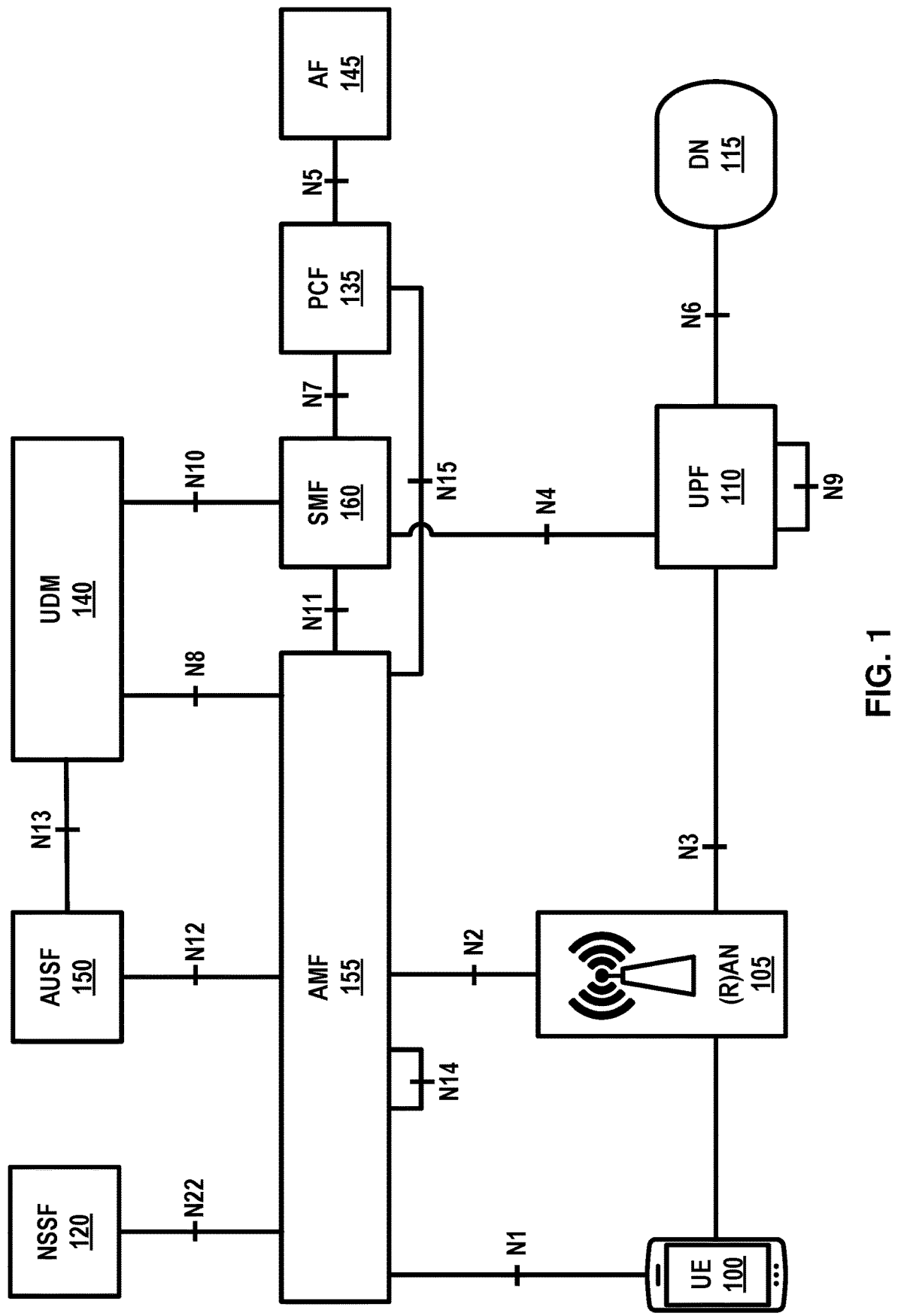
FIG. 1 is a diagram of an example 5G system architecture as per an aspect of an embodiment of the present disclosure.
Figure 2:
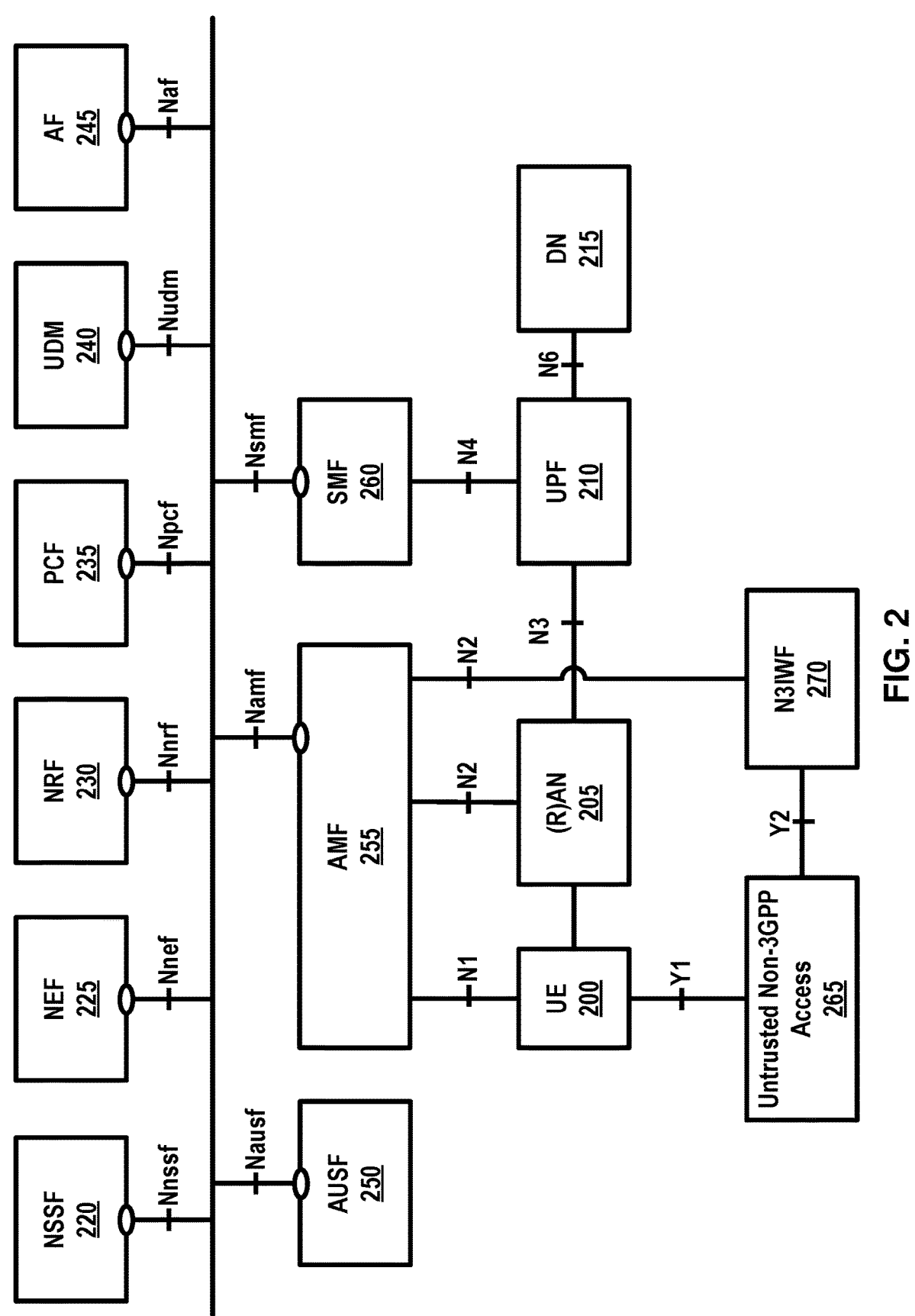
FIG. 2 is a diagram of an example 5G System architecture as per an aspect of an embodiment of the present disclosure.

MME Mobility Management Entity
MO Mobile Originated
MSISDN Mobile Subscriber ISDN
MT Mobile Terminating
N3IWF Non-3GPP InterWorking Function
NAI Network Access Identifier
NAS Non-Access Stratum
NAS-MM Non-Access Stratum mobility management
NAS-SM Non-Access Stratum session management
NB-IoT Narrow Band IoT
NEF Network Exposure Function
NF Network Function
NGAP Next Generation Application Protocol
NR New Radio
NRF Network Repository Function
NSI Network Slice Instance
NSSAI Network Slice Selection Assistance Information
NSSF Network Slice Selection Function
OCS Online Charging System
OFCS Offline Charging System
PCF Policy Control Function
PDU Packet/Protocol Data Unit
PEI Permanent Equipment Identifier
PLMN Public Land Mobile Network
PRACH Physical Random Access CHannel
PLMN Public Land Mobile Network
PSA PDU Session Anchor
RAN Radio Access Network
QFI QoS Flow Identity
RM Registration Management
S 1-AP S1 Application Protocol
SBA Service Based Architecture
SEA Security Anchor Function
SCM Security Context Management
SI System Information
SIB System Information Block
SMF Session Management Function
SMSF SMS Function
S-NSSAI Single Network Slice Selection Assistance
    information
SSC Session and Service Continuity
SUCI Served User Correlation ID
SUPI Subscriber Permanent Identifier
TEID Tunnel Endpoint Identifier
UAS Unmanned Aerial System and/or Uncrewed Aerial
    System
UAV Unmanned Aerial Vehicle and/or Uncrewed Aerial
    Vehicle
UAVC UAV controller
UDM Unified Data Management
UER Unified Data Repository
UDR User Data Repository
UE User Equipment
UL Uplink
UL CL Uplink Classifier
UPF User Plane Function
USS UAS service supplier
UTM UAS traffic management
UPF User Plane Function
VPLMN Visited Public Land Mobile Network
    Example FIG. 1 and FIG. 2 depict a 5G system comprising of access networks and 5G core network. An example 5G access network may comprise an access network connecting to a 5G core network. An access network may comprise an NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces may be employed for communication among the functional elements and/or network elements.

Figure 3:
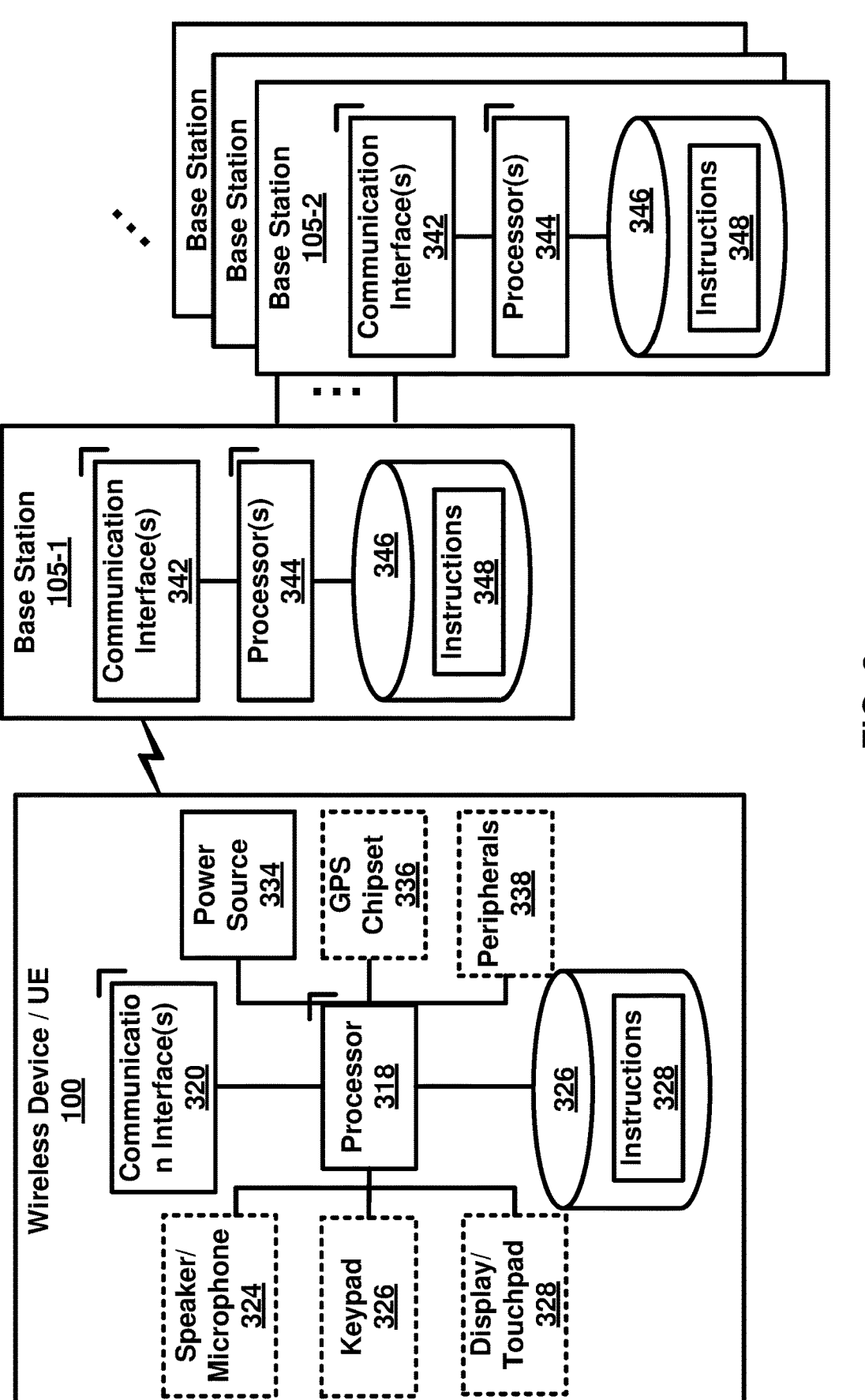
FIG. 3 is a system diagram of an example wireless device and a network node in a 5G system as per an aspect of an embodiment of the present disclosure.
Figure 4:
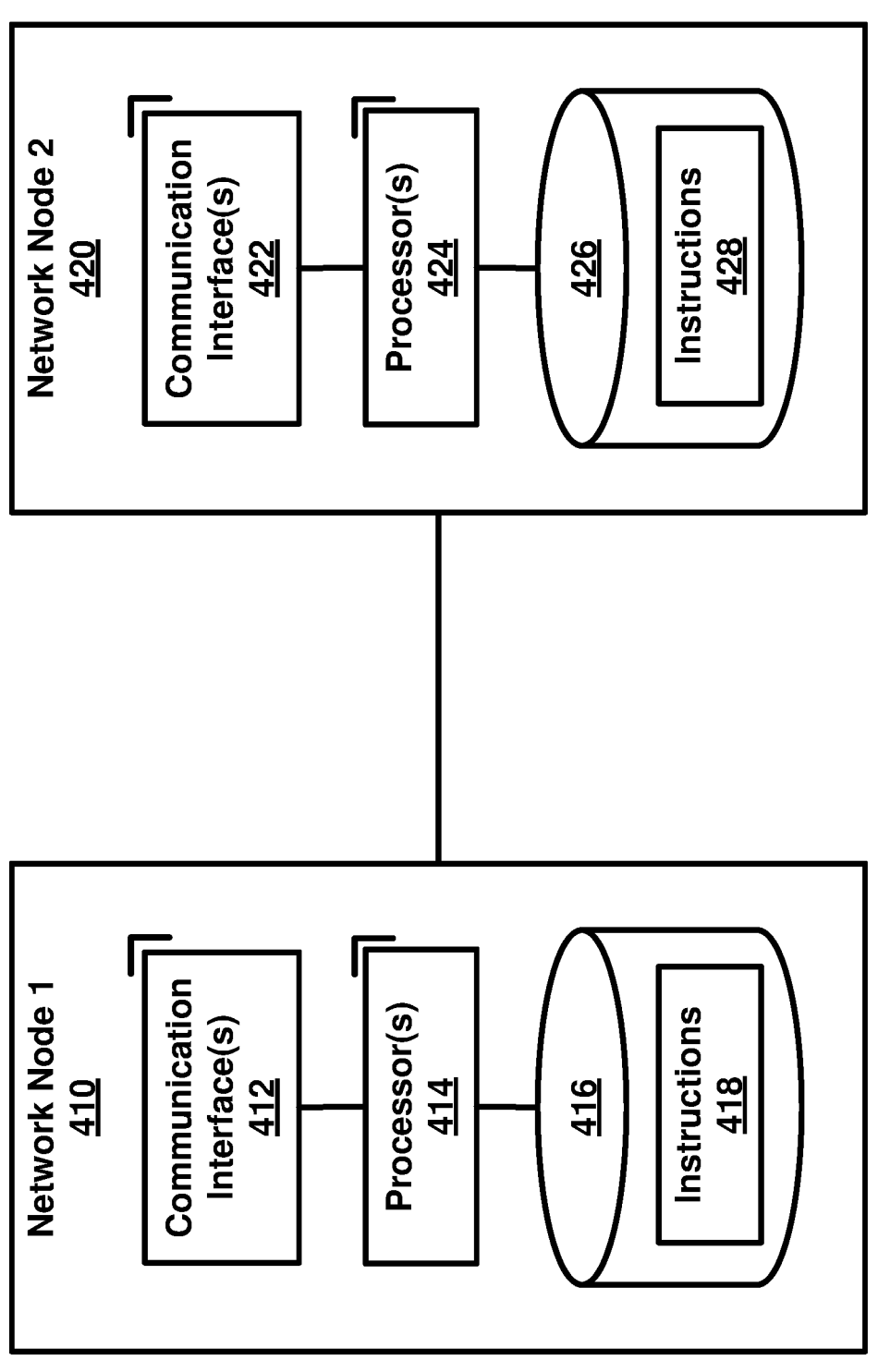
FIG. 4 is a system diagram of an example wireless device as per an aspect of an embodiment of the present disclosure.

In an example, a network function may be a processing function in a network, which may have a functional behavior and/or interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

In an example, access and mobility management function, AMF 155, may include the following functionalities (some of the AMF 155 functionalities may be supported in a single instance of an AMF 155): termination of RAN 105 CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys, and/or the like.

In an example, the AMF 155 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP access 105 and non-3GPP access 165 simultaneously, support of a coordinated RM context valid over 3GPP access 105 and non 3GPP access 165, support of CM management contexts for the UE 100 for connectivity over non-3GPP access, and/or the like.

In an example, an AMF 155 region may comprise one or multiple AMF 155 sets. The AMF 155 set may comprise some AMF 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that may be provisioned in a UE 100. DN 115 access identifier (DNAI), for a DNN, may be an identifier of a user plane access to a DN 115. Initial registration may be related to a UE 100 registration in RM-DEREGISTERED 500, 520 states. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

In an example, session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115, and/or the like.

In an example, a user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, downlink data notification triggering, and/or the like.

In an example, the UE 100 IP address management may include allocation and release of the UE 100 IP address and/or renewal of the allocated IP address. The UE 100 may set a requested PDU type during a PDU session establishment procedure based on its IP stack capabilities and/or configuration. In an example, the SMF 160 may select PDU type of a PDU session. In an example, if the SMF 160 receives a request with PDU type set to IP, the SMF 160 may select PDU type IPv4 or IPv6 based on DNN configuration and/or operator policies. In an example, the SMF 160 may provide a cause value to the UE 100 to indicate whether the other IP version is supported on the DNN. In an example, if the SMF 160 receives a request for PDU type IPv4 or IPv6 and the requested IP version is supported by the DNN the SMF 160 may select the requested PDU type.

In an example embodiment, the 5GC elements and UE 100 may support the following mechanisms: during a PDU session establishment procedure, the SMF 160 may send the IP address to the UE 100 via SM NAS signaling. The IPv4 address allocation and/or IPv4 parameter configuration via DHCPv4 may be employed once PDU session may be established. IPv6 prefix allocation may be supported via IPv6 stateless autoconfiguration, if IPv6 is supported. In an example, 5GC network elements may support IPv6 parameter configuration via stateless DHCPv6.

The 5GC may support the allocation of a static IPv4 address and/or a static IPv6 prefix based on subscription information in a UDM 140 and/or based on the configuration on a per-subscriber, per-DNN basis.

User plane function(s) (UPF 110) may handle the user plane path of PDU sessions. A UPF 110 that provides the interface to a data network may support functionality of a PDU session anchor.

In an example, a policy control function, PCF 135, may support unified policy framework to govern network behavior, provide policy rules to control plane function(s) to enforce policy rules, implement a front end to access subscription information relevant for policy decisions in a user data repository (UDR), and/or the like.

A network exposure function, NEF 125, may provide means to securely expose the services and capabilities provided by the 3GPP network functions, translate between information exchanged with the AF 145 and information exchanged with the internal network functions, receive information from other network functions, and/or the like.

In an example, a network repository function, NRF 130 may support service discovery function that may receive NF discovery request from NF instance, provide information about the discovered NF instances (be discovered) to the NF instance, and maintain information about available NF instances and their supported services, and/or the like.

In an example, an NSSF 120 may select a set of network slice instances serving the UE 100, may determine allowed NSSAI. In an example, the NSSF 120 may determine the AMF 155 set to be employed to serve the UE 100, and/or, based on configuration, determine a list of candidate AMF 155(s) 155 by querying the NRF 130.

In an example, stored data in a UDR may include at least user subscription data, including at least subscription identifiers, security credentials, access and mobility related subscription data, session related subscription data, policy data, and/or the like.

In an example, an AUSF 150 may support authentication server function (AUSF 150).

In an example, an application function (AF), AF 145, may interact with the 3GPP core network to provide services. In an example, based on operator deployment, application functions may be trusted by the operator to interact directly with relevant network functions. Application functions not allowed by the operator to access directly the network functions may use an external exposure framework (e.g., via the NEF 125) to interact with relevant network functions.

In an example, control plane interface between the (R)AN 105 and the 5G core may support connection of multiple different kinds of AN(s) (e.g. 3GPP RAN 105, N3IWF 170 for Un-trusted access 165) to the 5GC via a control plane protocol. In an example, an N2 AP protocol may be employed for both the 3GPP access 105 and non-3GPP access 165. In an example, control plane interface between the (R)AN 105 and the 5G core may support decoupling between AMF 155 and other functions such as SMF 160 that may need to control the services supported by AN(s) (e.g. control of the UP resources in the AN 105 for a PDU session).

In an example, the 5GC may provide policy information from the PCF 135 to the UE 100. In an example, the policy information may comprise: access network discovery and selection policy, UE 100 route selection policy (URSP), SSC mode selection policy (SSCMSP), network slice selection policy (NSSP), DNN selection policy, non-seamless offload policy, and/or the like.

Figures 5A, 5B:
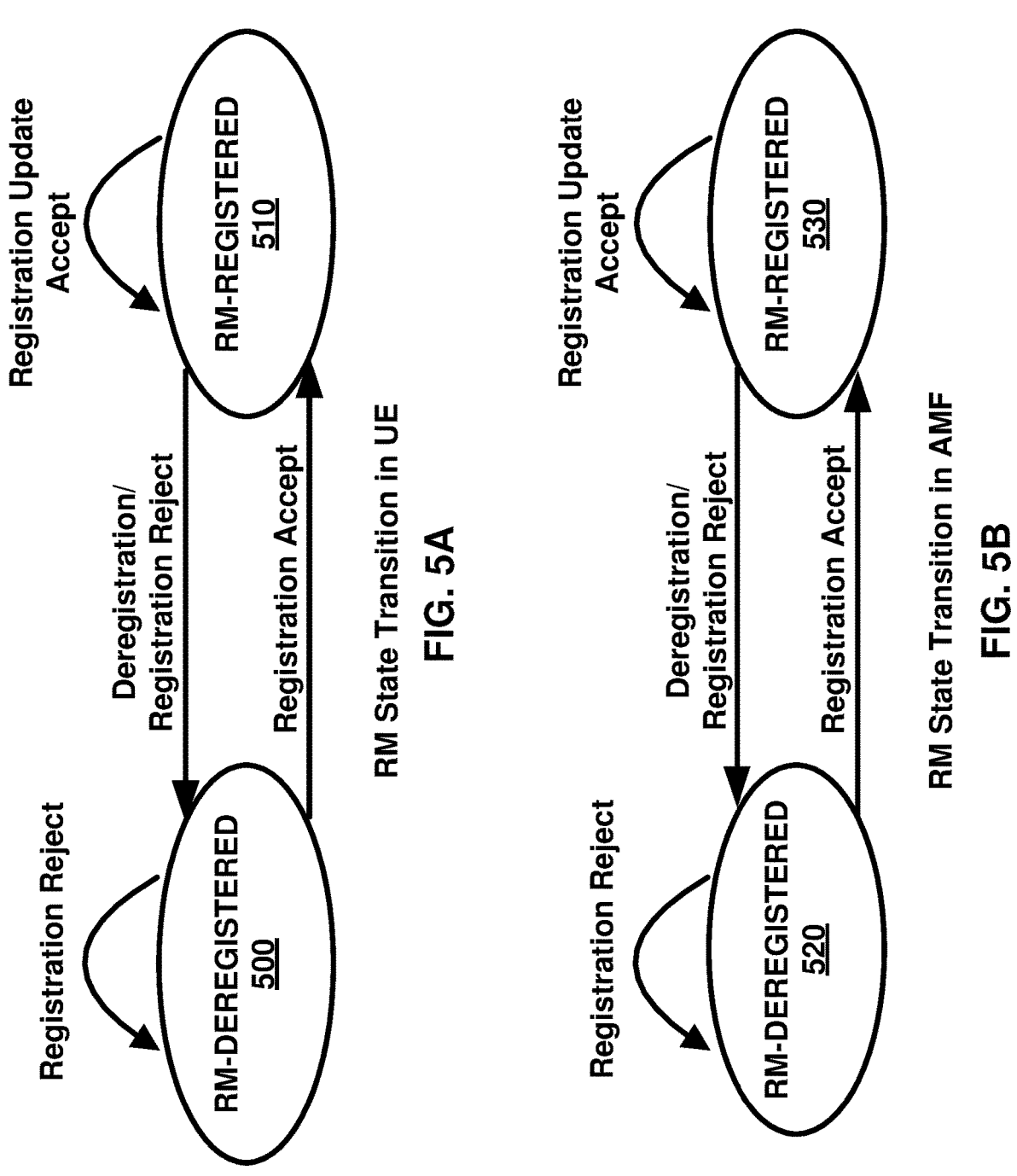
FIG. 5A and FIG. 5B depict two registration management state models in UE 100 and AMF 155 as per an aspect of embodiments of the present disclosure.

In an example, as depicted in example FIG. 5A and FIG. 5B, the registration management, RM may be employed to register or de-register a UE/user 100 with the network and establish the user context in the network. Connection management may be employed to establish and release the signaling connection between the UE 100 and the AMF 155.

In an example, a UE 100 may register with the network to receive services that require registration. In an example, the UE 100 may update its registration with the network periodically in order to remain reachable (periodic registration update), or upon mobility (e.g., mobility registration update), or to update its capabilities or to re-negotiate protocol parameters.

Figure 8:
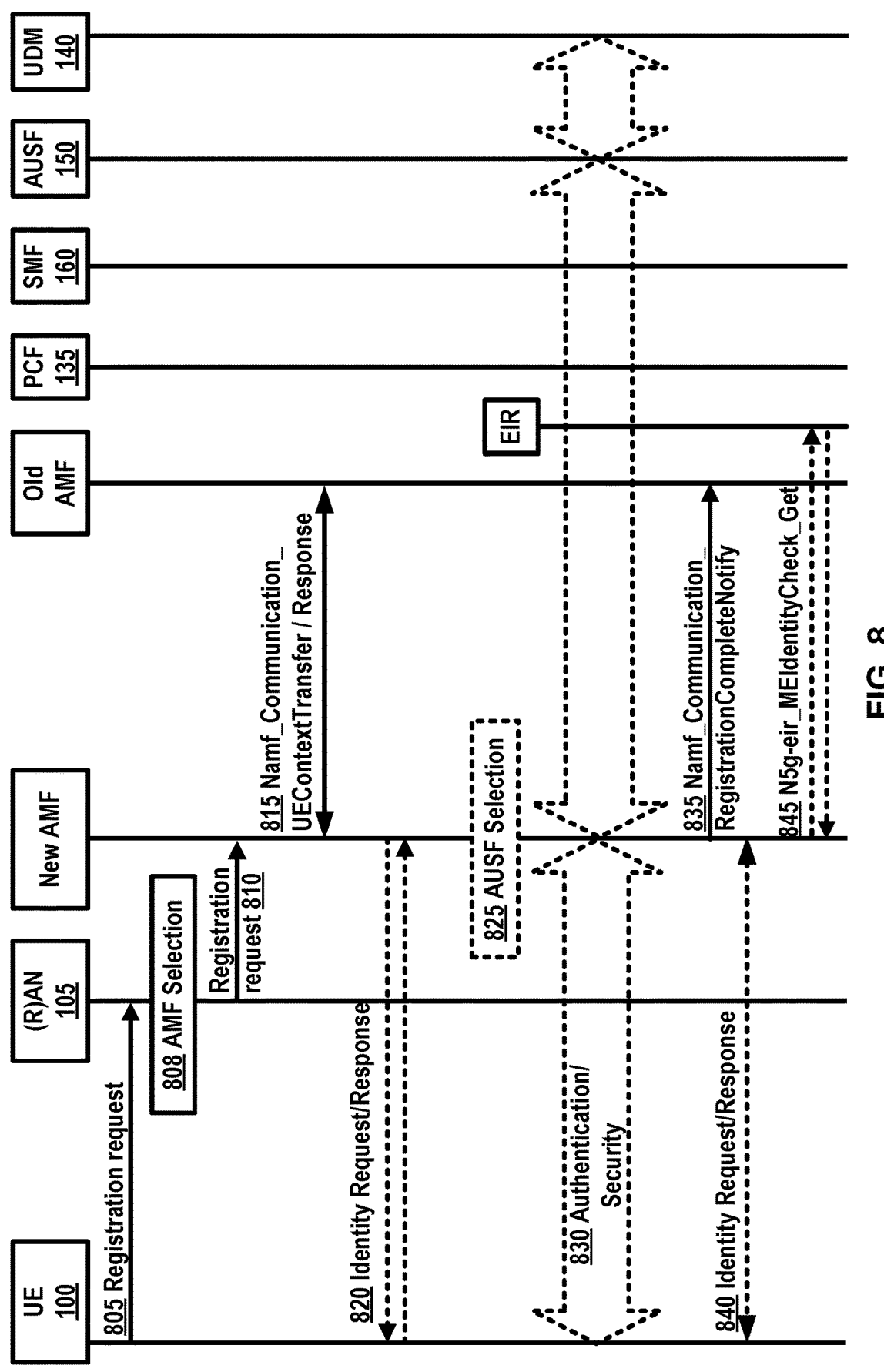
FIG. 8 is an example call flow as per an aspect of an embodiment of the present disclosure.
Figure 9:
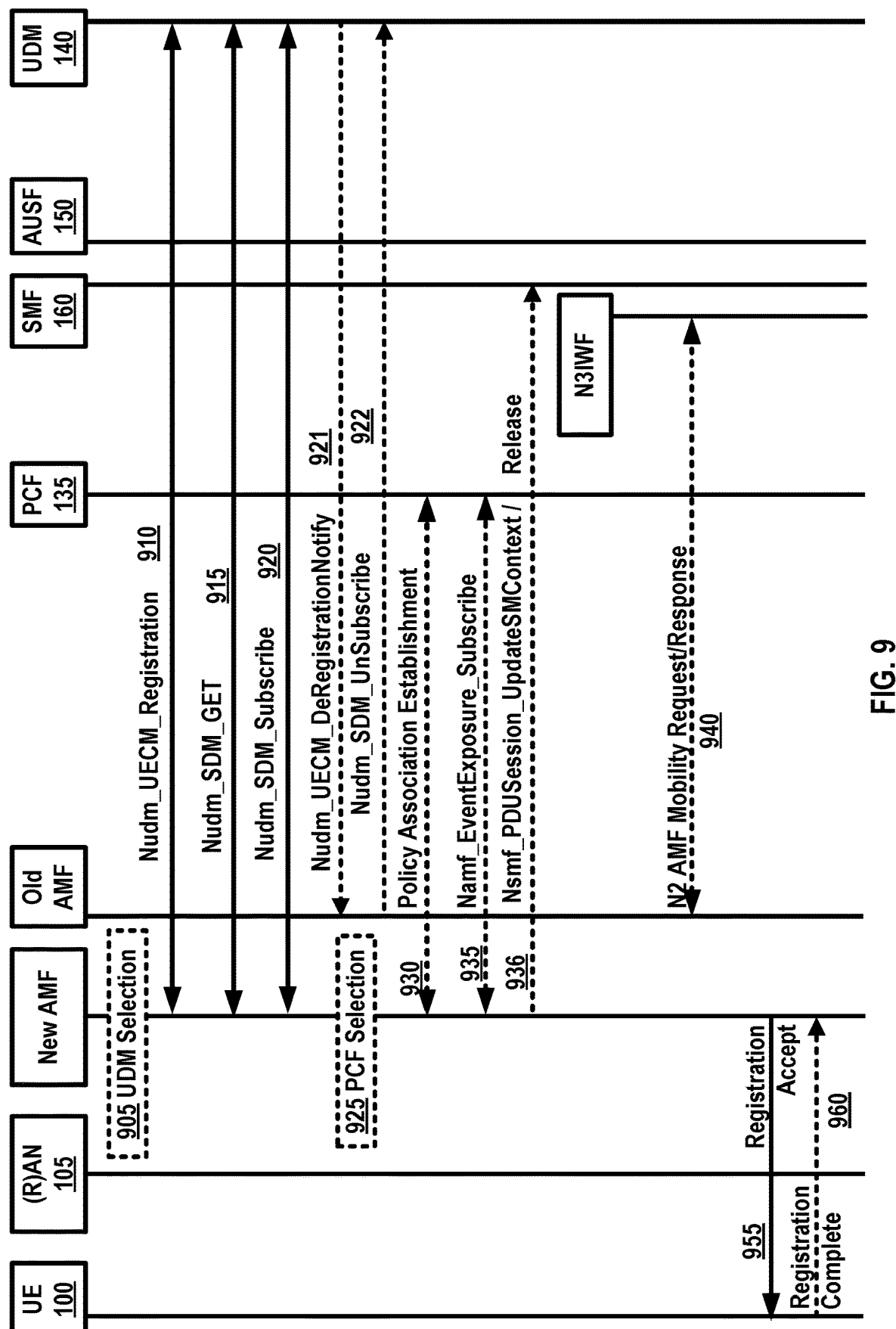
FIG. 9 is an example call flow as per an aspect of an embodiment of the present disclosure.

In an example, an initial registration procedure as depicted in example FIG. 8 and FIG. 9 may involve execution of network access control functions (e.g. user authentication and access authorization based on subscription profiles in UDM 140). Example FIG. 9 is a continuation of the initial registration procedure depicted in FIG. 8. As a result of the initial registration procedure, the identity of the serving AMF 155 may be registered in a UDM 140.

In an example, the registration management, RM procedures may be applicable over both 3GPP access 105 and non 3GPP access 165.

An example FIG. 5A may depict the RM states of a UE 100 as observed by the UE 100 and AMF 155. In an example embodiment, two RM states may be employed in the UE 100 and the AMF 155 that may reflect the registration status of the UE 100 in the selected PLMN: RM-DEREGISTERED 500, and RM-REGISTERED 510. In an example, in the RM DEREGISTERED state 500, the UE 100 may not be registered with the network. The UE 100 context in the AMF 155 may not hold valid location or routing information for the UE 100 so the UE 100 may not be reachable by the AMF 155. In an example, the UE 100 context may be stored in the UE 100 and the AMF 155. In an example, in the RM REGISTERED state 510, the UE 100 may be registered with the network. In the RM-REGISTERED 510 state, the UE 100 may receive services that may require registration with the network.

In an example embodiment, two RM states may be employed in AMF 155 for the UE 100 that may reflect the registration status of the UE 100 in the selected PLMN: RM-DEREGISTERED 520, and RM-REGISTERED 530.

Figures 6A, 6B:
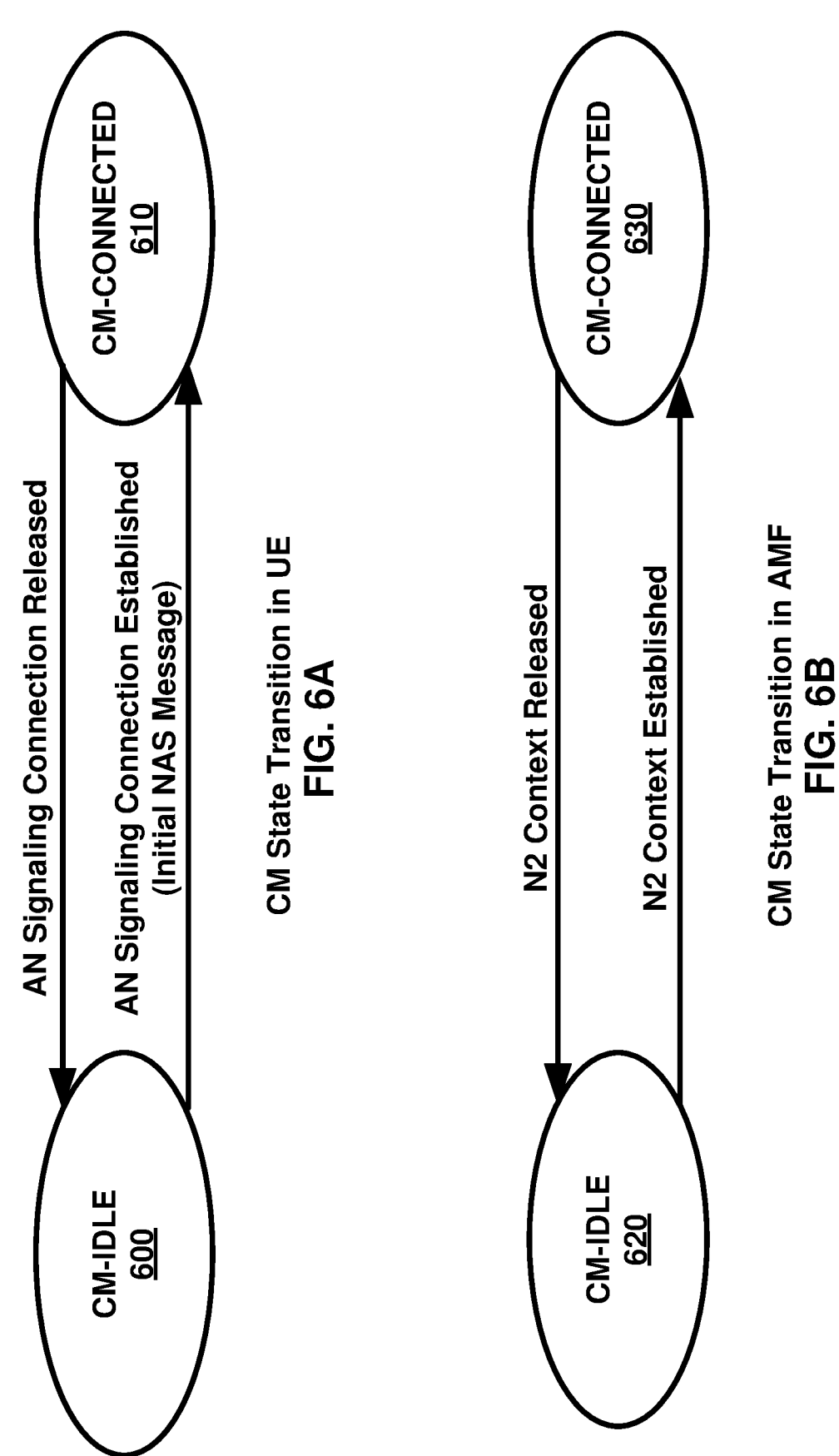
FIG. 6A and FIG. 6B depict two connection management state models in UE 100 and AMF 155 as per an aspect of embodiments of the present disclosure.

As depicted in example FIG. 6A and FIG. 6B, connection management, CM, may comprise establishing and releasing a signaling connection between a UE 100 and an AMF 155 over N1 interface. The signaling connection may be employed to enable NAS signaling exchange between the UE 100 and the core network. The signaling connection between the UE 100 and the AMF 155 may comprise both the AN signaling connection between the UE 100 and the (R)AN 105 (e.g. RRC connection over 3GPP access) and the N2 connection for the UE 100 between the AN and the AMF 155. In an example, the signaling connection may be a N1 signaling connection. In an example, the signaling connection may be a N1 NAS signaling connection.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state may be in RM-REGISTERED 510 state and may have no NAS signaling connection established with the AMF 155 over N1. The UE 100 in CM-IDLE 600 state may be in RRC idle state. The UE 100 may perform cell selection, cell reselection, PLMN selection, and/or the like. A UE 100 in CM-CONNECTED 610 state may have a NAS signaling connection with the AMF 155 over N1. In an example, the UE 100 in CM-CONNTED 610 state may be an RRC connected state. The UE 100 in CM-CONNTECTED 610 state may be an RRC inactive state. In an example, a CM state in an AMF and a CM state in a UE may be different. This may be a case when a local state change happens without explicit signaling procedure (e.g., UE context release procedure) between the UE and the AMF. In an example, an RRC state in a UE (e.g., wireless device) and an RRC state in a base station (e.g., gNB, eNB) may be different. This may be a case when a local state change happens without explicit signaling procedure (e.g., RRC release procedure) between the UE and the base station.

In an example embodiment two CM states may be employed for the UE 100 at the AMF 155, CM-IDLE 620 and CM-CONNECTED 630.

In an example, an RRC inactive state may apply to NG-RAN (e.g. it may apply to NR and E-UTRA connected to 5G CN). The AMF 155, based on network configuration, may provide assistance information to the NG RAN 105, to assist the NG RAN's 105 decision whether the UE 100 may be sent to RRC inactive state. When a UE 100 is CM-CONNECTED 610 with RRC inactive state, the UE 100 may resume the RRC connection due to uplink data pending, mobile initiated signaling procedure, as a response to RAN 105 paging, to notify the network that it has left the RAN 105 notification area, and/or the like.

In an example, a NAS signaling connection management may include establishing and releasing a NAS signaling connection. A NAS signaling connection establishment function may be provided by the UE 100 and the AMF 155 to establish the NAS signaling connection for the UE 100 in CM-IDLE 600 state. The procedure of releasing the NAS signaling connection may be initiated by the 5G (R)AN 105 node or the AMF 155.

In an example, reachability management of a UE 100 may detect whether the UE 100 is reachable and may provide the UE 100 location (e.g. access node) to the network to reach the UE 100. Reachability management may be done by paging the UE 100 and the UE 100 location tracking. The UE 100 location tracking may include both UE 100 registration area tracking and UE 100 reachability tracking. The UE 100 and the AMF 155 may negotiate UE 100 reachability characteristics in CM-IDLE 600, 620 state during registration and registration update procedures.

In an example, two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between the UE 100 and a data network identified by a DNN. The PDU connectivity service may be supported via PDU sessions that are established upon request from the UE 100.

In an example, a PDU session may support one or more PDU session types. PDU sessions may be established (e.g. upon UE 100 request), modified (e.g. upon UE 100 and 5GC request) and/or released (e.g. upon UE 100 and 5GC request) using NAS SM signaling exchanged over N1 between the UE 100 and the SMF 160. Upon request from an application server, the 5GC may be able to trigger a specific application in the UE 100. When receiving the trigger, the UE 100 may send it to the identified application in the UE 100. The identified application in the UE 100 may establish a PDU session to a specific DNN.

Figure 7:
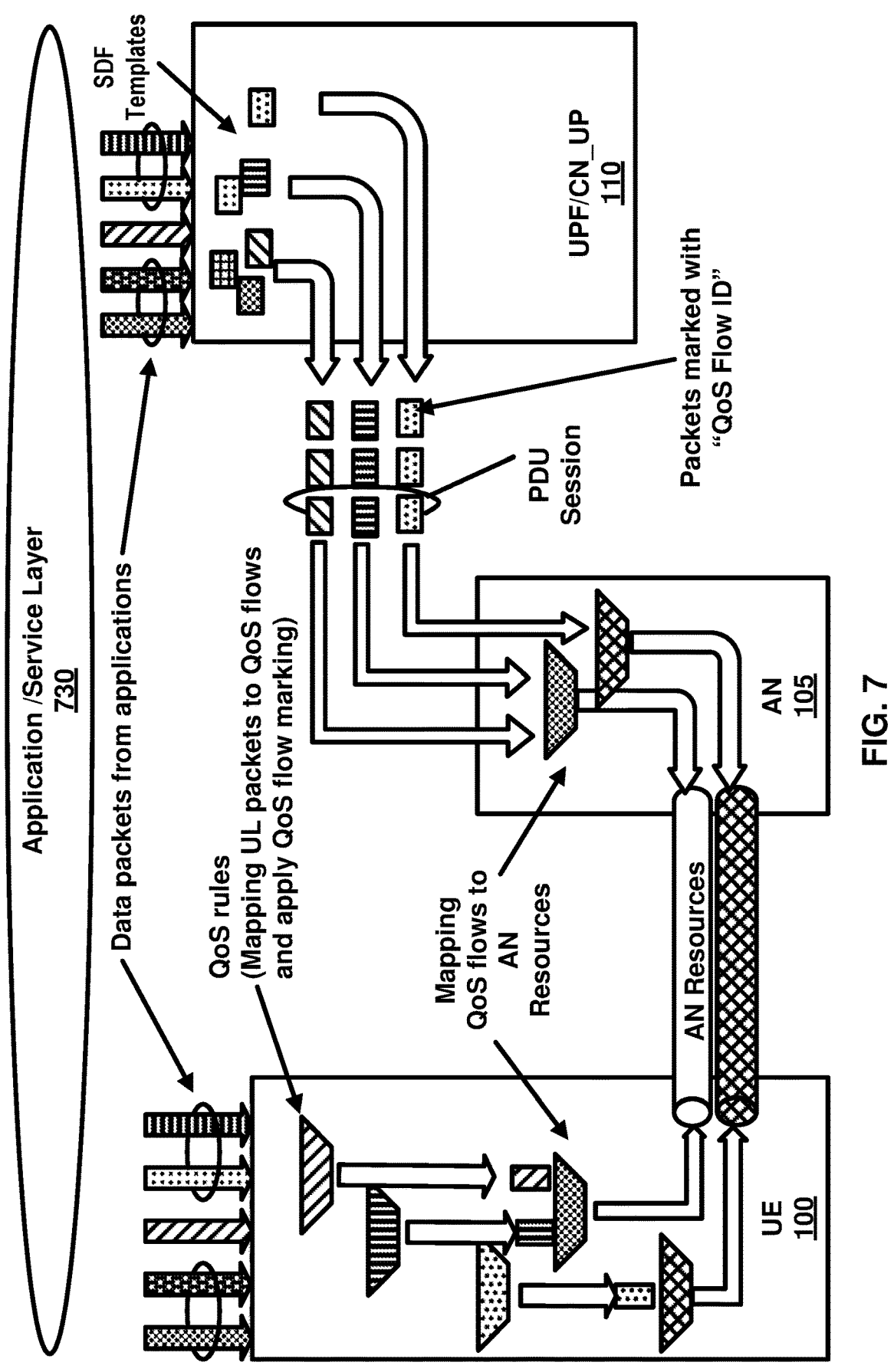
FIG. 7 is diagram for classification and marking traffic as per an aspect of an embodiment of the present disclosure.

In an example, the 5G QoS model may support a QoS flow based framework as depicted in example FIG. 7. The 5G QoS model may support both QoS flows that require a guaranteed flow bit rate and QoS flows that may not require a guaranteed flow bit rate. In an example, the 5G QoS model may support reflective QoS. The QoS model may comprise flow mapping or packet marking at the UPF 110 (CN_UP) 110, AN 105 and/or the UE 100. In an example, packets may arrive from and/or destined to the application/service layer 730 of UE 100, UPF 110 (CN_UP) 110, and/or the AF 145.

In an example, the QoS flow may be a granularity of QoS differentiation in a PDU session. A QoS flow ID, QFI, may be employed to identify the QoS flow in the 5G system. In an example, user plane traffic with the same QFI within a PDU session may receive the same traffic forwarding treatment. The QFI may be carried in an encapsulation header on N3 and/or N9 (e.g. without any changes to the end-to-end packet header). In an example, the QFI may be applied to PDUs with different types of payload. The QFI may be unique within a PDU session.

In an example, the QoS parameters of a QoS flow may be provided to the (R)AN 105 as a QoS profile over N2 at PDU session establishment, QoS flow establishment, or when NG-RAN is used at every time the user plane is activated. In an example, a default QoS rule may be required for every PDU session. The SMF 160 may allocate the QFI for a QoS flow and may derive QoS parameters from the information provided by the PCF 135. In an example, the SMF 160 may provide the QFI together with the QoS profile containing the QoS parameters of a QoS flow to the (R)AN 105.

In an example, 5G QoS flow may be a granularity for QoS forwarding treatment in the 5G system. Traffic mapped to the same 5G QoS flow may receive the same forwarding treatment (e.g. scheduling policy, queue management policy, rate shaping policy, RLC configuration, and/or the like). In an example, providing different QoS forwarding treatment may require separate 5G QoS flows.

In an example, a 5G QoS indicator may be a scalar that may be employed as a reference to a specific QoS forwarding behavior (e.g. packet loss rate, packet delay budget) to be provided to a 5G QoS flow. In an example, the 5G QoS indicator may be implemented in the access network by the 5QI referencing node specific parameters that may control the QoS forwarding treatment (e.g. scheduling weights, admission thresholds, queue management thresholds, link layer protocol configuration, and/or the like.).

In an example, edge computing may provide compute and storage resources with adequate connectivity close to the devices generating traffic.

In an example, 5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. In an example, the selection and traffic steering may be based on the UE's 100 subscription data, UE 100 location, the information from application function AF 145, policy, other related traffic rules, and/or the like. In an example, the 5G core network may expose network information and capabilities to an edge computing application function. The functionality support for edge computing may include local routing where the 5G core network may select a UPF 110 to route the user traffic to the local data network, traffic steering where the 5G core network may select the traffic to be routed to the applications in the local data network, session and service continuity to enable UE 100 and application mobility, user plane selection and reselection, e.g. based on input from application function, network capability exposure where 5G core network and application function may provide information to each other via NEF 125, QoS and charging where PCF 135 may provide rules for QoS control and charging for the traffic routed to the local data network, support of local area data network where 5G core network may provide support to connect to the LADN in a certain area where the applications are deployed, and/or the like.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

In an example, a PDU connectivity service may provide exchange of PDUs between a UE 100 and a data network. A PDU session may be an association between the UE 100 and the data network, DN 115, that may provide the PDU connectivity service. The type of association may be IP, Ethernet and/or unstructured.

Establishment of user plane connectivity to a data network via network slice instance(s) may comprise the following: performing a RM procedure to select an AMF 155 that supports the required network slices, and establishing one or more PDU session(s) to the required data network via the network slice instance(s).

In an example, the set of network slices for a UE 100 may be changed at any time while the UE 100 may be registered with the network, and may be initiated by the network, or the UE 100.

In an example, a periodic registration update may be UE 100 re-registration at expiry of a periodic registration timer. A requested NSSAI may be a NSSAI that the UE 100 may provide to the network.

In an example, a service based interface may represent how a set of services may be provided/exposed by a given NF.

In an example, a service continuity may be an uninterrupted user experience of a service, including the cases where the IP address and/or anchoring point may change. In an example, a session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by the SMF 160, towards data network, DN 115.

In an example, the 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

In an example, the 5G system may reduce dependencies between the access network (AN) and the core network (CN). The architecture may comprise a converged access-agnostic core network with a common AN-CN interface which may integrate different 3GPP and non-3GPP access types.

In an example, the 5G system may support a unified authentication framework, stateless NFs, where the compute resource is decoupled from the storage resource, capability exposure, and concurrent access to local and centralized services. To support low latency services and access to local data networks, UP functions may be deployed close to the access network.

In an example, the 5G system may support roaming with home routed traffic and/or local breakout traffic in the visited PLMN. An example 5G architecture may be service-based and the interaction between network functions may be represented in two ways. (1) As service-based representation (depicted in example FIG. 1), where network functions within the control plane, may enable other authorized network functions to access their services. This representation may also include point-to-point reference points where necessary. (2) Reference point representation, showing the interaction between the NF services in the network functions described by point-to-point reference point (e.g. N11) between any two network functions.

In an example, a network slice may comprise the core network control plane and user plane network functions, the 5G Radio Access Network; the N3IWF functions to the non-3GPP Access Network, and/or the like. Network slices may differ for supported features and network function implementation. The operator may deploy multiple network slice instances delivering the same features but for different groups of UEs, e.g. as they deliver a different committed service and/or because they may be dedicated to a customer. The NSSF 120 may store the mapping information between slice instance ID and NF ID (or NF address).

In an example, a UE 100 may simultaneously be served by one or more network slice instances via a 5G-AN. In an example, the UE 100 may be served by k network slices (e.g. k=8, 16, etc.) at a time. An AMF 155 instance serving the UE 100 logically may belong to a network slice instance serving the UE 100.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a network slice. An S-NSSAI may comprise a slice/service type (SST), which may refer to the expected network slice behavior in terms of features and services; and/or a slice differentiator (SD). A slice differentiator may be optional information that may complement the slice/service type(s) to allow further differentiation for selecting a network slice instance from potentially multiple network slice instances that comply with the indicated slice/service type. In an example, the same network slice instance may be selected employing different S-NSSAIs. The CN part of a network slice instance(s) serving a UE 100 may be selected by CN.

In an example, subscription data may include the S-NSSAI(s) of the network slices that the UE 100 subscribes to. One or more S-NSSAIs may be marked as default S-NSSAI. In an example, k S-NSSAI may be marked default S-NSSAI (e.g. k=8, 16, etc.). In an example, the UE 100 may subscribe to more than 8 S-NSSAIs.

In an example, a UE 100 may be configured by the HPLMN with a configured NSSAI per PLMN. Upon successful completion of a UE's registration procedure, the UE 100 may obtain from the AMF 155 an Allowed NSSAI for this PLMN, which may include one or more S-NSSAIs.

In an example, the Allowed NSSAI may take precedence over the configured NSSAI for a PLMN. The UE 100 may use the S-NSSAIs in the allowed NSSAI corresponding to a network slice for the subsequent network slice selection related procedures in the serving PLMN.

In an example, the establishment of user plane connectivity to a data network via a network slice instance(s) may comprise: performing a RM procedure to select an AMF 155 that may support the required network slices, establishing one or more PDU sessions to the required data network via the network slice instance(s), and/or the like.

In an example, when a UE 100 registers with a PLMN, if the UE 100 for the PLMN has a configured NSSAI or an allowed NSSAI, the UE 100 may provide to the network in RRC and NAS layer a requested NSSAI comprising the S-NSSAI(s) corresponding to the slice(s) to which the UE 100 attempts to register, a temporary user ID if one was assigned to the UE, and/or the like. The requested NSSAI may be configured-NSSAI, allowed-NSSAI, and/or the like.

In an example, when a UE 100 registers with a PLMN, if for the PLMN the UE 100 has no configured NSSAI or allowed NSSAI, the RAN 105 may route NAS signaling from/to the UE 100 to/from a default AMF 155.

In an example, the network, based on local policies, subscription changes and/or UE 100 mobility, may change the set of permitted network slice(s) to which the UE 100 is registered. In an example, the network may perform the change during a registration procedure or trigger a notification towards the UE 100 of the change of the supported network slices using an RM procedure (which may trigger a registration procedure). The network may provide the UE 100 with a new allowed NSSAI and tracking area list.

In an example, during a registration procedure in a PLMN, in case the network decides that the UE 100 should be served by a different AMF 155 based on network slice(s) aspects, the AMF 155 that first received the registration request may redirect the registration request to another AMF 155 via the RAN 105 or via direct signaling between the initial AMF 155 and the target AMF 155.

In an example, the network operator may provision the UE 100 with network slice selection policy (NSSP). The NSSP may comprise one or more NSSP rules.

In an example, if a UE 100 has one or more PDU sessions established corresponding to a specific S-NSSAI, the UE 100 may route the user data of the application in one of the PDU sessions, unless other conditions in the UE 100 may prohibit the use of the PDU sessions. If the application provides a DNN, then the UE 100 may consider the DNN to determine which PDU session to use. In an example, if the UE 100 does not have a PDU session established with the specific S-NSSAI, the UE 100 may request a new PDU session corresponding to the S-NSSAI and with the DNN that may be provided by the application. In an example, in order for the RAN 105 to select a proper resource for supporting network slicing in the RAN 105, the RAN 105 may be aware of the network slices used by the UE 100.

In an example, an AMF 155 may select an SMF 160 in a network slice instance based on S-NSSAI, DNN and/or other information e.g. UE 100 subscription and local operator policies, and/or the like, when the UE 100 triggers the establishment of a PDU session. The selected SMF 160 may establish the PDU session based on S-NSSAI and DNN.

In an example, in order to support network-controlled privacy of slice information for the slices the UE 100 may access, when the UE 100 is aware or configured that privacy considerations may apply to NSSAI, the UE 100 may not include NSSAI in NAS signaling unless the UE 100 has a NAS security context and the UE 100 may not include NSSAI in unprotected RRC signaling.

In an example, for roaming scenarios, the network slice specific network functions in VPLMN and HPLMN may be selected based on the S-NSSAI provided by the UE 100 during PDU connection establishment. If a standardized S-NSSAI is used, selection of slice specific NF instances may be done by each PLMN based on the provided S-NSSAI. In an example, the VPLMN may map the S-NSSAI of HPLMN to a S-NSSAI of VPLMN based on roaming agreement (e.g., including mapping to a default S-NSSAI of VPLMN). In an example, the selection of slice specific NF instance in VPLMN may be done based on the S-NSSAI of VPLMN. In an example, the selection of any slice specific NF instance in HPLMN may be based on the S-NSSAI of HPLMN.

As depicted in example FIG. 8 and FIG. 9, a registration procedure may be performed by the UE 100 to get authorized to receive services, to enable mobility tracking, to enable reachability, and/or the like.

In an example, the UE 100 may send to the (R)AN 105 an message 805 (comprising AN parameters, RM-NAS registration request (registration type, SUCI or SUPI or 5G-GUTI, last visited TAI (if available), security parameters, requested NSSAI, mapping of requested NSSAI, UE 100 5GC capability, PDU session status, PDU session(s) to be re-activated, Follow on request, MICO mode preference, and/or the like), and/or the like). In an example, in case of NG-RAN, the AN parameters may include e.g. SUCI or SUPI or the 5G-GUTI, the Selected PLMN ID and requested NSSAI, and/or the like. In an example, the AN parameters may comprise establishment cause. The establishment cause may provide the reason for requesting the establishment of an RRC connection. In an example, the registration type may indicate if the UE 100 wants to perform an initial registration (e.g. the UE 100 is in RM-DEREGISTERED state), a mobility registration update (e.g., the UE 100 is in RM-REGISTERED state and initiates a registration procedure due to mobility), a periodic registration update (e.g., the UE 100 is in RM-REGISTERED state and may initiate a registration procedure due to the periodic registration update timer expiry) or an emergency registration (e.g., the UE 100 is in limited service state). In an example, if the UE 100 performing an initial registration (e.g., the UE 100 is in RM-DEREGISTERED state) to a PLMN for which the UE 100 does not already have a 5G-GUTI, the UE 100 may include its SUCI or SUPI in the registration request. The SUCI may be included if the home network has provisioned the public key to protect SUPI in the UE. If the UE 100 received a UE 100 configuration update command indicating that the UE 100 needs to re-register and the 5G-GUTI is invalid, the UE 100 may perform an initial registration and may include the SUPI in the registration request message. For an emergency registration, the SUPI may be included if the UE 100 does not have a valid 5G-GUTI available; the PEI may be included when the UE 100 has no SUPI and no valid 5G-GUTI. In other cases, the 5G-GUTI may be included and it may indicate the last serving AMF 155. If the UE 100 is already registered via a non-3GPP access in a PLMN different from the new PLMN (e.g., not the registered PLMN or an equivalent PLMN of the registered PLMN) of the 3GPP access, the UE 100 may not provide over the 3GPP access the 5G-GUTI allocated by the AMF 155 during the registration procedure over the non-3GPP access. If the UE 100 is already registered via a 3GPP access in a PLMN (e.g., the registered PLMN), different from the new PLMN (e.g. not the registered PLMN or an equivalent PLMN of the registered PLMN) of the non-3GPP access, the UE 100 may not provide over the non-3GPP access the 5G-GUTI allocated by the AMF 155 during the registration procedure over the 3GPP access. The UE 100 may provide the UE's usage setting based on its configuration. In case of initial registration or mobility registration update, the UE 100 may include the mapping of requested NSSAI, which may be the mapping of each S-NSSAI of the requested NSSAI to the S-NSSAIs of the configured NSSAI for the HPLMN, to ensure that the network is able to verify whether the S-NSSAI(s) in the requested NSSAI are permitted based on the subscribed S-NSSAIs. If available, the last visited TAI may be included in order to help the AMF 155 produce registration area for the UE. In an example, the security parameters may be used for authentication and integrity protection. requested NSSAI may indicate the network slice selection assistance information. The PDU session status may indicates the previously established PDU sessions in the UE. When the UE 100 is connected to the two AMF 155 belonging to different PLMN via 3GPP access and non-3GPP access then the PDU session status may indicate the established PDU session of the current PLMN in the UE. The PDU session(s) to be re-activated may be included to indicate the PDU session(s) for which the UE 100 may intend to activate UP connections. A PDU session corresponding to a LADN may not be included in the PDU session(s) to be re-activated when the UE 100 is outside the area of availability of the LADN. The follow on request may be included when the UE 100 may have pending uplink signaling and the UE 100 may not include PDU session(s) to be re-activated, or the registration type may indicate the UE 100 may want to perform an emergency registration.

In an example, if a SUPI is included or the 5G-GUTI does not indicate a valid AMF 155, the (R)AN 105, based on (R)AT and requested NSSAI, if available, may selects 808 an AMF 155. If UE 100 is in CM-CONNECTED state, the (R)AN 105 may forward the registration request message to the AMF 155 based on the N2 connection of the UE. If the (R)AN 105 may not select an appropriate AMF 155, it may forward the registration request to an AMF 155 which has been configured, in (R)AN 105, to perform AMF 155 selection 808.

In an example, the (R)AN 105 may send to the new AMF 155 an N2 message 810 (comprising: N2 parameters, RM-NAS registration request (registration type, SUPI or 5G-GUTI, last visited TAI (if available), security parameters, requested NSSAI, mapping of requested NSSAI, UE 100 5GC capability, PDU session status, PDU session(s) to be re-activated, follow on request, and MICO mode preference), and/or the like). In an example, when NG-RAN is used, the N2 parameters may comprise the selected PLMN ID, location information, cell identity and the RAT type related to the cell in which the UE 100 is camping. In an example, when NG-RAN is used, the N2 parameters may include the establishment cause.

In an example, the new AMF 155 may send to the old AMF 155 a Namf_Communication_UEContextTransfer (complete registration request) 815. In an example, if the UE's 5G-GUTI was included in the registration request and the serving AMF 155 has changed since last registration procedure, the new AMF 155 may invoke the Namf_Communication_UEContextTransfer service operation 815 on the old AMF 155 including the complete registration request IE, which may be integrity protected, to request the UE's SUPI and MM Context. The old AMF 155 may use the integrity protected complete registration request IE to verify if the context transfer service operation invocation corresponds to the UE 100 requested. In an example, the old AMF 155 may transfer the event subscriptions information by each NF consumer, for the UE, to the new AMF 155. In an example, if the UE 100 identifies itself with PEI, the SUPI request may be skipped.

In an example, the old AMF 155 may send to new AMF 155 a response 815 to Namf_Communication_UEContextTransfer (SUPI, MM context, SMF 160 information, PCF ID). In an example, the old AMF 155 may respond to the new AMF 155 for the Namf_Communication_UEContextTransfer invocation by including the UE's SUPI and MM context. In an example, if old AMF 155 holds information about established PDU sessions, the old AMF 155 may include SMF 160 information including S-NSSAI(s), SMF 160 identities and PDU session ID. In an example, if old AMF 155 holds information about active NGAP UE-TNLA bindings to N3IWF, the old AMF 155 may include information about the NGAP UE-TNLA bindings.

In an example, if the SUPI is not provided by the UE 100 nor retrieved from the old AMF 155 the identity request procedure 820 may be initiated by the AMF 155 sending an identity request message to the UE 100 requesting the SUCI.

In an example, the UE 100 may respond with an identity response message 820 including the SUCI. The UE 100 may derive the SUCI by using the provisioned public key of the HPLMN.

In an example, the AMF 155 may decide to initiate UE 100 authentication 825 by invoking an AUSF 150. The AMF 155 may select an AUSF 150 based on SUPI or SUCI. In an example, if the AMF 155 is configured to support emergency registration for unauthenticated SUPIs and the UE 100 indicated registration type emergency registration the AMF 155 may skip the authentication and security setup or the AMF 155 may accept that the authentication may fail and may continue the registration procedure.

In an example, the authentication 830 may be performed by Nudm_UEAuthenticate_Get operation. The AUSF 150 may discover a UDM 140. In case the AMF 155 provided a SUCI to AUSF 150, the AUSF 150 may return the SUPI to AMF 155 after the authentication is successful. In an example, if network slicing is used, the AMF 155 may decide if the registration request needs to be rerouted where the initial AMF 155 refers to the AMF 155. In an example, the AMF 155 may initiate NAS security functions. In an example, upon completion of NAS security function setup, the AMF 155 may initiate NGAP procedure to enable 5G-AN use it for securing procedures with the UE. In an example, the 5G-AN may store the security context and may acknowledge to the AMF 155. The 5G-AN may use the security context to protect the messages exchanged with the UE.

In an example, new AMF 155 may send to the old AMF 155 Namf_Communication_RegistrationCompleteNotify 835. If the AMF 155 has changed, the new AMF 155 may notify the old AMF 155 that the registration of the UE 100 in the new AMF 155 may be completed by invoking the Namf_Communication_RegistrationCompleteNotify service operation. If the authentication/security procedure fails, then the registration may be rejected, and the new AMF 155 may invoke the Namf_Communication_RegistrationCompleteNotify service operation with a reject indication reason code towards the old AMF 155. The old AMF 155 may continue as if the UE 100 context transfer service operation was never received. If one or more of the S-NSSAIs used in the old registration area may not be served in the target registration area, the new AMF 155 may determine which PDU session may not be supported in the new registration area. The new AMF 155 may invoke the Namf_Communication_RegistrationCompleteNotify service operation including the rejected PDU session ID and a reject cause (e.g. the S-NSSAI becomes no longer available) towards the old AMF 155. The new AMF 155 may modify the PDU session status correspondingly. The old AMF 155 may inform the corresponding SMF 160(s) to locally release the UE's SM context by invoking the Nsmf_PDUSession_ReleaseSMContext service operation.

In an example, the new AMF 155 may send to the UE 100 an identity request/response 840 (e.g., PEI). If the PEI was not provided by the UE 100 nor retrieved from the old AMF 155, the identity request procedure may be initiated by AMF 155 sending an identity request message to the UE 100 to retrieve the PEI. The PEI may be transferred encrypted unless the UE 100 performs emergency registration and may not be authenticated. For an emergency registration, the UE 100 may have included the PEI in the registration request.

In an example, the new AMF 155 may initiate ME identity check 845 by invoking the N5g-eir_EquipmentIdentity-Check_Get service operation 845.

In an example, the new AMF 155, based on the SUPI, may select 905 a UDM 140. The UDM 140 may select a UDR instance. In an example, the AMF 155 may select a UDM 140.

In an example, if the AMF 155 has changed since the last registration procedure, or if the UE 100 provides a SUPI which may not refer to a valid context in the AMF 155, or if the UE 100 registers to the same AMF 155 it has already registered to a non-3GPP access (e.g., the UE 100 is registered over a non-3GPP access and may initiate the registration procedure to add a 3GPP access), the new AMF 155 may register with the UDM 140 using Nudm_UECM_Registration 910 and may subscribe to be notified when the UDM 140 may deregister the AMF 155. The UDM 140 may store the AMF 155 identity associated to the access type and may not remove the AMF 155 identity associated to the other access type. The UDM 140 may store information provided at registration in UDR, by Nudr_UDM_Update. In an example, the AMF 155 may retrieve the access and mobility subscription data and SMF 160 selection subscription data using Nudm_SDM_Get 915. The UDM 140 may retrieve this information from UDR by Nudr_UDM_Query (access and mobility subscription data). After a successful response is received, the AMF 155 may subscribe to be notified using Nudm_SDM_Subscribe 920 when the data requested may be modified. The UDM 140 may subscribe to UDR by Nudr_UDM_Subscribe. The GPSI may be provided to the AMF 155 in the subscription data from the UDM 140 if the GPSI is available in the UE 100 subscription data. In an example, the new AMF 155 may provide the access type it serves for the UE 100 to the UDM 140 and the access type may be set to 3GPP access. The UDM 140 may store the associated access type together with the serving AMF 155 in UDR by Nudr_UDM_Update. The new AMF 155 may create an MM context for the UE 100 after getting the mobility subscription data from the UDM 140. In an example, when the UDM 140 stores the associated access type together with the serving AMF 155, the UDM 140 may initiate a Nudm_UECM_DeregistrationNotification 921 to the old AMF 155 corresponding to 3GPP access. The old AMF 155 may remove the MM context of the UE. If the serving NF removal reason indicated by the UDM 140 is initial registration, then the old AMF 155 may invoke the Namf_EventExposure_Notify service operation towards all the associated SMF 160s of the UE 100 to notify that the UE 100 is deregistered from old AMF 155. The SMF 160 may release the PDU session(s) on getting this notification. In an example, the old AMF 155 may unsubscribe with the UDM 140 for subscription data using Nudm_SDM_unsubscribe 922.

In an example, if the AMF 155 decides to initiate PCF 135 communication, e.g. the AMF 155 has not yet obtained access and mobility policy for the UE 100 or if the access and mobility policy in the AMF 155 are no longer valid, the AMF 155 may select 925 a PCF 135. If the new AMF 155 receives a PCF ID from the old AMF 155 and successfully contacts the PCF 135 identified by the PCF ID, the AMF 155 may select the (V-)PCF identified by the PCF ID. If the PCF 135 identified by the PCF ID may not be used (e.g. no response from the PCF 135) or if there is no PCF ID received from the old AMF 155, the AMF 155 may select 925 a PCF 135.

In an example, the new AMF 155 may perform a policy association establishment 930 during registration procedure. If the new AMF 155 contacts the PCF 135 identified by the (V-)PCF ID received during inter-AMF 155 mobility, the new AMF 155 may include the PCF-ID in the Npcf_AM-PolicyControl Get operation. If the AMF 155 notifies the mobility restrictions (e.g. UE 100 location) to the PCF 135 for adjustment, or if the PCF 135 updates the mobility restrictions itself due to some conditions (e.g. application in use, time and date), the PCF 135 may provide the updated mobility restrictions to the AMF 155.

In an example, the PCF 135 may invoke Namf_EventExposure_Subscribe service operation 935 for UE 100 event subscription.

In an example, the AMF 155 may send to the SMF 160 an Nsmf_PDUSession_UpdateSMContext 936. In an example, the AMF 155 may invoke the Nsmf_PDUSession_UpdateSMContext if the PDU session(s) to be re-activated is included in the registration request. The AMF 155 may send Nsmf_PDUSession_UpdateSMContext request to SMF 160(*s*) associated with the PDU session(s) to activate user plane connections of the PDU session(s). The SMF 160 may decide to trigger e.g. the intermediate UPF 110 insertion, removal or change of PSA. In the case that the intermediate UPF 110 insertion, removal, or relocation is performed for the PDU session(s) not included in PDU session(s) to be re-activated, the procedure may be performed without N11 and N2 interactions to update the N3 user plane between (R)AN 105 and 5GC. The AMF 155 may invoke the Nsmf_PDUSession_ReleaseSMContext service operation towards the SMF 160 if any PDU session status indicates that it is released at the UE 100. The AMF 155 may invoke the Nsmf_PDUSession_ReleaseSMContext service operation towards the SMF 160 in order to release any network resources related to the PDU session.

In an example, the new AMF 155 may send to a N3IWF an N2 AMF 155 mobility request 940. If the AMF 155 has changed, the new AMF 155 may create an NGAP UE 100 association towards the N3IWF to which the UE 100 is connected. In an example, the N3IWF may respond to the new AMF 155 with an N2 AMF 155 mobility response 940.

In an example, the new AMF 155 may send to the UE 100 a registration accept 955 (comprising: 5G-GUTI, registration area, mobility restrictions, PDU session status, allowed NSSAI, [mapping of allowed NSSAI], periodic registration update timer, LADN information and accepted MICO mode, IMS voice over PS session supported indication, emergency service support indicator, and/or the like). In an example, the AMF 155 may send the registration accept message to the UE 100 indicating that the registration request has been accepted. 5G-GUTI may be included if the AMF 155 allocates a new 5G-GUTI. If the AMF 155 allocates a new registration area, it may send the registration area to the UE 100 via registration accept message 955. If there is no registration area included in the registration accept message, the UE 100 may consider the old registration area as valid. In an example, mobility restrictions may be included in case mobility restrictions may apply for the UE 100 and registration type may not be emergency registration. The AMF 155 may indicate the established PDU sessions to the UE 100 in the PDU session status. The UE 100 may remove locally any internal resources related to PDU sessions that are not marked as established in the received PDU session status. In an example, when the UE 100 is connected to the two AMF 155 belonging to different PLMN via 3GPP access and non-3GPP access then the UE 100 may remove locally any internal resources related to the PDU session of the current PLMN that are not marked as established in received PDU session status. If the PDU session status information was in the registration request, the AMF 155 may indicate the PDU session status to the UE. The mapping of allowed NSSAI may be the mapping of each S-NSSAI of the allowed NSSAI to the S-NSSAIs of the configured NSSAI for the HPLMN. The AMF 155 may include in the registration accept message 955 the LADN information for LADNs that are available within the registration area determined by the AMF 155 for the UE. If the UE 100 included MICO mode in the request, then AMF 155 may respond whether MICO mode may be used. The AMF 155 may set the IMS voice over PS session supported Indication. In an example, in order to set the IMS voice over PS session supported indication, the AMF 155 may perform a UE/RAN radio information and compatibility request procedure to check the compatibility of the UE 100 and RAN radio capabilities related to IMS voice over PS. In an example, the emergency service support indicator may inform the UE 100 that emergency services are supported, e.g., the UE 100 may request PDU session for emergency services. In an example, the handover restriction list and UE-AMBR may be provided to NG-RAN by the AMF 155.

In an example, the UE 100 may send to the new AMF 155 a registration complete 960 message. In an example, the UE 100 may send the registration complete message 960 to the AMF 155 to acknowledge that a new 5G-GUTI may be assigned. In an example, when information about the PDU session(s) to be re-activated is not included in the registration request, the AMF 155 may release the signaling connection with the UE 100. In an example, when the follow-on request is included in the registration request, the AMF 155 may not release the signaling connection after the completion of the registration procedure. In an example, if the AMF 155 is aware that some signaling is pending in the AMF 155 or between the UE 100 and the 5GC, the AMF 155 may not release the signaling connection after the completion of the registration procedure.

Figure 10:
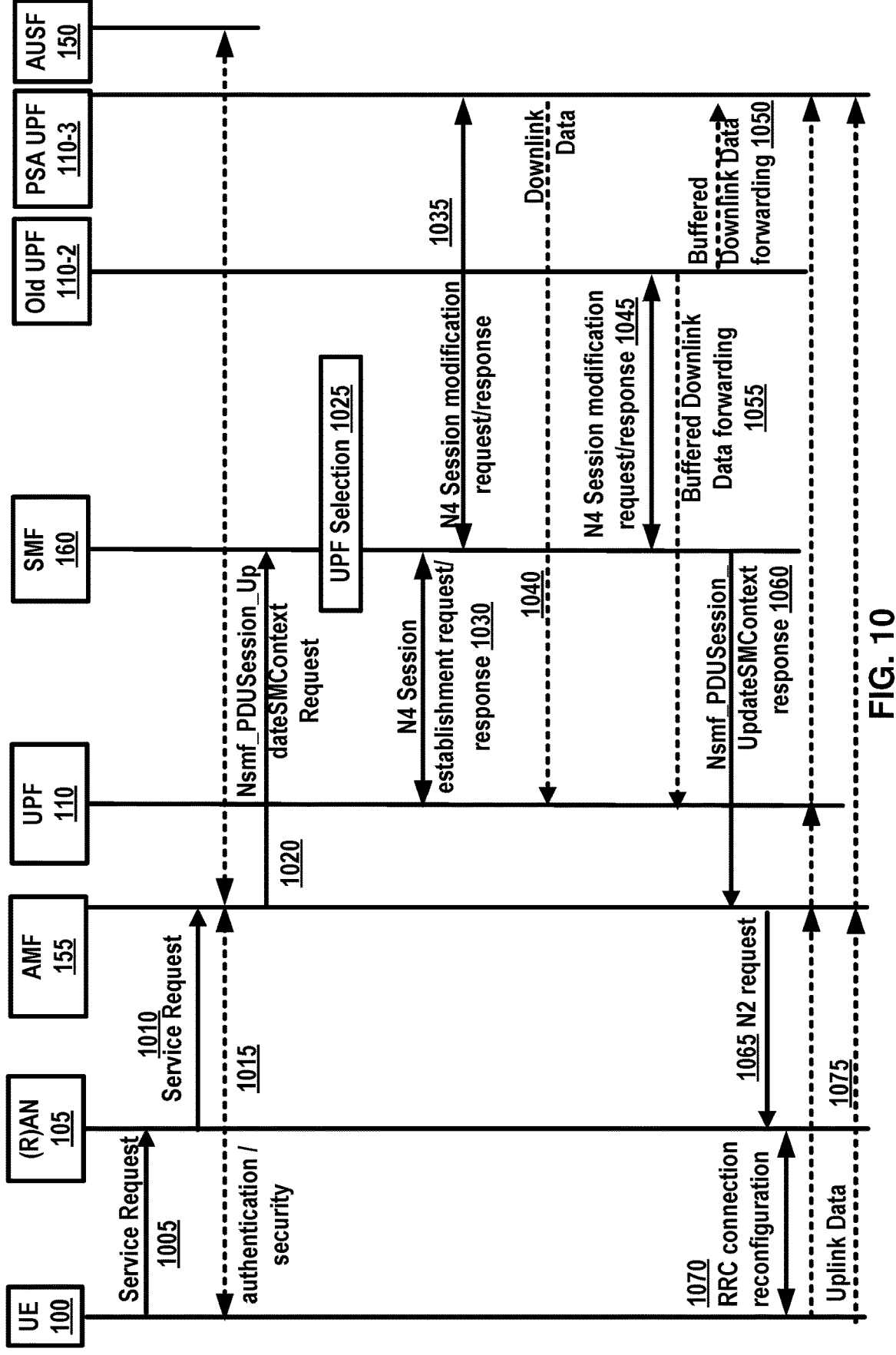
FIG. 10 is an example call flow as per an aspect of an embodiment of the present disclosure.
Figure 11:
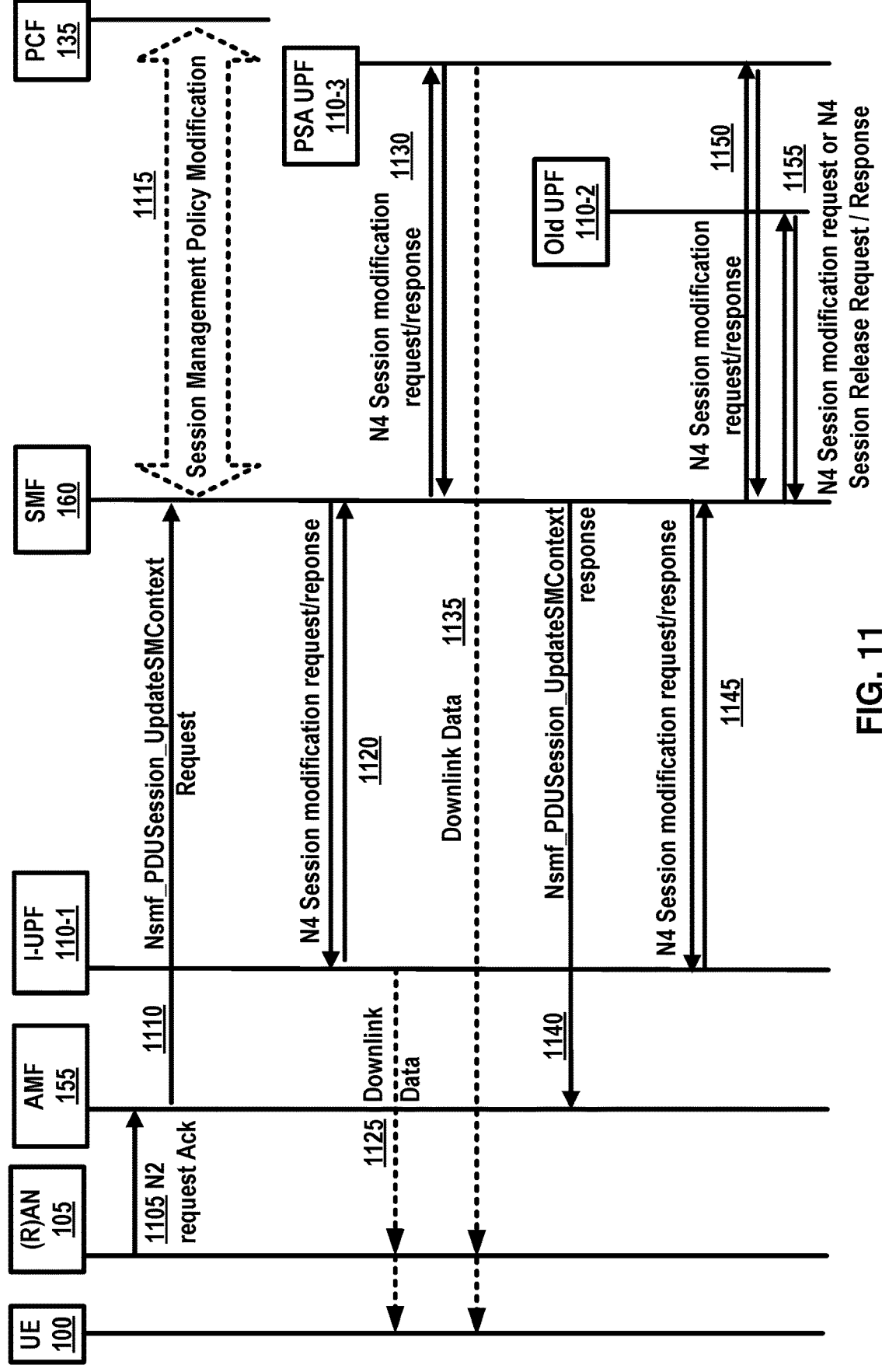
FIG. 11 is an example call flow as per an aspect of an embodiment of the present disclosure.

As depicted in example FIG. 10 and FIG. 11, a service request procedure e.g., a UE 100 triggered service request procedure may be used by a UE 100 in CM-IDLE state to request the establishment of a secure connection to an AMF 155. FIG. 11 is continuation of FIG. 10 depicting the service request procedure. The service request procedure may be used to activate a user plane connection for an established PDU session. The service request procedure may be triggered by the UE 100 or the 5GC, and may be used when the UE 100 is in CM-IDLE and/or in CM-CONNECTED and may allow selectively to activate user plane connections for some of the established PDU sessions.

In an example, a UE 100 in CM IDLE state may initiate the service request procedure to send uplink signaling messages, user data, and/or the like, as a response to a network paging request, and/or the like. In an example, after receiving the service request message, the AMF 155 may perform authentication. In an example, after the establishment of signaling connection to the AMF 155, the UE 100 or network may send signaling messages, e.g. PDU session establishment from the UE 100 to a SMF 160, via the AMF 155.

In an example, for any service request, the AMF 155 may respond with a service accept message to synchronize PDU session status between the UE 100 and network. The AMF 155 may respond with a service reject message to the UE 100, if the service request may not be accepted by the network. The service reject message may include an indication or cause code requesting the UE 100 to perform a registration update procedure. In an example, for service request due to user data, network may take further actions if user plane connection activation may not be successful. In an example FIG. 10 and FIG. 11, more than one UPF, e.g., old UPF 110-2 and PDU session Anchor PSA UPF 110-3 may be involved.

In an example, the UE 100 may send to a (R)AN 105 an message comprising AN parameters, mobility management, MM NAS service request 1005 (e.g., list of PDU sessions to be activated, list of allowed PDU sessions, security parameters, PDU session status, and/or the like), and/or the like. In an example, the UE 100 may provide the list of PDU sessions to be activated when the UE 100 may re-activate the PDU session(s). The list of allowed PDU sessions may be provided by the UE 100 when the service request may be a response of a paging or a NAS notification, and may identify the PDU sessions that may be transferred or associated to the access on which the service request may be sent. In an example, for the case of NG-RAN, the AN parameters may include selected PLMN ID, and an establishment cause. The establishment cause may provide the reason for requesting the establishment of an RRC connection. The UE 100 may send NAS service request message towards the AMF 155 encapsulated in an RRC message to the RAN 105.

In an example, if the service request may be triggered for user data, the UE 100 may identify, using the list of PDU sessions to be activated, the PDU session(s) for which the UP connections are to be activated in the NAS service request message. If the service request may be triggered for signaling, the UE 100 may not identify any PDU session(s). If this procedure may be triggered for paging response, and/or the UE 100 may have at the same time user data to be transferred, the UE 100 may identify the PDU session(s) whose UP connections may be activated in MM NAS service request message, by the list of PDU sessions to be activated.

In an example, if the service request over 3GPP access may be triggered in response to a paging indicating non-3GPP access, the NAS service request message may identify in the list of allowed PDU sessions the list of PDU sessions associated with the non-3GPP access that may be re-activated over 3GPP. In an example, the PDU session status may indicate the PDU sessions available in the UE 100. In an example, the UE 100 may not trigger the service request procedure for a PDU session corresponding to a LADN when the UE 100 may be outside the area of availability of the LADN. The UE 100 may not identify such PDU session(s) in the list of PDU sessions to be activated, if the service request may be triggered for other reasons.

In an example, the (R)AN 105 may send to AMF 155 an N2 Message 1010 (e.g., a service request) comprising N2 parameters, MM NAS service request, and/or the like. The AMF 155 may reject the N2 message if it may not be able to handle the service request. In an example, if NG-RAN may be used, the N2 parameters may include the 5G-GUTI, selected PLMN ID, location information, RAT type, establishment cause, and/or the like. In an example, the 5G-GUTI may be obtained in RRC procedure and the (R)AN 105 may select the AMF 155 according to the 5G-GUTI. In an example, the location information and RAT type may relate to the cell in which the UE 100 may be camping. In an example, based on the PDU session status, the AMF 155 may initiate PDU session release procedure in the network for the PDU sessions whose PDU session ID(s) may be indicated by the UE 100 as not available.

In an example, if the service request was not sent integrity protected or integrity protection verification failed, the AMF 155 may initiate a NAS authentication/security procedure 1015.

In an example, if the UE 100 triggers the service request to establish a signaling connection, upon successful establishment of the signaling connection, the UE 100 and the network may exchange NAS signaling.

In an example the AMF 155 may send to the SMF 160 a PDU session update context request 1020 e.g., Nsmf_P-DUSession_UpdateSMContext request comprising PDU session ID(s), Cause(s), UE 100 location information, access type, and/or the like.

In an example, the Nsmf_PDUSession_UpdateSMContext request may be invoked by the AMF 155 if the UE 100 may identify PDU session(s) to be activated in the NAS service request message. In an example, the Nsmf_PDUSession_UpdateSMContext request may be triggered by the SMF 160 wherein the PDU session(s) identified by the UE 100 may correlate to other PDU session ID(s) than the one triggering the procedure. In an example, the Nsmf_PDUSession_UpdateSMContext request may be triggered by the SMF 160 wherein the current UE 100 location may be outside the area of validity for the N2 information provided by the SMF 160 during a network triggered service request procedure. The AMF 155 may not send the N2 information provided by the SMF 160 during the network triggered service request procedure.

In an example, the AMF 155 may determine the PDU session(s) to be activated and may send a Nsmf_PDUSession_UpdateSMContext request to SMF 160(*s*) associated with the PDU session(s) with cause set to indicate establishment of user plane resources for the PDU session(s).

In an example, if the procedure may be triggered in response to paging indicating non-3GPP access, and the list of allowed PDU sessions provided by the UE 100 may not include the PDU session for which the UE 100 was paged, the AMF 155 may notify the SMF 160 that the user plane for the PDU session may not be re-activated. The service request procedure may succeed without re-activating the user plane of any PDU sessions, and the AMF 155 may notify the UE 100.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) keep the PDU session, may reject the activation of user plane connection for the PDU session and may inform the AMF 155. In an example, if the procedure may be triggered by a network triggered service request, the SMF 160 may notify the UPF 110 that originated the data notification to discard downlink data for the PDU sessions and/or to not provide further data notification messages. The SMF 160 may respond to the AMF 155 with an appropriate reject cause and the user plane activation of PDU session may be stopped.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) release the PDU session. The SMF 160 may locally release the PDU session and may inform the AMF 155 that the PDU session may be released. The SMF 160 may respond to the AMF 155 with an appropriate reject cause and the user plane Activation of PDU session may be stopped.

In an example, if the UP activation of the PDU session may be accepted by the SMF 160, based on the location info received from the AMF 155, the SMF 160 may check the UPF 110 Selection 1025 Criteria (e.g., slice isolation requirements, slice coexistence requirements, UPF's 110 dynamic load, UPF's 110 relative static capacity among UPFs supporting the same DNN, UPF 110 location available at the SMF 160, UE 100 location information, Capability of the UPF 110 and the functionality required for the particular UE 100 session. In an example, an appropriate UPF 110 may be selected by matching the functionality and features required for a UE 100, DNN, PDU session type (e.g. IPv4, IPv6, ethernet type or unstructured type) and if applicable, the static IP address/prefix, SSC mode selected for the PDU session, UE 100 subscription profile in UDM 140, DNAI as included in the PCC rules, local operator policies, S-NSSAI, access technology being used by the UE 100, UPF 110 logical topology, and/or the like), and may determine to perform one or more of the following: continue using the current UPF(s); may select a new intermediate UPF 110 (or add/remove an intermediate UPF 110), if the UE 100 has moved out of the service area of the UPF 110 that was previously connecting to the (R)AN 105, while maintaining the UPF(s) acting as PDU session anchor; may trigger re-establishment of the PDU session to perform relocation/reallocation of the UPF 110 acting as PDU session anchor, e.g. the UE 100 has moved out of the service area of the anchor UPF 110 which is connecting to RAN 105.

In an example, the SMF 160 may send to the UPF 110 (e.g., new intermediate UPF 110) an N4 session establishment request 1030. In an example, if the SMF 160 may select a new UPF 110 to act as intermediate UPF 110-2 for the PDU session, or if the SMF 160 may select to insert an intermediate UPF 110 for a PDU session which may not have an intermediate UPF 110-2, an N4 session establishment request 1030 message may be sent to the new UPF 110, providing packet detection, data forwarding, enforcement and reporting rules to be installed on the new intermediate UPF. The PDU session anchor addressing information (on N9) for this PDU session may be provided to the intermediate UPF 110-2.

In an example, if a new UPF 110 is selected by the SMF 160 to replace the old (intermediate) UPF 110-2, the SMF 160 may include a data forwarding indication. The data forwarding indication may indicate to the UPF 110 that a second tunnel endpoint may be reserved for buffered DL data from the old I-UPF.

In an example, the new UPF 110 (intermediate) may send to SMF 160 an N4 session establishment response message 1030. In case the UPF 110 may allocate CN tunnel info, the UPF 110 may provide DL CN tunnel info for the UPF 110 acting as PDU session anchor and UL CN tunnel info (e.g., CN N3 tunnel info) to the SMF 160. If the data forwarding indication may be received, the new (intermediate) UPF 110 acting as N3 terminating point may send DL CN tunnel info for the old (intermediate) UPF 110-2 to the SMF 160. The SMF 160 may start a timer, to release the resource in the old intermediate UPF 110-2.

In an example, if the SMF 160 may selects a new intermediate UPF 110 for the PDU session or may remove the old I-UPF 110-2, the SMF 160 may send N4 session modification request message 1035 to PDU session anchor, PSA UPF 110-3, providing the data forwarding indication and DL tunnel information from new intermediate UPF 110.

In an example, if the new intermediate UPF 110 may be added for the PDU session, the (PSA) UPF 110-3 may begin to send the DL data to the new I-UPF 110 as indicated in the DL tunnel information.

In an example, if the service request may be triggered by the network, and the SMF 160 may remove the old I-UPF 110-2 and may not replace the old I-UPF 110-2 with the new I-UPF 110, the SMF 160 may include the data forwarding indication in the request. The data forwarding indication may indicate to the (PSA) UPF 110-3 that a second tunnel endpoint may be reserved for buffered DL data from the old I-UPF 110-2. In this case, the PSA UPF 110-3 may begin to buffer the DL data it may receive at the same time from the N6 interface.

In an example, the PSA UPF 110-3 (PSA) may send to the SMF 160 an N4 session modification response 1035. In an example, if the data forwarding indication may be received, the PSA UPF 110-3 may become as N3 terminating point and may send CN DL tunnel info for the old (intermediate) UPF 110-2 to the SMF 160. The SMF 160 may start a timer, to release the resource in old intermediate UPF 110-2 if there is one.

In an example, the SMF 160 may send to the old UPF 110-2 an N4 session modification request 1045 (e.g., may comprise new UPF 110 address, new UPF 110 DL tunnel ID, and/or the like). In an example, if the service request may be triggered by the network, and/or the SMF 160 may remove the old (intermediate) UPF 110-2, the SMF 160 may send the N4 session modification request message to the old (intermediate) UPF 110-2, and may provide the DL tunnel information for the buffered DL data. If the SMF 160 may allocate new I-UPF 110, the DL tunnel information is from the new (intermediate) UPF 110 may act as N3 terminating point. If the SMF 160 may not allocate a new I-UPF 110, the DL tunnel information may be from the new UPF 110 (PSA) 110-3 acting as N3 terminating point. The SMF 160 may start a timer to monitor the forwarding tunnel. In an example, the old (intermediate) UPF 110-2 may send N4 session modification response message to the SMF 160.

In an example, if the I-UPF 110-2 may be relocated and forwarding tunnel was established to the new I-UPF 110, the old (intermediate) UPF 110-2 may forward its buffered data to the new (intermediate) UPF 110 acting as N3 terminating point. In an example, if the old I-UPF 110-2 may be removed and the new I-UPF 110 may not be assigned for the PDU session and forwarding tunnel may be established to the UPF 110 (PSA) 110-3, the old (intermediate) UPF 110-2 may forward its buffered data to the UPF 110 (PSA) 110-3 acting as N3 terminating point.

In an example, the SMF 160 may send to the AMF 155 an N11 message 1060 e.g., a Nsmf_PDUSession_UpdateSM-Context response (comprising: N1 SM container (PDU session ID, PDU session re-establishment indication), N2 SM information (PDU session ID, QoS profile, CN N3 tunnel info, S-NSSAI), Cause), upon reception of the Nsmf_PDUSession_UpdateSMContext request with a cause including e.g., establishment of user plane resources. The SMF 160 may determine whether UPF 110 reallocation may be performed, based on the UE 100 location information, UPF 110 service area and operator policies. In an example, for a PDU session that the SMF 160 may determine to be served by the current UPF 110, e.g., PDU session anchor or intermediate UPF, the SMF 160 may generate N2 SM information and may send a Nsmf_PDUSession_Up-dateSMContext response 1060 to the AMF 155 to establish the user plane(s). The N2 SM information may contain information that the AMF 155 may provide to the RAN 105.

In an example, for a PDU session that the SMF 160 may determine as requiring a UPF 110 relocation for PDU session anchor UPF, the SMF 160 may reject the activation of UP of the PDU session by sending Nsmf_PDUSession-_UpdateSMContext response that may contain N1 SM container to the UE 100 via the AMF 155. The N1 SM container may include the corresponding PDU session ID and PDU session re-establishment indication.

Upon reception of the Namf_EventExposure_Notify from the AMF 155 to the SMF 160, with an indication that the UE 100 is reachable, if the SMF 160 may have pending DL data, the SMF 160 may invoke the Namf_Communication_N1N2MessageTransfer service operation to the AMF 155 to establish the user plane(s) for the PDU sessions. In an example, the SMF 160 may resume sending DL data notifications to the AMF 155 in case of DL data.

In an example, the SMF 160 may send a message to the AMF 155 to reject the activation of UP of the PDU session by including a cause in the Nsmf_PDUSession_UpdateSM-Context response if the PDU session may correspond to a LADN and the UE 100 may be outside the area of availability of the LADN, or if the AMF 155 may notify the SMF 160 that the UE 100 may be reachable for regulatory prioritized service, and the PDU session to be activated may not for a regulatory prioritized service; or if the SMF 160 may decide to perform PSA UPF 110-3 relocation for the requested PDU session.

In an example, the AMF 155 may send to the (R)AN 105 an N2 request message 1065 (e.g., N2 SM information received from SMF 160, security context, AMF 155 signaling connection ID, handover restriction list, MM NAS service accept, list of recommended cells/TAs/NG-RAN node identifiers). In an example, the RAN 105 may store the security context, AMF 155 signaling connection Id, QoS information for the QoS flows of the PDU sessions that may be activated and N3 tunnel IDs in the UE 100 RAN 105 context. In an example, the MM NAS service accept may include PDU session status in the AMF 155. If the activation of UP of a PDU session may be rejected by the SMF 160, the MM NAS service accept may include the PDU session ID and the reason why the user plane resources may not be activated (e.g. LADN not available). Local PDU session release during the session request procedure may be indicated to the UE 100 via the session Status.

In an example, if there are multiple PDU sessions that may involve multiple SMF 160s, the AMF 155 may not wait for responses from all SMF 160s before it may send N2 SM information to the UE 100. The AMF 155 may wait for all responses from the SMF 160s before it may send MM NAS service accept message to the UE 100.

In an example, the AMF 155 may include at least one N2 SM information from the SMF 160 if the procedure may be triggered for PDU session user plane activation. AMF 155 may send additional N2 SM information from SMF 160s in separate N2 message(s) (e.g. N2 tunnel setup request), if there is any. Alternatively, if multiple SMF 160s may be involved, the AMF 155 may send one N2 request message to (R)AN 105 after all the Nsmf_PDUSession_UpdateSM-Context response service operations from all the SMF 160s associated with the UE 100 may be received. In such case, the N2 request message may include the N2 SM information received in each of the Nsmf_PDUSession_UpdateSMCon-text response and PDU session ID to enable AMF 155 to associate responses to relevant SMF 160.

In an example, if the RAN 105 (e.g., NG RAN) node may provide the list of recommended cells/TAs/NG-RAN node identifiers during the AN release procedure, the AMF 155 may include the information from the list in the N2 request. The RAN 105 may use this information to allocate the RAN 105 notification area when the RAN 105 may decide to enable RRC inactive state for the UE 100.

If the AMF 155 may receive an indication, from the SMF 160 during a PDU session establishment procedure that the UE 100 may be using a PDU session related to latency sensitive services, for any of the PDU sessions established for the UE 100 and the AMF 155 has received an indication from the UE 100 that may support the CM-CONNECTED with RRC inactive state, then the AMF 155 may include the UE's RRC inactive assistance information. In an example, the AMF 155 based on network configuration, may include the UE's RRC inactive assistance information.

In an example, the (R)AN 105 may send to the UE 100 a message to perform RRC connection reconfiguration 1070 with the UE 100 depending on the QoS information for all the QoS flows of the PDU sessions whose UP connections may be activated and data radio bearers. In an example, the user plane security may be established.

In an example, if the N2 request may include a MM NAS service accept message, the RAN 105 may forward the MM NAS service accept to the UE 100. The UE 100 may locally delete context of PDU sessions that may not be available in 5GC.

In an example, if the N1 SM information may be transmitted to the UE 100 and may indicate that some PDU session(s) may be re-established, the UE 100 may initiate PDU session re-establishment for the PDU session(s) that may be re-established after the service request procedure may be complete.

In an example, after the user plane radio resources may be setup, the uplink data from the UE 100 may be forwarded to the RAN 105. The RAN 105 (e.g., NG-RAN) may send the uplink data to the UPF 110 address and tunnel ID provided.

In an example, the (R)AN 105 may send to the AMF 155 an N2 request Ack 1105 (e.g., N2 SM information (comprising: AN tunnel info, list of accepted QoS flows for the PDU sessions whose UP connections are activated, list of rejected QoS flows for the PDU sessions whose UP connections are activated)). In an example, the N2 request message may include N2 SM information(s), e.g. AN tunnel info. RAN 105 may respond N2 SM information with separate N2 message (e.g. N2 tunnel setup response). In an example, if multiple N2 SM information are included in the N2 request message, the N2 request Ack may include multiple N2 SM information and information to enable the AMF 155 to associate the responses to relevant SMF 160.

In an example, the AMF 155 may send to the SMF 160 a Nsmf_PDUSession_UpdateSMContext request 1110 (N2 SM information (AN tunnel info), RAT type) per PDU session. If the AMF 155 may receive N2 SM information (one or multiple) from the RAN 105, then the AMF 155 may forward the N2 SM information to the relevant SMF 160. If the UE 100 time zone may change compared to the last reported UE 100 Time Zone then the AMF 155 may include the UE 100 time zone IE in the Nsmf_PDUSession_Up-dateSMContext request message.

In an example, if dynamic PCC is deployed, the SMF 160 may initiate notification about new location information to the PCF 135 (if subscribed) by invoking an event exposure notification operation (e.g., a Nsmf_EventExposure_Notify service operation). The PCF 135 may provide updated policies by invoking a policy control update notification message 1115 (e.g., a Npcf_SMPolicyControl_UpdateNo-tify operation).

In an example, if the SMF 160 may select a new UPF 110 to act as intermediate UPF 110 for the PDU session, the SMF 160 may initiates an N4 session modification procedure 1120 to the new I-UPF 110 and may provide AN tunnel info. The downlink data from the new I-UPF 110 may be forwarded to RAN 105 and UE 100. In an example, the UPF 110 may send to the SMF 160, an N4 session modification response 1120. In an example, the SMF 160 may send to the AMF 155, a Nsmf_PDUSession_UpdateSMContext response 1140.

In an example, if forwarding tunnel may be established to the new I-UPF 110 and if the timer SMF 160 set for forwarding tunnel may be expired, the SMF 160 may sends N4 session modification request 1145 to new (intermediate) UPF 110 acting as N3 terminating point to release the forwarding tunnel. In an example, the new (intermediate) UPF 110 may send to the SMF 160 an N4 session modification response 1145. In an example, the SMF 160 may send to the PSA UPF 110-3 an N4 session modification request 1150, or N4 session release request. In an example, if the SMF 160 may continue using the old UPF 110-2, the SMF 160 may send an N4 session modification request 1155, providing AN tunnel info. In an example, if the SMF 160 may select a new UPF 110 to act as intermediate UPF 110, and the old UPF 110-2 may not be PSA UPF 110-3, the SMF 160 may initiate resource release, after timer expires, by sending an N4 session release request (release cause) to the old intermediate UPF 110-2.

In an example, the old intermediate UPF 110-2 may send to the SMF 160 an N4 session modification response or N4 session release response 1155. The old UPF 110-2 may acknowledge with the N4 session modification response or N4 session release response message to confirm the modification or release of resources. The AMF 155 may invoke the Namf_EventExposure_Notify service operation to notify the mobility related events, after this procedure may complete, towards the NFs that may have subscribed for the events. In an example, the AMF 155 may invoke the Namf_EventExposure_Notify towards the SMF 160 if the SMF 160 had subscribed for UE 100 moving into or out of area of interest and if the UE's current location may indicate that it may be moving into or moving outside of the area of interest subscribed, or if the SMF 160 had subscribed for LADN DNN and if the UE 100 may be moving into or outside of an area where the LADN is available, or if the UE 100 may be in MICO mode and the AMF 155 had notified an SMF 160 of the UE 100 being unreachable and that SMF 160 may not send DL data notifications to the AMF 155, and the AMF 155 may informs the SMF 160 that the UE 100 is reachable, or if the SMF 160 had subscribed for UE 100 reachability status, then the AMF 155 may notify the UE 100 reachability.

Figure 12:
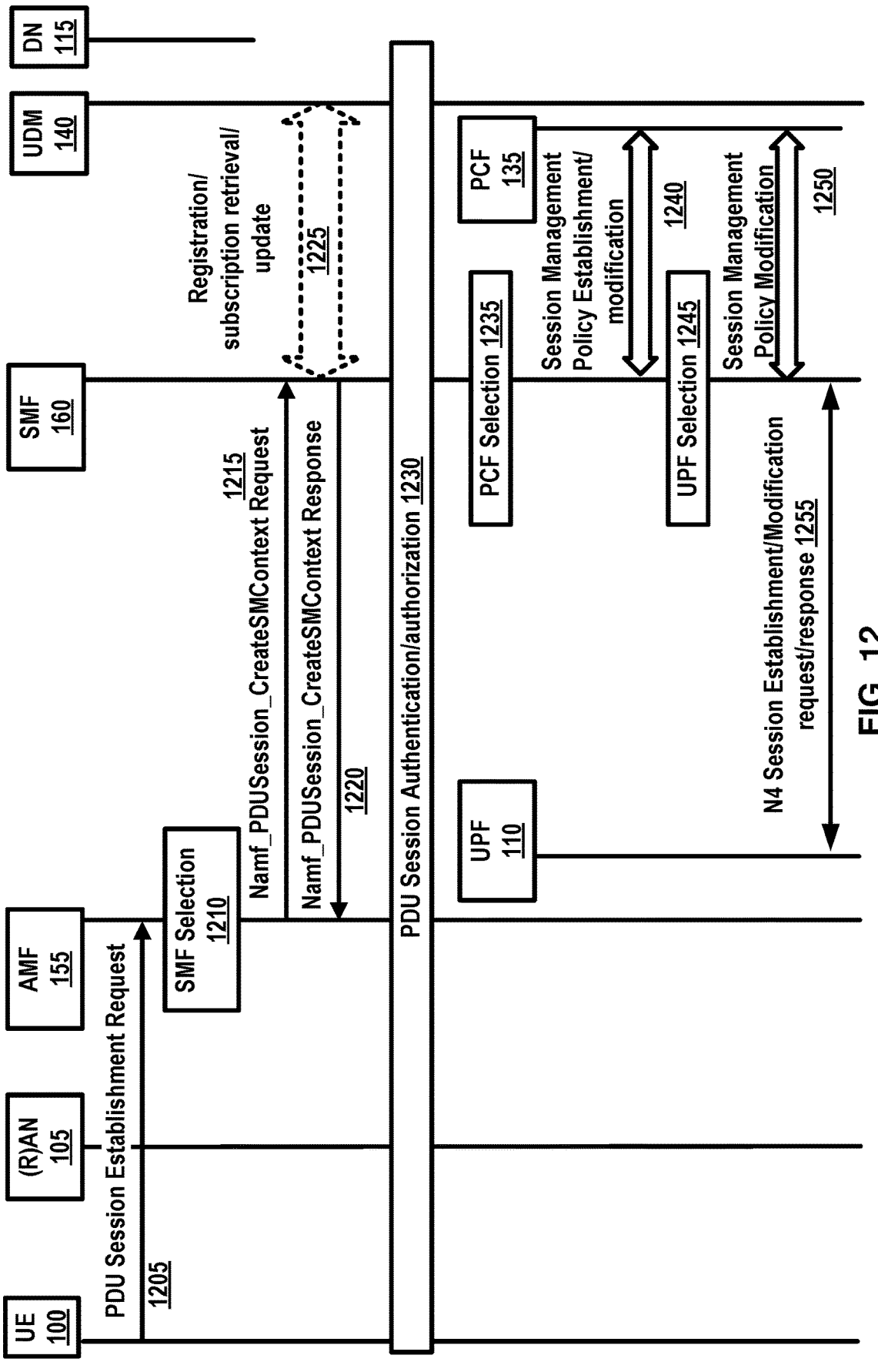
FIG. 12 is an example call flow as per an aspect of an embodiment of the present disclosure.
Figure 13:
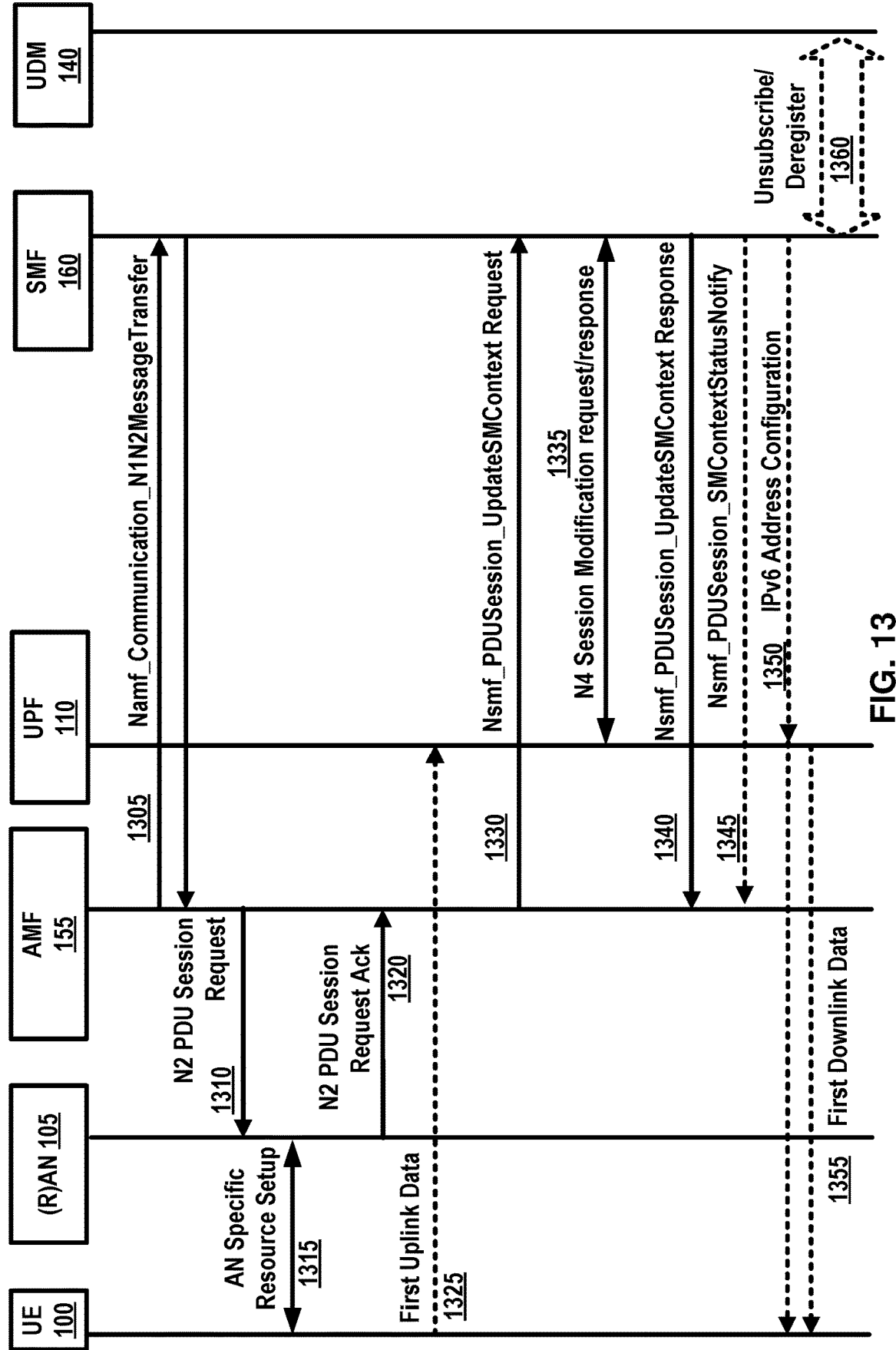
FIG. 13 is an example call flow as per an aspect of an embodiment of the present disclosure.
Figure 14:
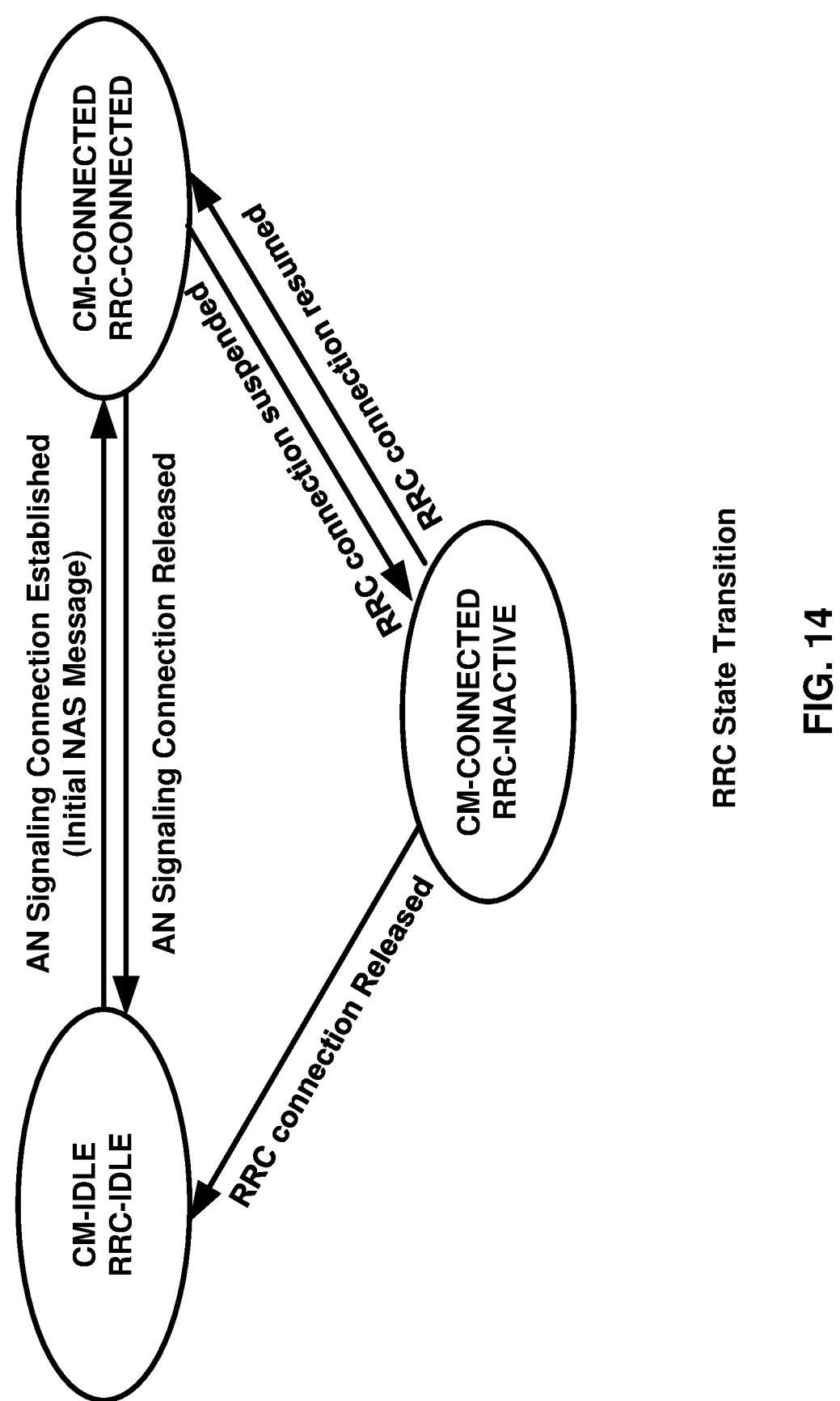
FIG. 14 is an example radio resource control (RRC) state transition aspect as per an aspect of an embodiment of the present disclosure.

An example PDU session establishment procedure depicted in FIG. 12 and FIG. 13. In an example embodiment, when the PDU session establishment procedure may be employed, the UE 100 may send to the AMF 155 a NAS Message 1205 (or a SM NAS message) comprising NSSAI, S-NSSAI (e.g., requested S-NSSAI, allowed S-NSSAI, subscribed S-NSSAI, and/or the like), DNN, PDU session ID, request type, old PDU session ID, N1 SM container (PDU session establishment request), and/or the like. In an example, the UE 100, in order to establish a new PDU session, may generate a new PDU session ID. In an example, when emergency service may be required and an emergency PDU session may not already be established, the UE 100 may initiate the UE 100 requested PDU session establishment procedure with a request type indicating emergency request. In an example, the UE 100 may initiate the UE 100 requested PDU session establishment procedure by the transmission of the NAS message containing a PDU session establishment request within the N1 SM container. The PDU session establishment request may include a PDU type, SSC mode, protocol configuration options, and/or the like. In an example, the request type may indicate initial request if the PDU session establishment is a request to establish the new PDU session and may indicate existing PDU session if the request refers to an existing PDU session between 3GPP access and non-3GPP access or to an existing PDN connection in EPC. In an example, the request type may indicate emergency request if the PDU session establishment may be a request to establish a PDU session for emergency services. The request type may indicate existing emergency PDU session if the request refers to an existing PDU session for emergency services between 3GPP access and non-3GPP access. In an example, the NAS message sent by the UE 100 may be encapsulated by the AN in a N2 message towards the AMF 155 that may include user location information and access technology type information. In an example, the PDU session establishment request message may contain SM PDU DN request container containing information for the PDU session authorization by the external DN. In an example, if the procedure may be triggered for SSC mode 3 operation, the UE 100 may include the old PDU session ID which may indicate the PDU session ID of the on-going PDU session to be released, in the NAS message. The old PDU session ID may be an optional parameter which may be included in this case. In an example, the AMF 155 may receive from the AN the NAS message (e.g., NAS SM message) together with user location information (e.g. cell ID in case of the RAN 105). In an example, the UE 100 may not trigger a PDU session establishment for a PDU session corresponding to a LADN when the UE 100 is outside the area of availability of the LADN.

In an example, the AMF 155 may determine that the NAS message or the SM NAS message may correspond to the request for the new PDU session based on that request type indicates initial request and that the PDU session ID may not be used for any existing PDU session(s) of the UE 100. If the NAS message does not contain an S-NSSAI, the AMF 155 may determine a default S-NSSAI for the requested PDU session either according to the UE 100 subscription, if it may contain only one default S-NSSAI, or based on operator policy. In an example, the AMF 155 may perform SMF 160 selection 1210 and select an SMF 160. If the request type may indicate initial request or the request may be due to handover from EPS, the AMF 155 may store an association of the S-NSSAI, the PDU session ID and a SMF 160 ID. In an example, if the request type is initial request and if the old PDU session ID indicating the existing PDU session may be contained in the message, the AMF 155 may select the SMF 160 and may store an association of the new PDU session ID and the selected SMF 160 ID.

In an example, the AMF 155 may send to the SMF 160, an N11 message 1215, e.g., Nsmf_PDUSession_CreateSM-Context request (comprising: SUPI or PEI, DNN, S-NSSAI, PDU session ID, AMF 155 ID, request type, N1 SM container (PDU session establishment request), user location information, access type, PEI, GPSI), or Nsmf_PDUSession_UpdateSMContext request (SUPI, DNN, S-NSSAI, PDU session ID, AMF 155 ID, request type, N1 SM container (PDU session establishment request), user location information, access type, RAT type, PEI). In an example, if the AMF 155 may not have an association with the SMF 160 for the PDU session ID provided by the UE 100 (e.g. when request type indicates initial request), the AMF 155 may invoke the Nsmf_PDUSession_CreateSMContext request, but if the AMF 155 already has an association with an SMF 160 for the PDU session ID provided by the UE 100 (e.g. when request type indicates existing PDU session), the AMF 155 may invoke the Nsmf_PDUSession_UpdateSMContext request. In an example, the AMF 155 ID may be the UE's GUAMI which uniquely identifies the AMF 155 serving the UE 100. The AMF 155 may forward the PDU session ID together with the N1 SM container containing the PDU session establishment request received from the UE 100. The AMF 155 may provide the PEI instead of the SUPI when the UE 100 has registered for emergency services without providing the SUPI. In case the UE 100 has registered for emergency services but has not been authenticated, the AMF 155 may indicate that the SUPI has not been authenticated.

In an example, if the request type may indicate neither emergency request nor existing emergency PDU session and, if the SMF 160 has not yet registered and subscription data may not be available, the SMF 160 may register with the UDM 140, and may retrieve subscription data 1225 and subscribes to be notified when subscription data may be modified. In an example, if the request type may indicate existing PDU session or existing emergency PDU session, the SMF 160 may determine that the request may be due to handover between 3GPP access and non-3GPP access or due to handover from EPS. The SMF 160 may identify the existing PDU session based on the PDU session ID. The SMF 160 may not create a new SM context but instead may update the existing SM context and may provide the representation of the updated SM context to the AMF 155 in the response. if the request type may be initial request and if the old PDU session ID may be included in Nsmf_PDUSession_CreateSMContext request, the SMF 160 may identify the existing PDU session to be released based on the old PDU session ID.

In an example, the SMF 160 may send to the AMF 155, the N11 message response 1220, e.g., either a PDU session create/update response, Nsmf_PDUSession_CreateSMContext response 1220 (cause, SM context ID or N1 SM container (PDU session reject(cause))) or a Nsmf_PDUSession_UpdateSMContext response.

In an example, if the SMF 160 may perform secondary authorization/authentication 1230 during the establishment of the PDU session by a DN-AAA server, the SMF 160 may select a UPF 110 and may trigger a PDU session establishment authentication/authorization.

In an example, if the request type may indicate initial request, the SMF 160 may select an SSC mode for the PDU session. The SMF 160 may select one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For Unstructured PDU type the SMF 160 may allocate an IPv6 prefix for the PDU session and N6 point-to-point tunneling (based on UDP/IPv6).

In an example, if dynamic PCC is deployed, the may SMF 160 performs PCF 135 selection 1235. If the request type indicates existing PDU session or existing emergency PDU session, the SMF 160 may use the PCF 135 already selected for the PDU session. If dynamic PCC is not deployed, the SMF 160 may apply local policy.

In an example, the SMF 160 may perform a session management policy establishment procedure 1240 to establish a PDU session with the PCF 135 and may get the default PCC Rules for the PDU session. The GPSI may be included if available at the SMF 160. If the request type in 1215 indicates existing PDU session, the SMF 160 may notify an event previously subscribed by the PCF 135 by a session management policy modification procedure and the PCF 135 may update policy information in the SMF 160. The PCF 135 may provide authorized session-AMBR and the authorized 5QI and ARP to SMF 160. The PCF 135 may subscribe to the IP allocation/release event in the SMF 160 (and may subscribe other events).

In an example, the PCF 135, based on the emergency DNN, may set the ARP of the PCC rules to a value that may be reserved for emergency services.

In an example, if the request type in 1215 indicates initial request, the SMF 160 may select an SSC mode for the PDU session. The SMF 160 may select 1245 one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For unstructured PDU type the SMF 160 may allocate an IPv6 prefix for the PDU session and N6 point-to-point tunneling (e.g., based on UDP/IPv6). In an example, for Ethernet PDU type PDU session, neither a MAC nor an IP address may be allocated by the SMF 160 to the UE 100 for this PDU session.

In an example, if the request type in 1215 is existing PDU session, the SMF 160 may maintain the same IP address/prefix that may be allocated to the UE 100 in the source network.

In an example, if the request type in 1215 indicates existing PDU session referring to an existing PDU session moved between 3GPP access and non-3GPP access, the SMF 160 may maintain the SSC mode of the PDU session, e.g., the current PDU session Anchor and IP address. In an example, the SMF 160 may trigger e.g. new intermediate UPF 110 insertion or allocation of a new UPF 110. In an example, if the request type indicates emergency request, the SMF 160 may select 1245 the UPF 110 and may select SSC mode 1.

In an example, the SMF 160 may perform a session management policy modification 1250 procedure to report some event to the PCF 135 that has previously subscribed. If request type is initial request and dynamic PCC is deployed and PDU type is IPv4 or IPv6, the SMF 160 may notify the PCF 135 (that has previously subscribed) with the allocated UE 100 IP address/prefix.

In an example, the PCF 135 may provide updated policies to the SMF 160. The PCF 135 may provide authorized session-AMBR and the authorized 5QI and ARP to the SMF 160.

In an example, if request type indicates initial request, the SMF 160 may initiate an N4 session establishment procedure 1255 with the selected UPF 110. The SMF 160 may initiate an N4 session modification procedure with the selected UPF 110. In an example, the SMF 160 may send an N4 session establishment/modification request 1255 to the UPF 110 and may provide packet detection, enforcement, reporting rules, and/or the like to be installed on the UPF 110 for this PDU session. If CN tunnel info is allocated by the SMF 160, the CN tunnel info may be provided to the UPF 110. If the selective user plane deactivation is required for this PDU session, the SMF 160 may determine the Inactivity Timer and may provide it to the UPF 110. In an example, the UPF 110 may acknowledges by sending an N4 session establishment/modification response 1255. If CN tunnel info is allocated by the UPF, the CN tunnel info may be provided to SMF 160. In an example, if multiple UPFs are selected for the PDU session, the SMF 160 may initiate N4 session establishment/modification procedure 1255 with each UPF 110 of the PDU session.

In an example, the SMF 160 may send to the AMF 155 an Namf_Communication_N1N2MessageTransfer 1305 message (comprising PDU session ID, access type, N2 SM information (PDU session ID, QFI(s), QoS profile(s), CN tunnel info, S-NSSAI, session-AMBR, PDU session type, and/or the like), N1 SM container (PDU session establishment accept (QoS Rule(s), selected SSC mode, S-NSSAI, allocated IPv4 address, interface identifier, session-AMBR, selected PDU session type, and/or the like))). In case of multiple UPFs are used for the PDU session, the CN tunnel info may comprise tunnel information related with the UPF 110 that terminates N3. In an example, the N2 SM information may carry information that the AMF 155 may forward to the (R)AN 105 (e.g., the CN tunnel info corresponding to the core network address of the N3 tunnel corresponding to the PDU session, one or multiple QoS profiles and the corresponding QFIs may be provided to the (R)AN 105, the PDU session ID may be used by AN signaling with the UE 100 to indicate to the UE 100 the association between AN resources and a PDU session for the UE 100, and/or the like). In an example, a PDU session may be associated to an S-NSSAI and a DNN. In an example, the N1 SM container may contain the PDU session establishment accept that the AMF 155 may provide to the UE 100. In an example, multiple QoS rules and QoS profiles may be included in the PDU session establishment accept within the N1 SM and in the N2 SM information. In an example, the Namf_Communication_N1N2MessageTransfer 1305 may further comprise the PDU session ID and information allowing the AMF 155 to know which access towards the UE 100 to use.

In an example, the AMF 155 may send to the (R)AN 105 an N2 PDU session request 1310 (comprising N2 SM information, NAS message (PDU session ID, N1 SM container (PDU session establishment accept, and/or the like))). In an example, the AMF 155 may send the NAS message 1310 that may comprise PDU session ID and PDU session establishment accept targeted to the UE 100 and the N2 SM information received from the SMF 160 within the N2 PDU session request 1310 to the (R)AN 105.

In an example, the (R)AN 105 may issue AN specific signaling exchange 1315 with the UE 100 that may be related with the information received from SMF 160. In an example, in case of a 3GPP RAN 105, an RRC connection reconfiguration procedure may take place with the UE 100 to establish the necessary RAN 105 resources related to the QoS Rules for the PDU session request 1310. In an example, (R)AN 105 may allocate (R)AN 105 N3 tunnel information for the PDU session. In case of dual connectivity, the master RAN 105 node may assign some (zero or more) QFIs to be setup to a master RAN 105 node and others to the secondary RAN 105 node. The AN tunnel info may comprise a tunnel endpoint for each involved RAN 105 node, and the QFIs assigned to each tunnel endpoint. A QFI may be assigned to either the master RAN 105 node or the secondary RAN 105 node. In an example, (R)AN 105 may forward the NAS message 1310 (PDU session ID, N1 SM container (PDU session establishment accept)) to the UE 100. The (R)AN 105 may provide the NAS message to the UE 100 if the necessary RAN 105 resources are established and the allocation of (R)AN 105 tunnel information are successful.

In an example, the N2 PDU session response 1320 may comprise a PDU session ID, cause, N2 SM information (PDU session ID, AN tunnel info, list of accepted/rejected QFI(s)), and/or the like. In an example, the AN tunnel info may correspond to the access network address of the N3 tunnel corresponding to the PDU session.

In an example, the AMF 155 may forward the N2 SM information received from (R)AN 105 to the SMF 160 via a Nsmf_PDUSession_UpdateSMContext request 1330 (comprising: N2 SM information, request type, and/or the like). In an example, if the list of rejected QFI(s) is included in N2 SM information, the SMF 160 may release the rejected QFI(s) associated QoS profiles.

In an example, the SMF 160 may initiate an N4 session modification procedure 1335 with the UPF 110. The SMF 160 may provide AN tunnel info to the UPF 110 as well as the corresponding forwarding rules. In an example, the UPF 110 may provide an N4 session modification response 1335 to the SMF 160160.

In an example, the SMF 160 may send to the AMF 155 an Nsmf_PDUSession_UpdateSMContext response 1340 (Cause). In an example, the SMF 160 may subscribe to the UE 100 mobility event notification from the AMF 155 (e.g. location reporting, UE 100 moving into or out of area of interest), after this step by invoking Namf_EventExposure_Subscribe service operation. For LADN, the SMF 160 may subscribe to the UE 100 moving into or out of LADN service area event notification by providing the LADN DNN as an indicator for the area of interest. The AMF 155 may forward relevant events subscribed by the SMF 160.

In an example, the SMF 160 may send to the AMF 155, a Nsmf_PDUSession_SMContextStatusNotify (release) 1345. In an example, if during the procedure, any time the PDU session establishment is not successful, the SMF 160 may inform the AMF 155 by invoking Nsmf_PDUSession_SMContextStatusNotify(release) 1345. The SMF 160 may releases any N4 session(s) created, any PDU session address if allocated (e.g. IP address) and may release the association with the PCF 135.

In an example, in case of PDU type IPv6, the SMF 160 may generate an IPv6 Router Advertisement 1350 and may send it to the UE 100 via N4 and the UPF 110.

In an example, if the PDU session may not be established, the SMF 160 may unsubscribe 1360 to the modifications of session management subscription data for the corresponding (SUPI, DNN, S-NSSAI), using Nudm_SDM_Unsubscribe (SUPI, DNN, S-NSSAI), if the SMF 160 is no more handling a PDU session of the UE 100 for this (DNN, S-NSSAI). In an example, if the PDU session may not be established, the SMF 160 may deregister 1360 for the given PDU session using Nudm_UECM_Deregistration (SUPI, DNN, PDU session ID).

Figure 15:
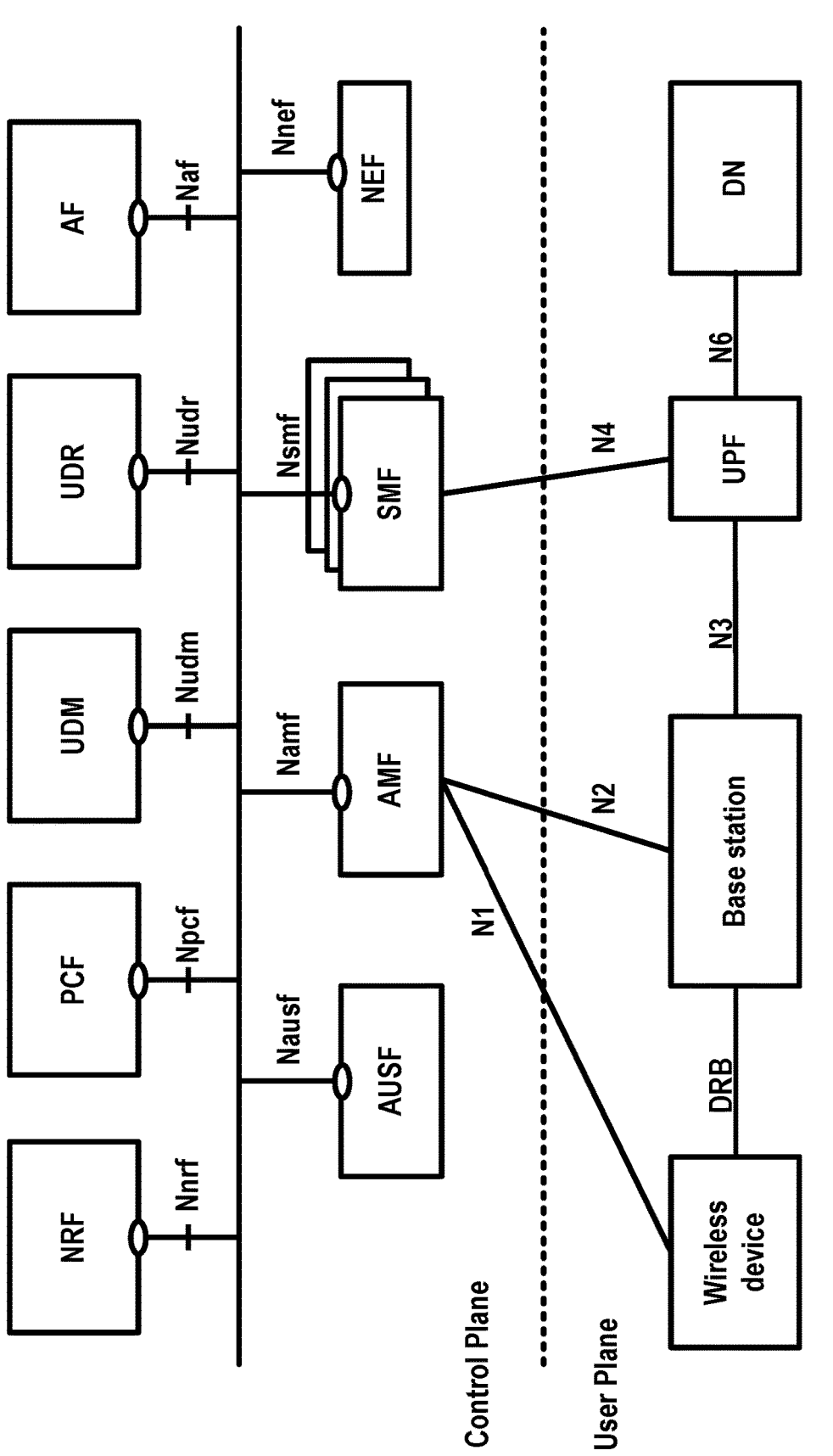
FIG. 15 illustrates a service-based architecture for a 5G network regarding interaction between a control plane (CP) and a user plane (UP).

FIG. 15 illustrates a service-based architecture for a 5G network regarding a control plane (CP) and a user plane (UP) interaction. This illustration may depict logical connections between nodes and functions, and its illustrated connections may not be interpreted as direct physical connections. A wireless device may form a radio access network connection with a bases station, which is connected to a User Plane (UP) Function (UPF) over a network interface providing a defined interface such as an N3 interface. The UPF may provide a logical connection to a data network (DN) over a network interface such as an N6 interface. The radio access network connection between the wireless device and the base station may be referred to as a data radio bearer (DRB).

The DN may be a data network used to provide an operator service, third party service such as the Internet, IP multimedia subsystem (IMS), augmented reality (AR), virtual reality (VR). In some embodiments DN may represent an edge computing network or resource, such as a mobile edge computing (MEC) network.

The wireless device also connects to the AMF through a logical N1 connection. The AMF may be responsible for authentication and authorization of access requests, as well as mobility management functions. The AMF may perform other roles and functions. In a service-based view, AMF may communicate with other core network control plane functions through a service-based interface denoted as Namf.

The SMF is a network function that may be responsible for the allocation and management of IP addresses that are assigned to a wireless device as well as the selection of a UPF for traffic associated with a particular session of the wireless device. There will be typically multiple SMFs in the network, each of which may be associated with a respective group of wireless devices, base stations or UPFs. The SMF may communicate with other core network functions, in a service based view, through a service based interface denoted as Nsmf. The SMF may also connect to a UPF through a logical interface such as network interface N4.

The authentication server function (AUSF) may provide authentication services to other network functions over a service based Nausf interface. A network exposure function (NEF) can be deployed in the network to allow servers, functions and other entities such as those outside a trusted domain (operator network) to have exposure to services and capabilities within the network. In one such example, the NEF may act like a proxy between an external application server (AS) outside the illustrated network and network functions such as the PCF, the SMF, the UDM and the AMF. The external AS may provide information that may be of use in the setup of the parameters associated with a data session. The NEF may communicate with other network functions through a service based Nnef network interface. The NEF may have an interface to non-3GPP functions.

The Network Repository Function (NRF) may provide network service discovery functionality. The NRF may be specific to the Public Land Mobility Network (PLMN) or network operator, with which it is associated. The service discovery functionality can allow network functions and wireless devices connected to the network to determine where and how to access existing network functions.

The PCF may communicate with other network functions over a service based Npcf interface, and may be used to provide policy and rules to other network functions, including those within the control plane. Enforcement and application of the policies and rules may not be responsibility of the PCF. The responsibility of the functions to which the PCF transmits the policy may be responsibility of the AMF or the SMF. In one such example, the PCF may transmit policy associated with session management to the SMF. This may be used to allow for a unified policy framework with which network behavior can be governed.

The UDM may present a service based Nudm interface to communicate with other network functions. The UDM may provide data storage facilities to other network functions. Unified data storage may allow for a consolidated view of network information that may be used to ensure that the most relevant information can be made available to different network functions from a single resource. This may allow implementation of other network functions easier, as they may not need to determine where a particular type of data is stored in the network. The UDM may employ an interface, such as Nudr to connect to the UDR. The PCF may be associated with the UDM.

The PCF may have a direct interface to the UDR or may use Nudr interface to connection with UDR. The UDM may receive requests to retrieve content stored in the UDR, or requests to store content in the UDR. The UDM may be responsible for functionality such as the processing of credentials, location management and subscription management. The UDR may also support authentication credential processing, user identification handling, access authorization, registration/mobility management, subscription management, and short message service (SMS) management. The UDR may be responsible for storing data provided by the UDM. The stored data is associated with policy profile information (which may be provided by PCF) that governs the access rights to the stored data. In some embodiments, the UDR may store policy data, as well as user subscription data which may include any or all of subscription identifiers, security credentials, access and mobility related subscription data and session related data.

The Application Function (AF) may represent the non-data plane (also referred to as the non-user plane) functionality of an application deployed within a network operator domain and within a 3GPP compliant network. The AF may in internal application server (AS). The AF may interact with other core network functions through a service based Naf interface, and may access network capability exposure information, as well as provide application information for use in decisions such as traffic routing. The AF can also interact with functions such as the PCF to provide application specific input into policy and policy enforcement decisions. In many situations, the AF may not provide network services to other network functions. The AF may be often viewed as a consumer or user of services provided by other network functions. An application (application server) outside of the trusted domain (operator network), may perform many of the same functions as AF through the use of NEF.

The wireless device may communicate with network functions that are in the core network control plane (CN-UP), and the core network user plane (CN-CP). The UPF and the data network (DN) is a part of the CN-UP. The DN may be out of core network domain (cellular network domain). In the illustration (FIG. 15), base station locates in CP-UP side. The base station may provide connectivity both for the CN-CP & CN-UP. AMF, SMF, AUSF, NEF, NRF, PCF, and UDM may be functions that reside within the CN-CP, and are often referred to as control plane functions. If the AF resides in the trusted domain, the AF may communicate with other functions within CN-CP directly via the service based Naf interface. If the AF resides outside of the trusted domain, the AM may communicate with other functions within CN-CP indirectly via the NEF.

Figure 16:
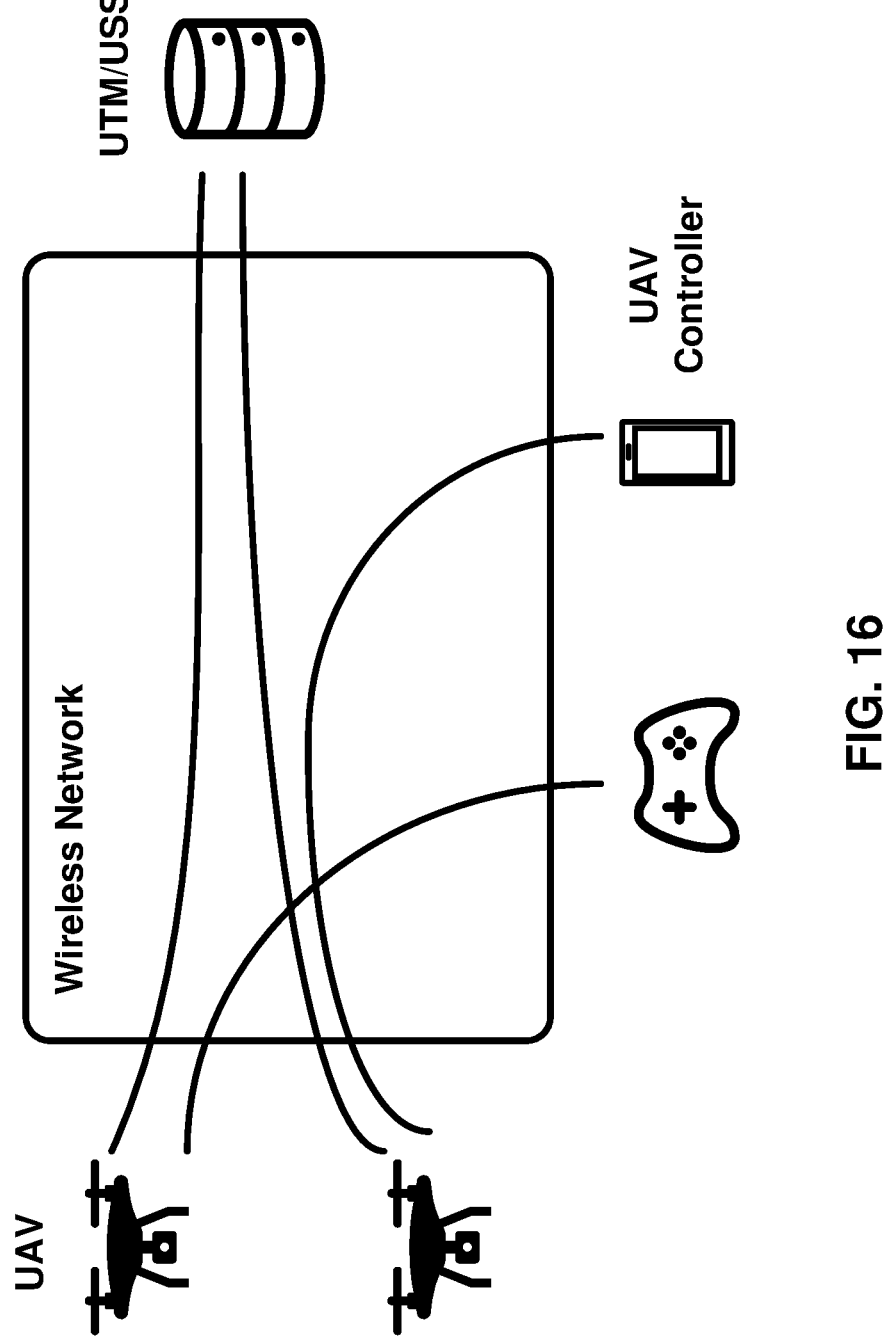
FIG. 16 illustrates an example architecture of an unmanned and/or uncrewed aerial system (UAS).

An unmanned and/or uncrewed aerial vehicle (UAV) may be an aircraft without a human pilot or crew on board (e.g., uncrewed) and/or without any passengers. An unmanned and/or uncrewed aerial system (UAS) may be a system needed to operate the UAV. As illustrated in FIG. 16, the UAS may comprise the UAV, a ground control system (e.g., UAV controller), a camera, a positioning system, and/or any other suitable equipment for operating the UAS. A wireless network (e.g., cellular network, 4G cellular network, 5G cellular network) may enable the ground control system (e.g., UAV controller, UTM, USS) to communicate with the UAV may be one of the components of the UAS.

Figure 17:
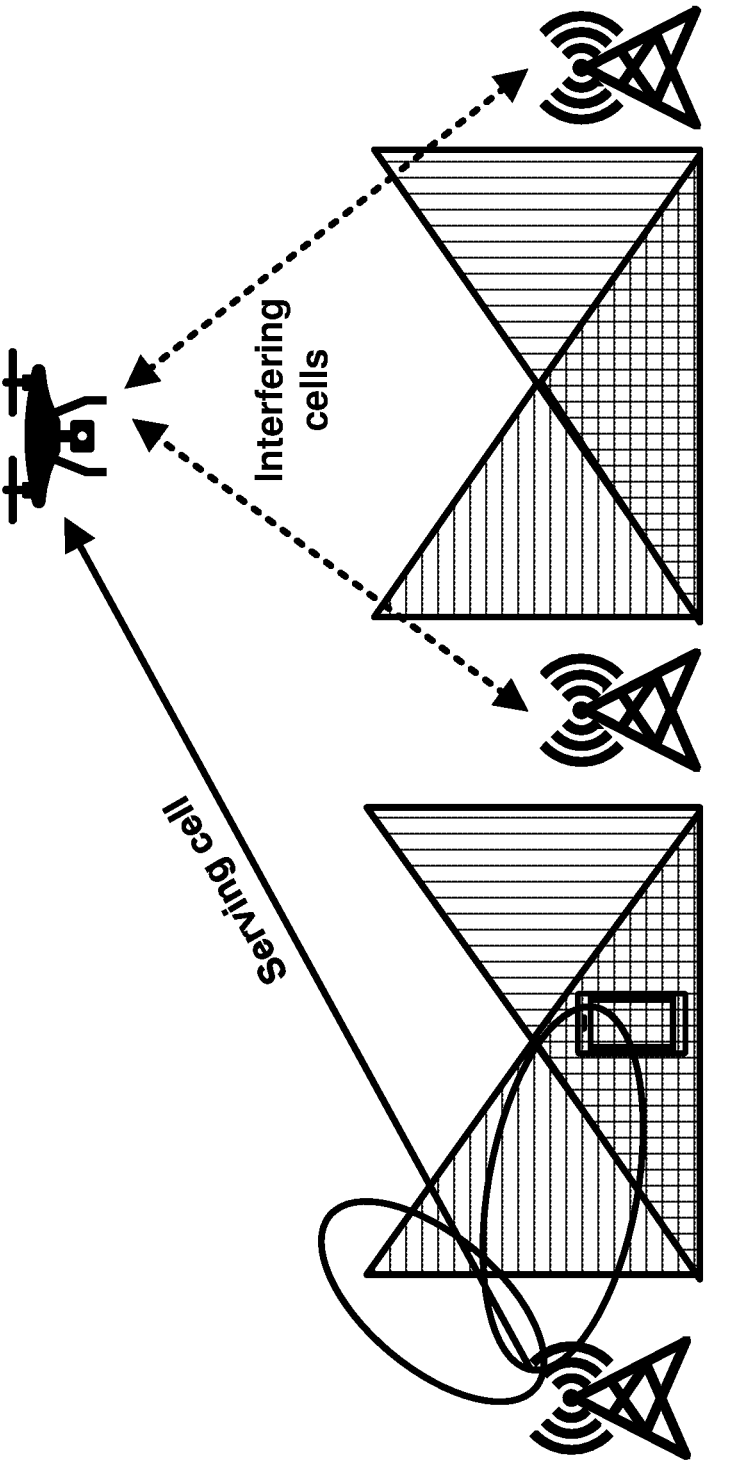
FIG. 17 illustrates an example scenario how an unmanned and/or uncrewed aerial vehicle (UAV) interacts with base stations regarding interference.

In an example, a UAV may be a wireless device. The wireless device may be an aerial wireless device. The wireless device may fly above the ground. As illustrated in FIG. 17, the wireless device may experience high line-of-sight (LOS) propagation probability. The wireless device may receive downlink (e.g., from a base station to the wireless device) interference from a larger number of cells than a typical terrestrial wireless device does. In the downlink direction, there may be higher probability that the number of neighboring cells causing high level of downlink interference at the wireless device than in the case of terrestrial wireless device. In an example, 16 cells causing high level of downlink direction interference may be observed by the wireless device at heights of 50 m or above. In an example, antennas of a base station (e.g., eNB, gNB) may be down tilted to serve terrestrial wireless devices. The wireless device may locate above a height of the antennas of the base station. The wireless devices may be served by side lobes of the antennas of the base station. The wireless device may see a stronger signal from a faraway base stations than the one that is geographically closest. The wireless devices may be served by a faraway base station instead of the closest one. Downlink direction pathloss and uplink direction pathloss for the aerial wireless device may differ in some scenarios where reciprocity does not hold (e.g., due to different side lobe orientations in uplink and downlink, or different channel characteristic in a frequency domain division deployment (FDD).

Base stations of the wireless network and wireless devices may employ radio access network (RAN) functions for a communication service (e.g., UAS, UAV, unmanned and/or uncrewed aerial service). Base stations and wireless devices may support radio access network (RAN) functions for the service (e.g., UAS, UAV). The RAN functions for the service may relate to aerial user equipment (UE) communication. In an example, the aerial communication service may be an aerial user equipment (UE) communication. The aerial communication service may support the UAS. The RAN functions for the aerial communication service may comprise a height-based measurement reporting, an interference detection for the aerial UE communication, an interference mitigation for the aerial UE communication, a flight path information reporting, a location reporting for the aerial UE communication, and/or the like.

In an example, the base station may send an RRC message (e.g., RRC configuration message, RRC reconfiguration message) to a wireless device. The RRC message may comprise one or more measurement events regarding the height-based measurement reporting. The one or more measurement event may indicate to the wireless device, a height threshold for the height-based measurement reporting. The wireless device may receive the measurement event comprising the height threshold. The wireless device may send a height report if an altitude of the wireless device is above or below the height threshold. The height report may comprise height of the wireless device, a location of the wireless device, and/or the like.

If received signaling power (e.g. RSRP) of multiple neighboring cells are above certain levels for a wireless device, the wireless device may experience or introduce interference. For interference detection, the base station may configure radio resource management (RRM) event that triggers measurement report when individual (per cell) RSRP values for a configured number of cells (e.g., 8, 16) fulfill the configured event. The configured event may be for the interference detection. The RRM event may be A3, A4 or A5. The wireless device may send a measurement report in response to determine that the RRM event occurs.

In an example, for the interference mitigation, the base station may configure with a wireless device specific alpha parameter for physical uplink shared channel (PUSCH) power control. The base station may send a radio resource control (RRC) message comprising the alpha parameter for the PUSCH power control. If a wireless device receives the dedicated alpha parameter (e.g., alpha-UE) from the base station, the wireless may apply the dedicated alpha parameter instead of a common alpha parameter.

In an example, a base station may request to a wireless device to report flight path information by sending a user equipment information request message. The flight path information may comprise a number of waypoints defined as 3D locations. The user equipment information message may indicate a maximum number of waypoints and/or whether timestamps are required for the waypoints. The wireless device may receive the user equipment information message. If the wireless device is available to report the flight path, the wireless device may send a user equipment information response message to the base station. The user equipment response message may comprise one or more waypoints and one or more timestamps associated with the one or more waypoints. The base station may use the flight path information for congestion prediction or resource handling to mitigate interference.

In an example, for the location reporting for the aerial UE communication, the base station may request to a wireless device to include a horizontal and vertical speed of the wireless device for location information reporting. The wireless device may send location information reporting to the base station. The location information reporting may comprise the horizontal speed, the vertical speed, and/or the like. The location information may further comprise height of the wireless device.

Figure 18:
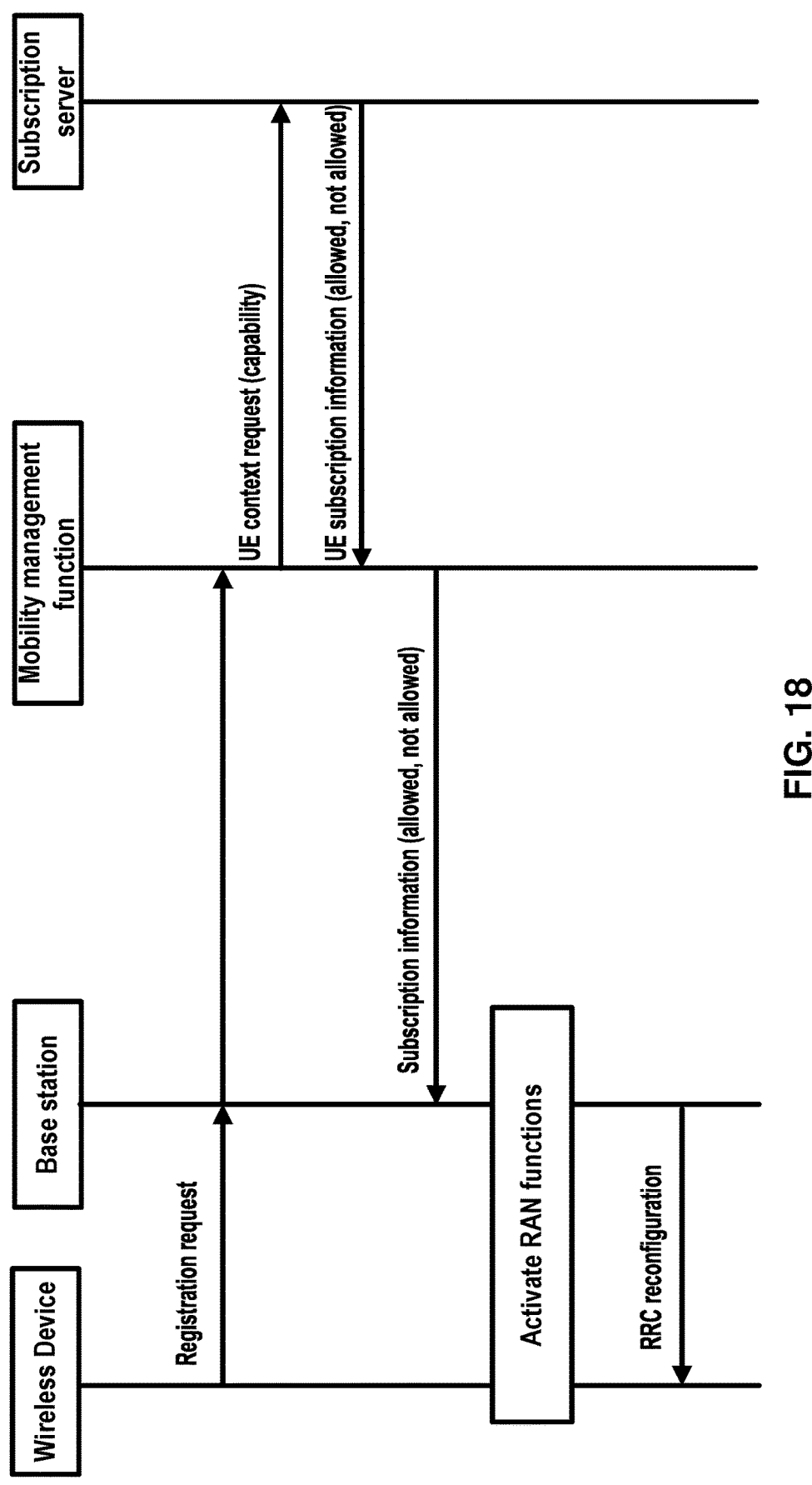
FIG. 18 illustrates an example procedure for an activation RAN functions for one or more specific services based on subscription information.

FIG. 18 illustrates an example procedure for an activation RAN functions for one or more specific services based on subscription information. The activation RAN functions may be enabling the RAN functions by a base station with a wireless device. In an example, a wireless device may send a registration request message to a mobility management function via the base station. The registration request message may be an attach request message. The registration request message may comprise one or more capabilities for the one or more services. The mobility management function may be a mobility management entity (MME) if the wireless device attaches to an 4G evolved packet system (EPS) via the base station. The mobility management function may be an AMF if the wireless device registers to an 5G system via the base station. If the mobility management function receives the registration request message, the mobility management function may send a user equipment (UE) context request message to a subscription server (e.g., HSS, UDM) to request subscription information of the wireless device. The UE context request message may comprise an identity of the wireless device, the one or more capabilities of the wireless device, and/or the like. In an example, the one or more capabilities may indicate a capability of an unmanned and/or uncrewed aerial vehicle (UAV). The subscription server may receive the UE context request message from the mobility management function. The subscription server may send a UE subscription information message to the mobility management function. The UE subscription information message may comprise UE subscription information. In an example, the subscription server may comprise the UE subscription information based on the capability. The subscription server may include aerial UE subscription information if the one or more capabilities indicate the UAV. The UE subscription information may indicate whether one or more services are allowed or not for the wireless device.

In an example, the mobility management function may determine an activation of the RAN functions associated with the one or more services based on the subscription information, a local policy, predefined rules, and/or the like. In an example, if the UE subscription information indicates that the one or more services are allowed for the wireless device, the mobility management function may determine to activate the RAN functions associated with the one or more services. If the UE subscription information indicates that the one or more services are not allowed for the wireless device, the mobility management function may determine not to activate the RAN functions associated with the one or more services.

In an example, the mobility management function may activate or deactivate the RAN functions by sending the UE subscription information comprising itself to the base station. The base station may receive the UE subscription information from the mobility management function. In an example, the UE subscription information may indicate that the one or more services are allowed for the wireless device. The base station may activate/enable the RAN functions associated with the one or more services in response to the UE subscription information indicating the allowance. The UE subscription information may indicate that the one or services are not allowed for the wireless device. The base station may not activate the RAN functions associated with the one or more services in response to the UE subscription information indicating the disallowance (e.g, the one or more services are not allowed for the wireless device).

In an example implementation, the mobility management function may activate or deactivate the RAN functions by sending an indication whether the RAN function should be activated or not activated.

In an example, the one or more services may be a UAS (e.g., UAV, aerial UE) and the RAN functions which area associated with the UAS may be the aerial UE communication. The one or more services may be a V2X (e.g., sidelink communication) and the RAN functions which area associated with the V2X may be resource allocation and management of the sidelink communication. The one or more services may be an IoT and the RAN functions which area associated with the IoT may be an enhanced coverage for the wireless device.

In an example, the base station may activate RAN functions. The base station may configure RAN function with the wireless device regarding the service. In an example, in response to the activation of the RAN functions, the base station may allocate sidelink resource for the wireless device by sending an RRC reconfiguration message. In response to the activation of the RAN functions, the base station may repeat an uplink and/or downlink data transmission. In response to the activation of the RAN functions, the base station may send RRC message (e.g., RRC reconfiguration) to employ the RAN functions for the aerial communication service (e.g., the height-based measurement reporting, an interference detection for the aerial UE communication, an interference mitigation for the aerial UE communication, a flight path information reporting, a location reporting for the aerial UE communication).

Remote identification (RID) may be a technology to avoid collision between different UAVs or between manned aircrafts and UAVs. To prevents collision accidents, a federal aviation authority (FAA) may integrate the UAVs into a national airspace system (NAS) by introducing the RID. The RID may be an ability of a UAS in flight to provide identification and tracking information that may be received by other parties and may play a role in identifying and grounding unauthorized UAS in restricted areas. In an example, UAVs above 0.55 lbs. may be mandated to support RID. There may be two types of RID: standard RID and limited RID. For standard RID, a UAV may support a network publishing identification (ID) and a direct broadcast ID. For limited RID, the UAV may support the network publishing ID. For limited RID, the UAV may not support the direct broadcast ID. The network publishing ID may be based on communication via an internet from a RID server provider that interfaces with the UAV. The direct broadcast ID may be based on direct transmission of the RID by a UAV using its onboard direct transmission technology (e.g., Bluetooth, Wi-Fi module). A UAV that supports the limited RID (e.g., does not support the direct broadcast ID) may be not allowed to fly above 400 feet. A UAV that supports the limited RID, network connectivity may be required during the flight. A UAS that supports the standard RID may be allowed to fly above 400 feet and there is no restriction for the network connectivity.

In an example, command and control communication may be a user plane link to deliver message with information of command and control for UAV operation from a UAV controller or a UTM/USS to the UAV. The command and control communication may be C2 communication. The C2 communication comprises three types of communication 1) direct C2 communication, 2) network assisted C2 communication, 3) UTM/USS navigated C2 communication. The direct C2 communication may use the direct communication link between a UAV and a UAV controller. The network assisted C2 communication may use cellular network (e.g., public land mobile network) for a communication between the UAV and the UAV controller. For the UTM/USS navigated C2 communication may use, the UTM/USS may provide a pre-scheduled flight plan to the UAV and the UTM/USS may keep track and verify up to date restrictions or flight plan to the UAV.

Figure 19:
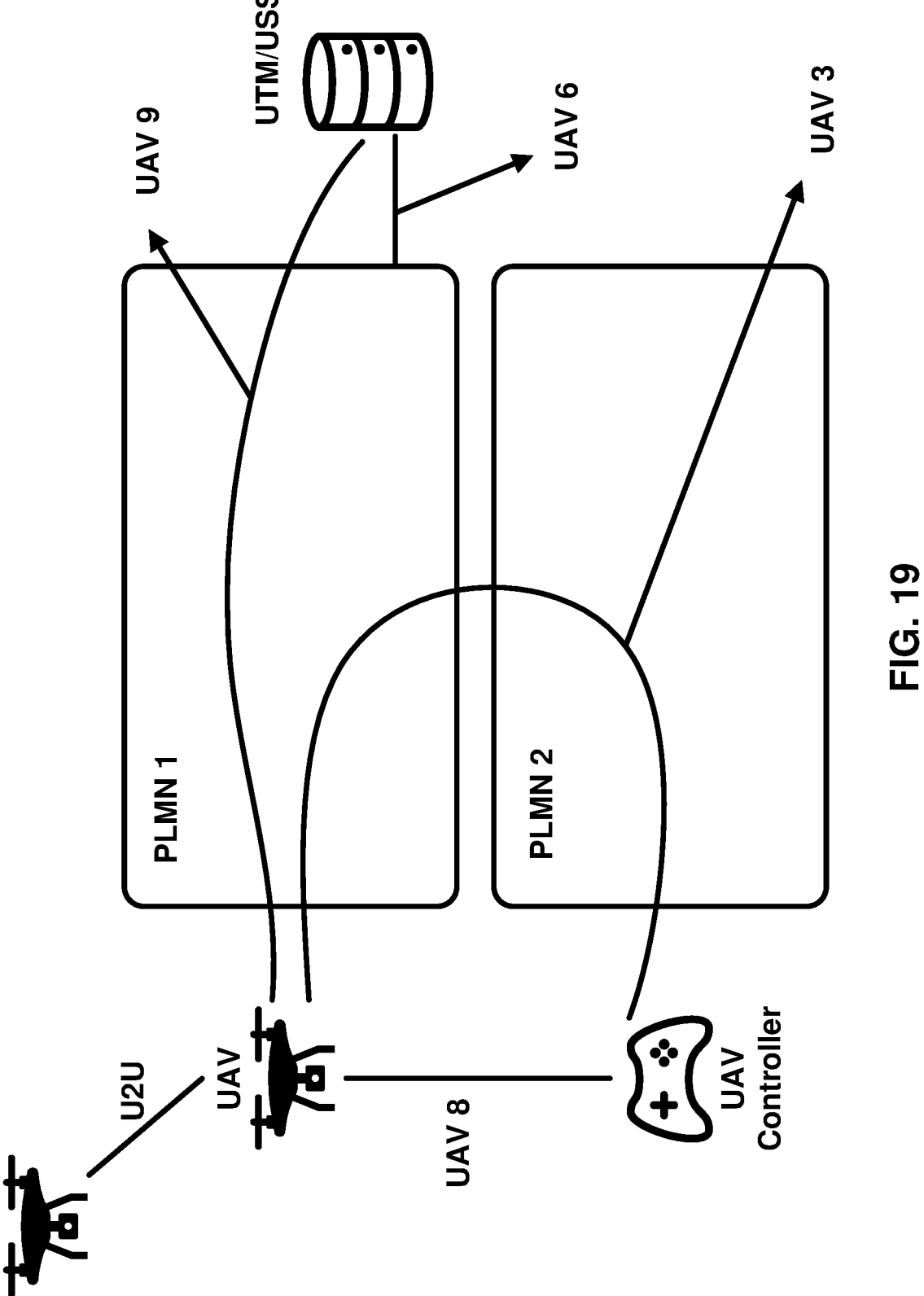
FIG. 19 illustrates an example architecture for a UAS.

FIG. 19 shows an example interfaces (e.g., U2U, UAV3, UAV6, UAV8, UAV9) for the unmanned and/or uncrewed aerial system with wireless network (e.g. PLMN1, PLMN2). The interface may be a communication connectivity. In an example, U2U interface may be an interface for the direct broadcast ID. UAV8 interface may be an interface for the direct C2 communication between the UAV and the UAV controller. The UAV3 interface may be an interface between the UAV and the UAV controller via wireless network. In an example, the UAV3 may be in intra-PLMN or inter-PLMN. In an example, for the intra-PLMN, the PLMN1 and PLMN2 may be same PLMN. For the inter-PLMN, the PLMN1 and the PLMN2 may be different PLMN. In an example, the UAV9 may be interface between the UAV and a networked UAV controller and the UTM/USS for UAS management (e.g., authentication and authorization, transporting C2, RID and tracking of the UAV). In an example, the UAV6 may be interface between the PLMN (e.g. 3GPP network) and a UTM/USS for functionality exposure, support of identification and tracking, and a UAV authentication/authorization.

In existing technologies, a base station may selectively activate radio access network (RAN) functions (e.g., sidelink communication, enhanced coverage, aerial UE communication) for a wireless device. The activation may be based on subscription information of the wireless device. In an example, a wireless operator may determine, based on the subscription information, whether to allow the wireless device to use a specific RAN function. The determination may be based on, for example, an agreed charging plan for the wireless device. During a registration procedure of the wireless device, a core network function (e.g., AMF, MME) may receive, from another core network function (e.g., UDM, HSS), the subscription information indicating whether the RAN function is allowed. Based on the subscription information, the core network function may indicate to the base station whether the RAN function for a service is allowed for a wireless device.

For some kinds of wireless device (for example, UAV), permission to use the RAN function may additionally or alternatively be based on other requirements. As an example, activating the RAN function may require authorization based on requirements of a third-party regulator. The authorization may comprise an authentication by the third-party regulator. One such regulator may be the Federal Aviation Administration, which is investigating regulation relating to UAS traffic management and/or service supply for aircraft below a certain altitude (e.g., less than four hundred feet). If a core network function indicates allowance of a RAN function based solely on subscription information of the wireless device, this may result in unauthorized and/or premature activation of the RAN function. Unauthorized and/or premature activation may result in noncompliant and/or wasteful use of network resources. Accordingly, enhanced RAN function activation procedures may be required.

When establishing a PDU session toward a data network (DN), there may be a need to authenticate and/or authorize the PDU session against an Authentication, Authorization, and Accounting (AAA) server in the data network. This may be the case if the DN corresponds to a corporate network or is in some other way provided by a third party. The 5G system may support this via a secondary authentication/ authorization with a DN-AAA server during the establishment of a PDU session using extensible authentication protocol (EAP). Such secondary authentication and/or authorization may take place in addition to a primary 5G system access authentication handled by an AMF during registration procedure. In an example, the DN-AAA server may be part of one or more mobile operator networks. The DN-AAA sever may part of data network providers (e.g., a private company). Secondary authentication may allow the third party to control the identification and authorization of the third party's service user. The load of 5G system may decrease and increase flexibility and modularity of 5G system. During secondary authentication/authorization, the DN-AAA sever may provide or update QoS policy or level of authorization for the PDU session of a wireless device. A SMF may perform a role of the EAP authenticator. When the SMF receives a PDU session establishment request from a wireless device, the SMF may be configured to require secondary authentication/authorization by a DN-AAA sever. In response to the configuration, the SMF may initiate EAP authentication by requesting the wireless device to provide its DN-specific identity. This DN-specific identity may be specific to the DN and unrelated to the SIM based identity.

As noted above, during existing registration procedures, a core network function (e.g., AMF, MME) may determine whether a wireless device is allowed to use a RAN function based on subscription information. In accordance with example embodiments of the present disclosure, a core network function may additionally or alternatively determine whether the wireless device requires authorization (for example, authorization that is not based on subscription information of the wireless device) for the RAN function. The authorization may be in accordance with, for example, third-party regulatory requirements. In an example, if the core network function determines that authorization is not required, the core network function may indicate, to the base station, an activation of the RAN function based solely on subscription information. If the core network function determines that authorization is required, the core network function may obtain authorization prior to indicating allowance of the RAN function. For example, if the core network function has not received the authorization that is determined to be required, then the core network function may withhold permission from the base station (e.g., by not sending an indication to the base station that the wireless device is allowed to use the RAN function, or by sending an indication to the base station that the wireless device is not allowed to use the RAN function). The permission may be withheld even if the core network function receives subscription information indicating that the wireless device is allowed to use the RAN function. The subscription information may indicate an allowance of a service related to the RAN function.

In accordance with example embodiments, a core network function may determine whether a particular RAN function requires authentication/authorization by a server (e.g., an authorization server associated with a third-party regulator). The determination may be included in a registration procedure of a wireless device associated with the RAN function. As an example, the core network function may determine that the RAN function may be allowed based solely on subscription information obtained from another core network function. As an example, the core network function may determine that the RAN function may be allowed based solely on authorization by the server. As an example, the core network function may determine that the RAN function may be allowed only if (a) subscription information obtained from another core network function indicates that the RAN function is allowed and (b) the server authorizes the RAN function. Example embodiments may facilitate regulatory compliance of the network by reducing premature activation of a RAN function for a wireless device.

In accordance with example embodiments, the core network function may obtain authorization for a particular RAN function from a server (e.g., an authorization server associated with a third-party regulator). The core network function may send one or more first messages to the server. As an example, the one or more first message may indicate identifiers of one or more RAN functions, identifiers of one or more wireless devices associated with each RAN function, and/or the like. The core network function may receive one or more second messages from the server indicating whether a particular wireless device is authorized to use a particular RAN function. The core network function may receive the one or more second messages via a authentication server from the server. If the server indicates that the wireless device is authorized to use the RAN function, then the core network function may send, to a base station associated with the wireless device, one or more third messages indicating activation of the RAN function for the wireless device. Example embodiments may reduce resource consumption and/or signaling overhead by reducing premature activation of a RAN function for a wireless device.

In accordance with example embodiments, the one or more second messages may further indicate authorization parameters such as an authorization type, an authorization level, an authorized flight path, and/or the like. In an example, the one or more second messages may be an authentication and authorization (AA) response message, and the AA response message may include the authorization parameters. In accordance with example embodiments, the one or more third messages may indicate one or more of the authorization parameters to the base station. The base station may indicate one or more of the authorization parameters to the wireless device. Example embodiments may reduce resource consumption and/or signaling overhead by facilitating exchange of authorization parameters by network components linking the wireless device to the server. Example embodiments may reduce connection failure by providing authorized flight paths so the base station can aware trajectory of the wireless device. The base station may use the authorized flight paths to determine a handover target base station of the wireless device.

In accordance with example embodiments, indication of activation of a RAN function, by a core network function, may be further based on subscription information received from another core network function. As an example, if the core network function determines that the wireless device does not require authentication and/or authorization by a server to allow the RAN function, then the core network function may indicate activation of the RAN function based solely on subscription information associated with the wireless device. As an example, if the core network function determines that the wireless device does require authorization by a server to allow the RAN function, then the core network function may withhold activation of the RAN function until both of the following are confirmed: (a) that subscription information obtained from another core network function indicates allowance and (b) that authorization has been obtained from the server. Example embodiments may reduce resource consumption and/or signaling overhead by reducing premature activation of a RAN function for a wireless device.

Figure 20:
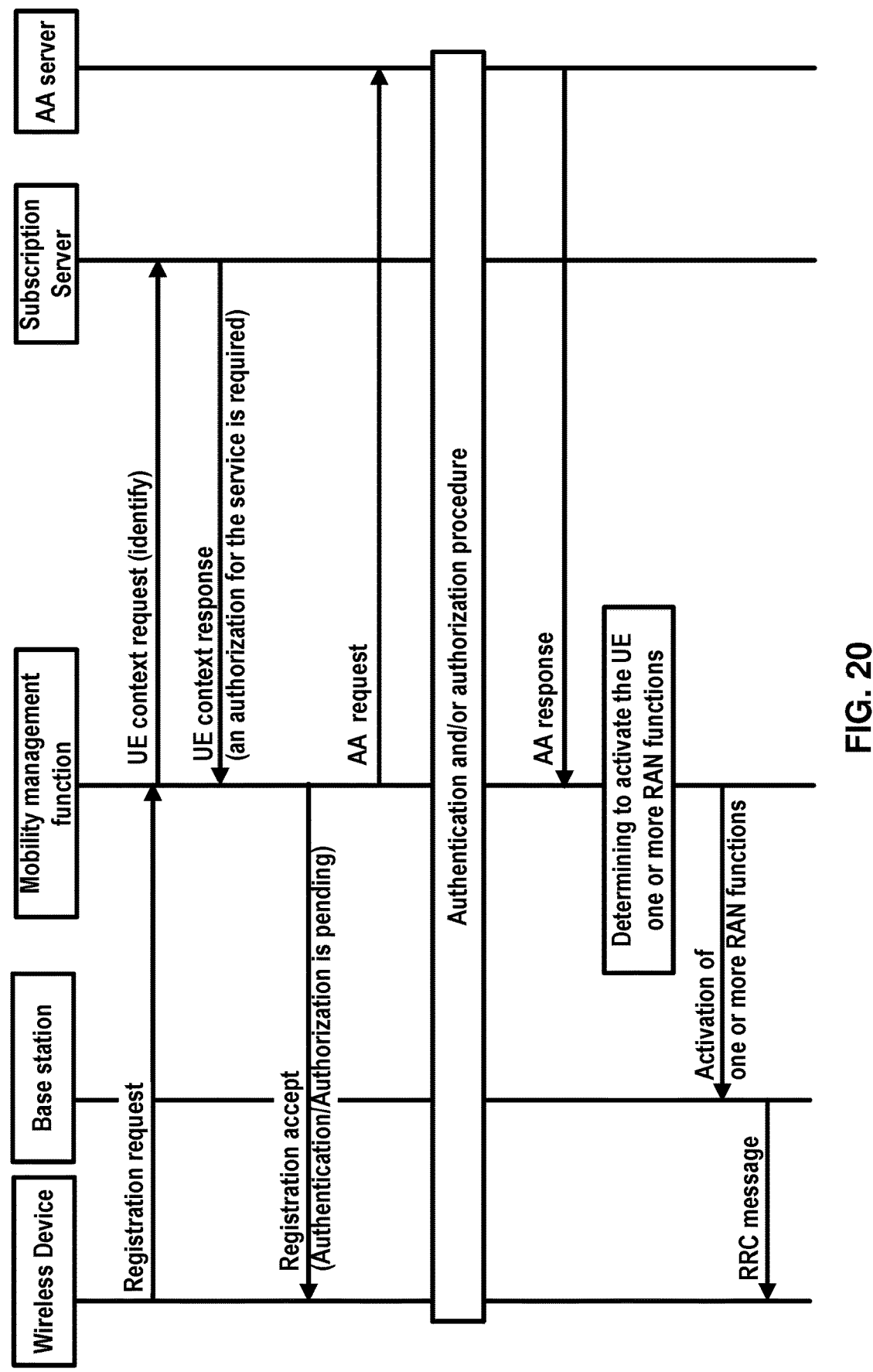
FIG. 20 illustrates an example RAN functions activation procedure for a service in accordance with embodiments of the present disclosure.

FIG. 20 illustrates an example RAN functions activation procedure for a service between a wireless device, a base station, a mobility management function, a subscription server and an authentication and authorization (AA) server. In an example, the wireless device may access 4G system via a base station (e.g., eNB). The mobility management function may be a mobility management entity (MME). The subscription server may be a home subscriber server (HSS). In an example, the wireless device may access 5G system via a base station (e.g., gNB). The mobility management function may be an access and mobility management function (AMF). The subscription server may be a unified data management (UDM). In an example, the AA server may be a network node and may interact with a 3'rd party regulation server (e.g. UTM/USS). In an example, the AA server may be a 3'rd party regulation server (e.g., UTM/USS).

In an example, the wireless device may send a registration request message to the mobility management function. The registration request message may comprise an identity of the wireless device, a capability of a service, slice information, and/or the like. In an example, the capability may indicate an unmanned and/or uncrewed aerial service (e.g., UAS, UAV). The capability may indicate a V2X or a sidelink communication. The capability may indicate IoT, and/or the like. In response to receiving the registration request message, the mobility management function may send a UE context request message to a subscription server. The UE context request message may comprise an identifier of the wireless device, the capability of the service, slice information, and/or the like. In an example, the identity of the wireless device may be a subscriber permanent identifier (e.g., IMSI, SUPI) of the wireless device.

The subscription server may receive the UE context request message from the mobility management function. In response to receiving the UE context request message, the subscription sever may send a UE context response message comprising subscription information of the wireless device to the mobility management function. The subscription server may determine the subscription information based on the capability of the wireless device and slice information. In an example, if the capability indicates the UAS, the subscription server may include UAS subscription information to the subscription information. The subscription information may be subscription data. In an example, the subscription information may indicate whether the wireless device is allowed to get the service. In an example, the subscription information may indicate whether the wireless device is allowed to get the UAS or not. The subscription information may further indicate whether an authentication and/or authorization is required for the service.

The mobility management function may receive the UE context response message comprising the subscription information. In response to receiving the UE context response message, the mobility management function may determine whether an authentication and/or authorization for one or more services are required. The determination may be based on the capability provided by the wireless device, subscription information provided by the subscription server, and/or the like. If the capability indicate that the wireless device does not support the service, the mobility management function may not allow the service and may not perform the authentication and/or authorization for the service.

In an example, the subscription information may indicate that the wireless device is not allowed to get the service. If the subscription information indicate that the wireless device is not allow to the service, the mobility management function may not perform the authentication and/or authorization for the service. The mobility management function may not activate RAN function of the base station and the wireless device in response.

In an example, the subscription information may indicate that the wireless device is allowed to get the service. If the service is allowed for the wireless device, the mobility management function may check whether the wireless device is required the authentication and/or authorization. If the authentication and/or authorization is required for the service, the mobility management function may indicate to the wireless device that the authentication and/or authorization for the service is pending. During the authentication and/or authorization for the service of the wireless device is pending, the mobility management function may withhold the RAN function activation associated with the service with the base station and the wireless device.

If the authentication and/or authorization is required based on the subscription information, the mobility management function may perform the authentication and/or authorization procedure by sending an authentication and/or authorization (AA) request message to an authentication and/or authorization (AA) server. The AA server may be 3'rd party node (e.g., UTM, USS). The AA request message may trigger performing the authentication and/or authorization procedure between the AA server and the wireless device. The detailed procedure for the service specific AA procedure is described in FIG. 26. If the service specific AA procedure is completed, the AA server may send an authentication and/or authorization (AA) response message to the mobility management function. The AA response message may comprise an authorization result, an authorized type, an authorized level, authorized paths, and/or the like. In an example, the AA completion may mean the use of service in application layer between the wireless device and the AA server is ready.

In an example, the mobility management function may receive an AA response message from the AA server. In response to receiving the AA response message, the mobility management function may determine whether to activate the one or more RAN functions for the wireless device. If the authorization result indicates that the service is authenticated/authorized for the wireless device (e.g., the authentication/authorization is succeeded), the mobility management function may determine to activate the one or more RAN functions for the wireless device. If the authorization result indicates that the service is not authenticated/authorized for the wireless device (e.g., the authentication/authorization is failed), the mobility management function may determine not to activate the one or more RAN functions for the wireless device.

In response to the determination, the mobility management function may send one or more messages to the base station, to activate the one or more RAN functions associated with the service. In an example, the one or more messages may be a UE context modification message. the one or more messages may comprise an indication indicating the activation of the one or more RAN functions associated with the service, the authorized type, the authorized level, the authorized paths, and/or the like.

In an example, the base station may receive the one or more messages from the mobility management function. In response to receiving the one or more messages, the base station may activate RAN functions. The base station may configure RAN function with the wireless device regarding the service. In response to the activation of the RAN functions, the base station may send RRC message (e.g., RRC reconfiguration) to employ the RAN functions for the service. Example embodiments may reduce resource consumption and/or signaling overhead by reducing premature activation of a RAN function for a wireless device.

Figure 21:
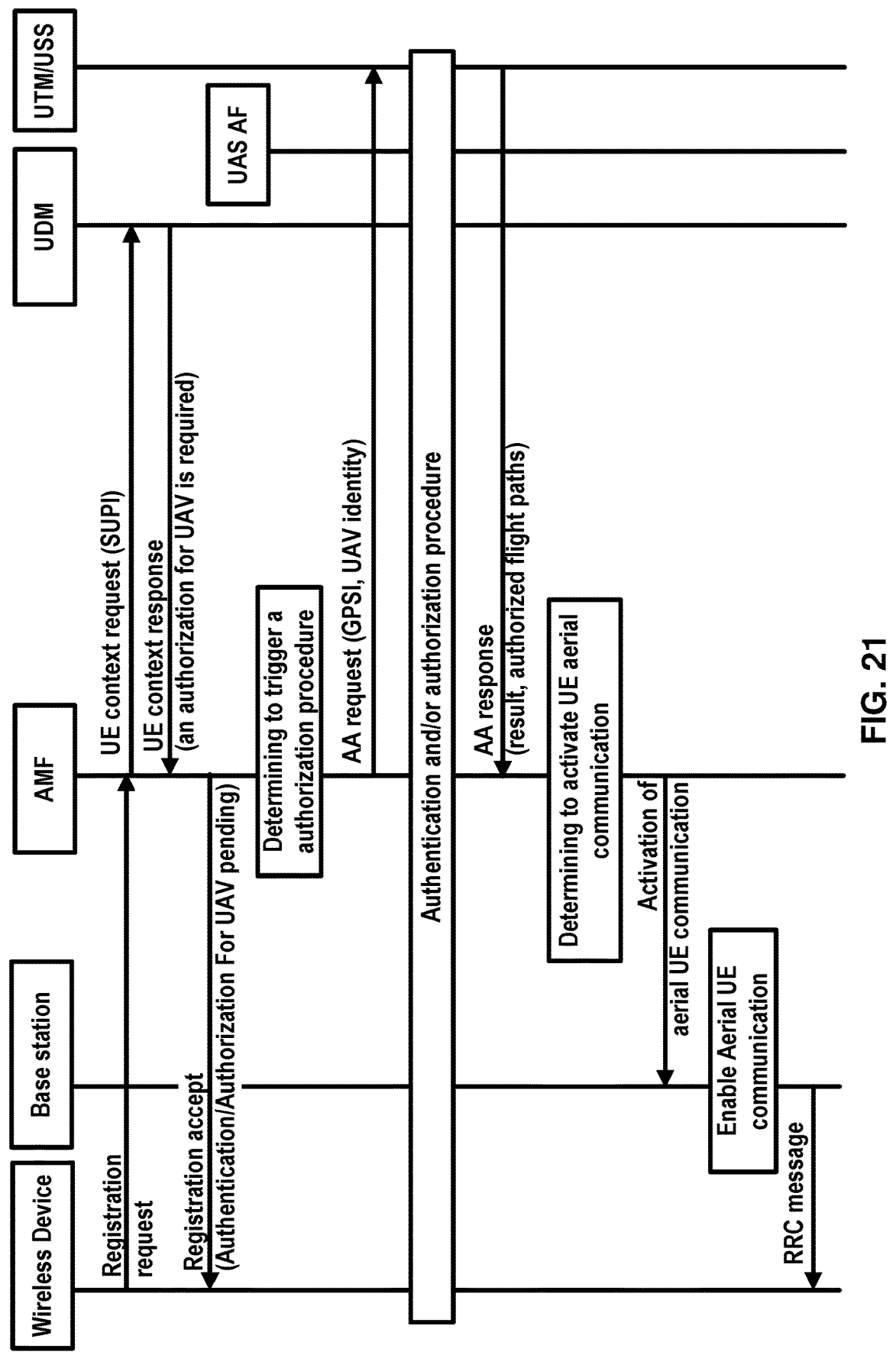
FIG. 21 illustrates an example RAN functions activation procedure for a service in accordance with embodiments of the present disclosure.

FIG. 21 illustrates an example RAN function activation procedure for an unmanned and/or uncrewed aerial service (UAS) between a wireless device, a base station, an access and mobility management function (AMF), a UAS application function (AF) and a UAS traffic management (UTM) or UAS service supplier (USS). The wireless device may send a registration request message to the AMF via the base station. In an example, the wireless device may send a registration request message to the AMF. The registration request message may comprise an identifier of the wireless device, a capability of the unmanned and/or uncrewed aerial service (e.g., UAS, UAV, aerial UE), slice information, weight of the wireless device, and/or the like. In an example, the identifier of the wireless device may be not exposed to out of a cellular network. The identifier of the wireless device may comprise a SUPI, a subscription concealed identifier (SUCI), a fifth generation (5G) globally unique temporary identifier (GUTI), a permanent equipment identifier (PEU), and/or the like. In an example, the SUCI and the 5G-GUTI may be based on the SUPI. The slice information may indicate one or more S-NSSAI.

In response to receiving the registration request message, the AMF may send a UE context request message to a UDM. The UE context request message may comprise a permanent identifier of the wireless device (e.g., SUPI) corresponding to the identifier, the capability of the UAV/UAS, the slice information, and/or the like. The UDM may receive the UE context request message from the AMF. In response to receiving the UE context request message, the UDM may send a UE context response message comprising subscription information for the UAS of the wireless device to the AMF. The UDM may determine the subscription information based on the capability of the wireless device and the slice information. In an example, if the capability indicates the UAS, the subscription server may include UAS subscription information into the subscription information. The UAS subscription information may comprise first subscription information whether the wireless device is allowed to the UAS. The UAS subscription information may comprise second subscription information whether an authentication and authorization are required for the UAS.

In an example, sending the UE context request message and receiving the UE context response message between the AMF and the UDM may be realized by a service based procedure. The AMF may invoke subscriber data management service a Nudm_SDM_Get service with the UDM. The Nudm_SDM_Get service may comprise input parameters and outputs parameter. A consumer device (e.g., the AMF) may provide the input parameters to a service provider device (e.g., the UDM). In response to receiving the input parameters for the Nudm_SDM_Get service, the UDM may return the output parameters to the AMF.

The input parameters may comprise a network function identity of a service consumer, one or more subscription data types, keys for each subscription data types, and/or the like. In an example, the network function identity of a service consumer may be the AMF identity. FIG. 22 shows example UE subscription data types and required keys. The AMF may set the subscription data type as an aerial UE subscription data. A key for the aerial UE subscription data may be a SUPI. The AMF may send the subscription data type and the key to the UDM. In response receiving the input parameter comprising the subscription data type as aerial UE subscription data and the key as SUPI, the UDM may device corresponding subscription data/information and provide to the AMF as output parameters. FIG. 23 shows example subscription information (e.g., fields) corresponding to the access and mobility subscription data and the aerial UE subscription data. The fields for the subscription data/information for the aerial UE subscription data comprises two fields. The two fields may be same as the UAS subscription information. A first field of the two fields may be an aerial UE allowed field. A second filed may be an aerial UE subject to authentication and authorization field. The aerial UE allowed field may indicate whether the subscriber is allowed for Aerial UE operation (UAV, UAV Controller). The aerial UE subject to authentication and authorization field may indicate whether the subscriber is subject to the AA or not. In an example, the AMF may set the aerial UE subscription data for the subscription data types if the wireless device indicates a capability of the UAS. In an example, if the capability is not included in the registration request message from the wireless device, the AMF may consider the wireless device does not support functionalities for the UAS.

Referring to the FIG. 21, the AMF may receive the UAS subscription information from the UDM. In response to receiving the UAS subscription information, the AMF may determine whether to trigger an authentication and/or authorization procedure for the UAS. The determination may be based on the UAS capability provided by the wireless device, the UAS subscription information, and/or the like. In an example, the UAS subscription information may indicate that the wireless device is not allowed to get the UAS. If the UAS subscription information indicate that the wireless device is not allowed to get the UAS, the AMF may not send the AA request message. The AMF may not activate RAN function associated with the UAS with base station and the wireless device. In an example, the UAS subscription information may indicate that the wireless device is allowed to get the UAS. If the UAS is allowed for the wireless device, the AMF may check whether the wireless device is required the authentication and/or authorization based on the UAS subscription information. If the authentication and/or authorization is required for the UAS, the AMF may indicate to the wireless device that the UAS (e.g., UAV) is pending. The AMF may indicate to the base station that the UAS is pending. During the authentication and/or authorization for the service of the wireless device is pending, the AMF may withhold the RAN function activation associated with the UAS with the base station and the wireless device.

In response to the determination, the AMF may perform the authentication and/or authorization procedure by sending an authentication and/or authorization (AA) request message to the UTM/USS. The AMF may send the AA request message to the AA server via an UAS (UAS) application function (AF). The AA request message may comprise a public identifier of the wireless device, a parameter indicating an unmanned and/or uncrewed aerial vehicle (UAV) capability, a UAV identifier of the wireless device, a UAV control identifier, and/or the like. In an example, the public identifier may be a generic public identifier (e.g., GPSI). The public identifier may be allowed to expose to outside of a cellular network. The public identifier may be associated with a permanent identifier (e.g., SUPI, IMSI) of the wireless device. The permanent identifier may not be allowed to expose to outside of the cellular network. The UDM may store an association of the permanent identifier and the public identifier. The cellular network may comprise the AMF, the base station, the UDM, and/or the like. In response to sending the AA request message, the AMF may receive an AA response message from the UTM/USS, indicating a flight authorization for the aerial communication service. The AMF may receive the AA response message from the UTM/USS via the UAS AF. In an example, the AA response message may comprise an authorized result, authorized type, authorized level, authorized flight paths, and/or the like.

In an example, the authorized result may indicate whether the authentication and authorization are successful or not. If the authentication and authorization result indicate that the authentication and authorization is not successful, the AMF may determine that the wireless device is not allowed to get the UAS/aerial UE operation. If the authentication and authorization result indicate that the authentication and authorization is not successful (e.g., failed) the AMF may determine that the wireless device is not ready for a flight. In response to the determination (e.g., the wireless device is not allowed to get the UAS), the AMF may not activate the RAN functions associated with the UAS. If the authorized result may indicate that the authentication and authorization is successful, the AMF may determine that the wireless device is allowed to get the UAS/UAV operation. If the authentication and authorization result indicate that the authentication and authorization is successful, the AMF may determine that the wireless device is ready for a flight. In response to the determination (e.g., the wireless device is allowed to get the UAS), the AMF may activate the RAN functions associated with the UAS by sending a N2 message indicating an activation of the RAN functions associated with the UAS to the base station.

In an example, the authorized type may be an authorized command and control (C2) communication type. The authorized type may indicate at least one of, a direct C2 communication type, a network assisted C2 communication type, a UTM/USS navigated C2 communication type, and/or the like. If the authorized type indicates the direct C2 communication type, the wireless device may be allowed to communicate with a UAV controller directly (e.g., WiFi direct, Sidelink communication, Bluetooth) using the UAV8 interface. If the authorized type indicates the network assisted C2 communication type, the wireless device may use the UAV3 interface for the C2 communication. If the authorized type indicates the UTM/USS navigated C2 communication type, the wireless device may use the UAV9 interface for the C2 communication via the UTM/USS.

In an example, the authorized level may comprise an authorized height (e.g., 400 feet, 800 feet), authorized weight (e.g., 1 lbs., 2 lbs.), and/or the like. In an example, if the authorized height is 800 feet, the wireless device is not allowed to fly above 800 feet during flight. In an example, if the authorized weight is 2 lbs., the wireless device may not fly if the weight of the wireless device is above 2 lbs.

In an example, the authorized flight paths may be a planned flight paths negotiated between the wireless device and the UTM/USS. The authorized flight paths may comprise one or more waypoints and one or more time stamps associated with the one or more waypoints. The wireless device may fly based on the authorized flight paths.

In an example, the N2 message may be a UE context modification message. The N2 message may be an initial context setup request message. The N2 message may comprise an indication indicating an activation of RAN functions associated with the UAS, the authorized type, the authorized level, the authorized paths, and/or the like. In an example, the base station may receive the N2 message from the AMF. In response to receiving the N2 message, the base station may activate RAN functions associated with the UAS. The base station may configure RAN function with the wireless device regarding the UAS. In response to the activation of the RAN functions, the base station may send RRC message (e.g., RRC reconfiguration) to employ the RAN functions for the service. The RRC message may comprise one or more radio resource management (RRM) events (e.g., A3, A4 or A5) for the aerial UE communication. In an example, the RRC message may a parameter indicating a height threshold for altitudes reporting. The RRC message may comprise one or more measurement events regarding the height-based measurement reporting (e.g., a height threshold). In an example, the RRC message may comprise an indication to request flight path information to the wireless device.

In an example, the base station may notify to the AMF or the UTM/USS, if the wireless device flies above the authorized height. In an example, the base station may notify to the AMF or the UTM/USS, if the wireless device is above the authorized weight. Of the base station may not allocate resources for communication if the wireless device is above the authorized level. In an example, the base station may use the authorized flight path for handover decision, a congestion control, an interference mitigation, and/or the like. Example embodiments may reduce resource consumption and/or signaling overhead by reducing premature activation of a RAN function for a wireless device. Example embodiments may reduce handover failure and/or communication failure.

In an example, the base station may receive from the AMF, a second N2 message comprising security information of a wireless device. In an example, the base station may receive the second N2 message before receiving the N2 message. the second N2 message may be an initial context setup request message.

In an example, a wireless device may send a registration request message comprising an unmanned and/or uncrewed of an UAV to an AMF. In response to sending the registration request message, the wireless device may receive a registration response message. The registration response message may indicate that an authentication and authorization for the UAV (e.g., UAS) is pending. Later, the wireless device may receive a UE configuration update message indicating that the authentication and authorization for the UAS is completed. In response to receiving the indicating that the authentication and authorization for the UAS is completed, the wireless device may send a PDU session establishment message for the UAS. The PDU session establishment message may comprise an indication indicating the UAS. The wireless device may receive a first radio resource configuration (RRC) message comprising one or more parameters for the aerial UE communication. The one or more parameters may comprise a height threshold for an altitude reporting, a flight path request indication, an RRC event for the aerial UE communication, and/or the like. In response to receiving the first RRC message, the wireless device may send a second RRC message. The second RRC message may comprise one or more measurement results corresponding to the height threshold. The second RRC message may comprise one or waypoints and one or more timestamps corresponding to the waypoints. The second RRC message may comprise event reports.

Figure 24:
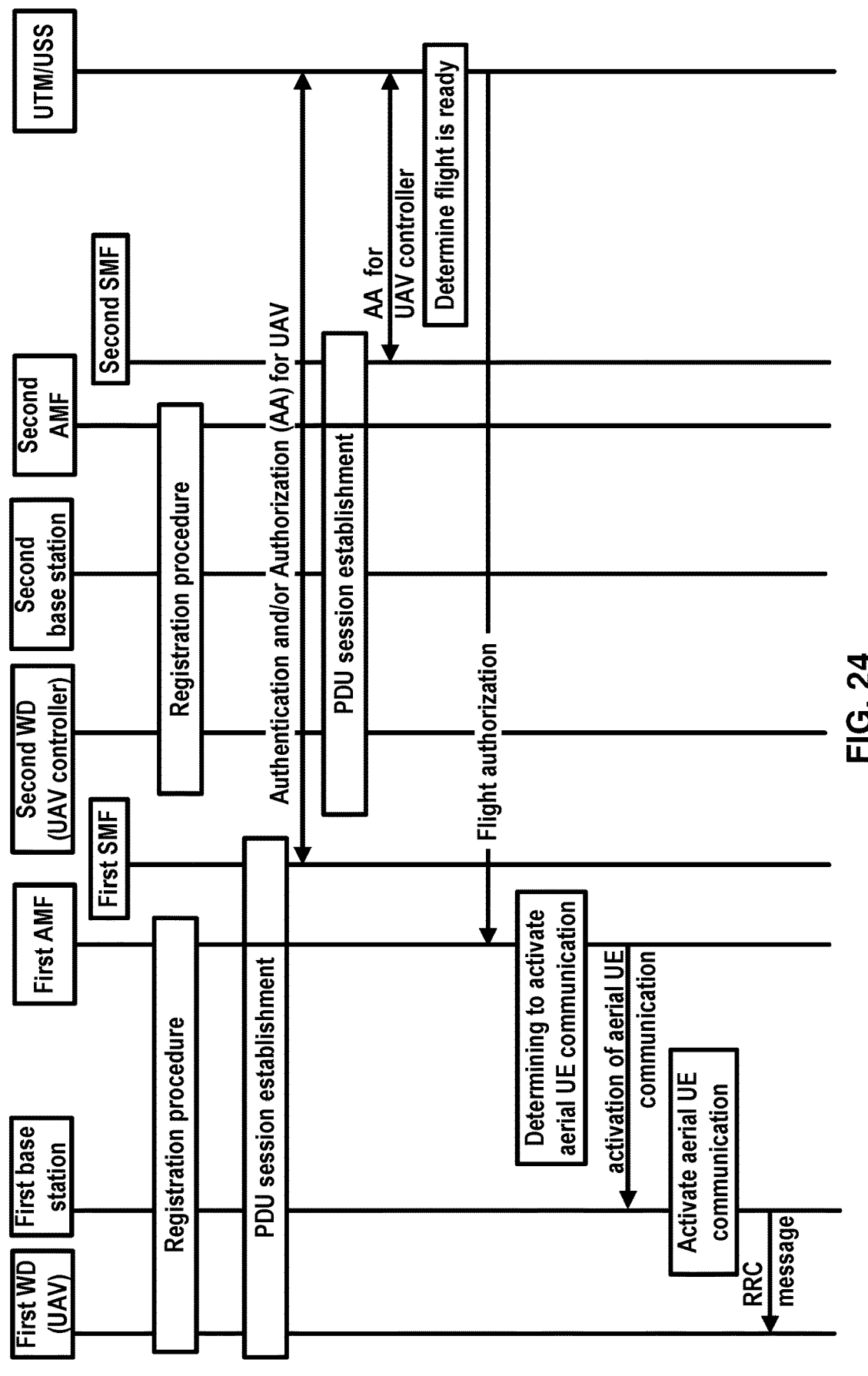
FIG. 24 illustrates an example RAN functions activation procedure for a service regarding a UAV and a UAV controller association in accordance with embodiments of the present disclosure.

FIG. 24 illustrates an example RAN functions activation procedure for an UAS regarding a UAV and a UAV controller association. In an example, the first wireless device (WD) may be a first UAV. The second wireless device (WD) may be a first UAV controller associated with the first UAV. In an example, the first UAV controller may control the first UAV using a network assisted C2 communication (via UAV3). In an example, the first UAV may establish a first PDU session with a first SMF. The first UAV controller may establish a second PDU session with a second SMF. The first SMF and the second SMF may be different. During the first and the second PDU session establishment procedures, the first and the second SMF may perform an authentication and authorization with a UTM/USS. The authentication and authorization with the UTM/USS for the first and second PDU session may be successful. If the PDU sessions with the first UAV and with the first UAV controller is successfully completed, the UTM/USS may determine a flight for the UAV is ready. In response to the determination, the UTM/USS may indicate a flight authorization of the first UAV to the first AMF. The UTM/USS may indicate the flight authorization of the first UAV to the first AMF via the first SMF. The first AMF may receive the flight authorization to of the first UAV. In response to receiving the flight authorization from the UTM/USS, the first AMF may send a N2 message to the first base station, indicating an activation of RAN functions associated with the UAS.

In an example, the first wireless device may register to a first AMF via a first base station. After successful registration, the first wireless device may request a first PDU session establishment to a first SMF via the first AMF by sending a first PDU session establishment request message to the first SMF. The first PDU session establishment request message may comprise an identifier of the first wireless device, a UAV identifier of the first wireless device, and/or the like. In response to receiving the first PDU session establishment message, the first SMF may query a first UDM to request a subscription information of the first PDU session. The SMF may determine whether a secondary authentication/authorization by a UTM/USS is required or not. In an example, the determination may be based on the subscription information of the first PDU session. In an example, the subscription information of the first PDU session may indicate that the first PDU session is subject for a secondary authentication.

The first SMF may perform a first authentication and authorization for the UAV by sending a first AA request message for the UAV to a UTM/USS. The first SMF and the UTM/USS may perform the first authentication and authorization procedure for the UAV.

In an example, the second wireless device may register to a second AMF via a second base station. After successful registration, the second wireless device may request a second PDU session establishment to a second SMF via the second AMF by sending a second PDU session establishment request message to the second SMF. The second PDU session establishment request message may comprise an identifier of the second wireless device, a UAV controller identifier of the second wireless device, and/or the like. In response to receiving the second PDU session establishment message, the second SMF may query a second UDM to request a subscription information of the second PDU session. The second SMF may perform a second authentication and authorization for the UAV controller by sending a second AA request message for the UAV controller to a UTM/USS. The second SMF and the UTM/USS may perform the second authentication and authorization procedure for the UAV controller.

In an example, the UTM/USS may determine that the first PDU session for the first UAV (e.g., the first wireless device) and the second PDU session for the first UAV controller (e.g., the second wireless device) are successfully authenticated/authorized. The UTM/USS may determine that the first PDU session for the first UAV and the second PDU session for the first UAV controller are successfully established. In response to the determination, the UTM/USS may indicate to the first AMF or the first SMF that a flight is authenticated/authorized for the UAV. The first AMF may receive the indication that the flight is authenticated/authorized for the UAV from the UTM/USS. In response to receiving the indication, the first AMF may send a N2 message indicating an activation of the RAN functions associated with the UAS (UAV) to the base station. In an example, the UTM/USS may not indicate to the second AMF or the second SMF that a flight is authenticated/authorized for the UAV controller. RAN function activation may not be required for the UAV controller. Example embodiments realize an activation of the RAN function for a UAV when both UAV and UAV controller is ready for a flight. Example embodiments may reduce resource consumption and/or signaling overhead by reducing premature activation of a RAN function for a wireless device.

Figure 25:
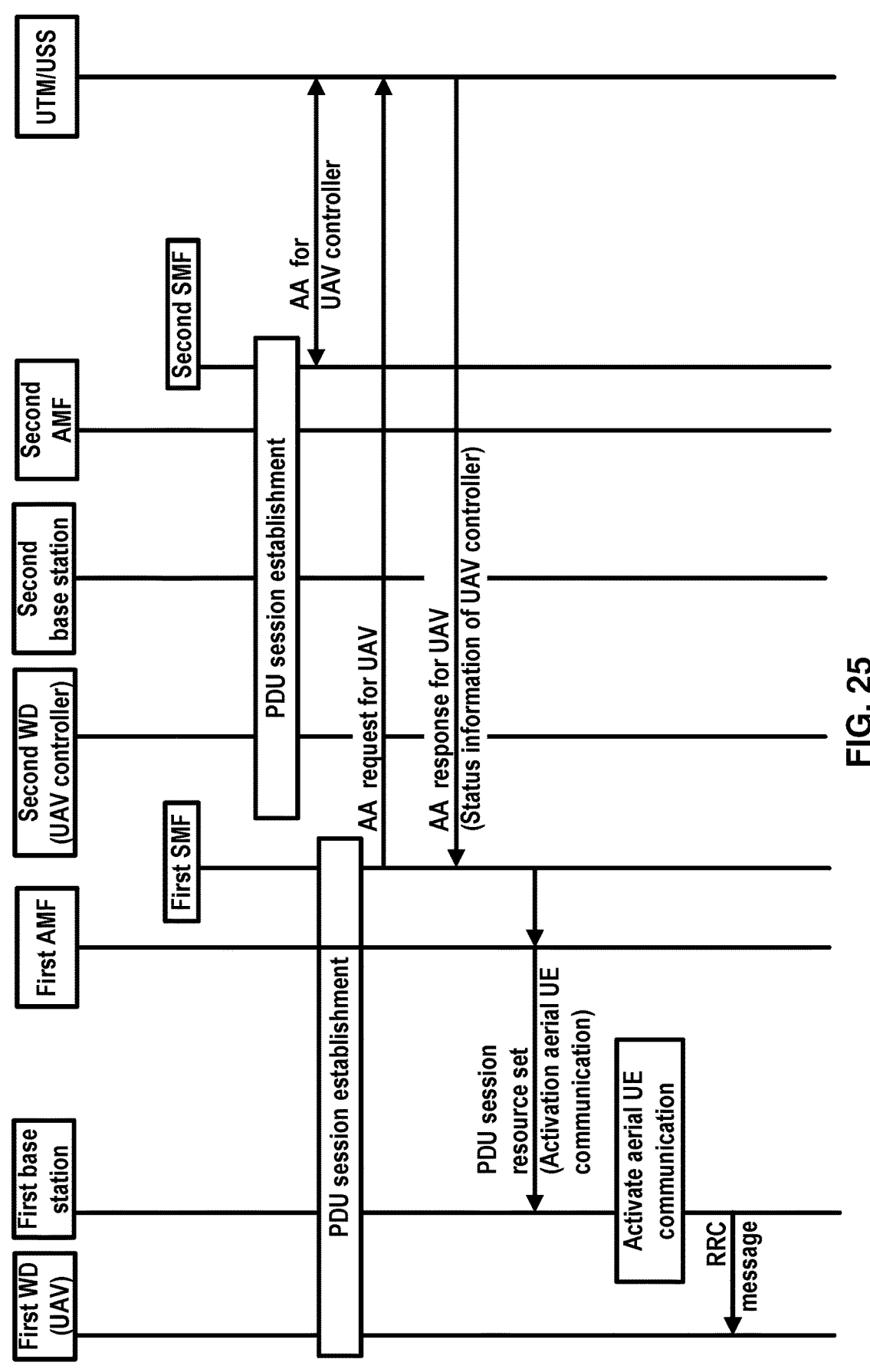
FIG. 25 illustrates an example RAN functions activation procedure for a service based on associated UAV controller status result in accordance with embodiments of the present disclosure.

FIG. 25 illustrates an example RAN functions activation procedure for an UAS based on associated UAV controller status result from the UTM/USS. In an example, the first wireless device (e.g., first UAV) and the second wireless device (e.g., first UAV controller) may register with an AMF and may perform establishment of PDU session as illustrated in FIG. 24. In an example, the UTM/USS may receive an AA request for the first UAS from the first SMF. In response to receiving the AA request, the UTM/USS may perform an authentication and authorization procedure for a first PDU session of the first UAV. If the authentication and authorization procedure are completed, the UTM/USS may send an AA response message to the first SMF/first AMF. The AA response message may comprise an authentication and authorization result of the first UAV. The AA response message further comprise status information of a UAV controller (e.g., the first UAV controller) associated with the first UAV. In an example, the status information may comprise a PDU session status (e.g., established/not established, authenticated, authenticated successfully, authentication failed) or authentication status of the UAV controller or a PDU session of the UAV controller. Based on the AA response message, the first SMF or the first AMF may determine an activation of the RAN functions associated with the UAS. In an example, if the status information indicates that the PDU session of the UAV controller is not ready, the first SMF or the first AMF may determine that a flight for the UAV is not ready. In an example, if the status information indicates that the PDU session of the UAV controller is ready, the first SMF or the first AMF may determine that a flight for the UAV is ready. In an example, if the status information indicates that the authentication of the UAV controller is ready, the first SMF or the first AMF may determine that a flight for the UAV is ready. Based on the determination, the first AMF or the first SMF may indicate to the first base station an activation of RAN functions associated with the UAS. Example embodiments realize an activation of the RAN function for a UAV when both UAV and UAV controller is ready for a flight. Example embodiments may reduce resource consumption and/or signaling overhead by reducing premature activation of a RAN function for a wireless device.

Figure 26:
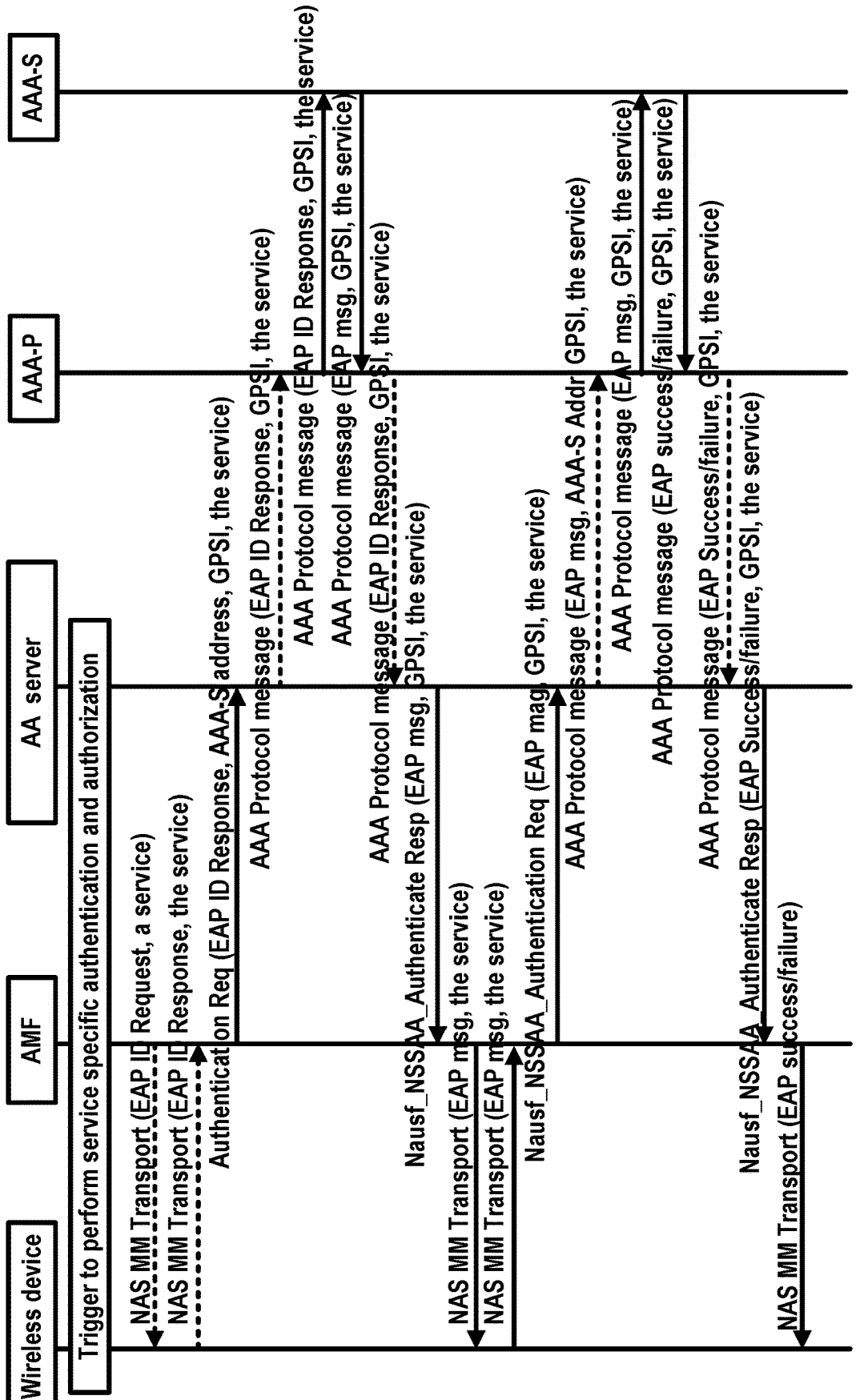
FIG. 26 illustrates an example service specific authentication and authorization procedure in accordance with embodiments of the present disclosure.

FIG. 26 illustrates an example service specific authentication and authorization procedure. An AMF may trigger the start of the service specific authentication and authorization procedure for a service. The AMF may be an MME. The AMF may send an extensible authentication protocol (EAP) Identity Request for the service in a NAS MM Transport message including the service name to a wireless device. The wireless device may provide the EAP Identity Response for the service alongside the service name in an NAS MM Transport message towards the AMF. The AMF may send the EAP Identity Response to an authentication and authorization (AA) server in an authentication request (EAP Identity Response, AAA-S address, GPSI, a service name) message. If the AAA-P is present (e.g., because the AAA-S belongs to a third party and the operator deploys a proxy towards third parties), the AA server forwards the EAP ID Response message to the AAA-P. Otherwise, the AA server forwards the message directly to the AAA-S. The AA server may use towards the AAA-P or the AAA-S a AAA protocol message of the same protocol supported by the AAA-S. The AAA-P may forward the EAP Identity message to the AAA-S addressable by the AAA-S address together with the service and GPSI. The AAA-S may store the GPSI to create an association with the EAP Identity in the EAP ID response message, so the AAA-S may later use the GPSI to revoke authorization or to trigger reauthentication. EAP-messages may be exchanged with the wireless device. One or more iterations of these steps may occur. If EAP authentication completes, the AAA-S may store the service for which the authorization has been granted, so the AAA-S may decide to trigger reauthentication and reauthorization based on its local policies. An EAP-Success/Failure message may be delivered to the AAA-P (or if the AAA-P is not present, directly to the AA server) with GPSI and the service name. If the AAA-P is used, the AAA-P may send a AAA Protocol message including (EAP-Success/Failure, the service name, GPSI) to the AA server. The AA server may send the Authenticate Response (EAP-Success/Failure, the service mane, GPSI) to the AMF. The AMF may transmit a NAS MM Transport message (EAP-Success/Failure) to the wireless device. The AMF may store the EAP result for each service for which the service specific authentication and authorization procedure executed.

FIG. 27, FIG. 28 are example flow charts as part of the example embodiments. In FIG. 27, an access and mobility function (AMF) may receive subscription information indicating from a unified data management (UDM). The subscription information may indicate that the wireless device subscribes an UAS (e.g., UAV, UAS). The AMF may receive one or more first messages from a UTM/USS. The one or more first messages may indicate a flight authorization for the UAS. In response reception of the one or more first messages, the AMF may send to a base station, one or more second messages indicating an activation of an aerial communication for the wireless device. In FIG. 28, an AMF may send to a UDM, one or more first messages requesting subscription information of a wireless device. The AMF may send to an authorization server, one or more second message requesting an authorization for a service of the wireless device. The AMF may send one or more third messages indicating activation of RAN functions. The RAN functions may be related to the service of the wireless device. The sending one or more third messages may be in response to receiving the subscription information from the UDM. The sending one or more third messages may be in response to receiving one or more fourth messages indicating the authorization for the service of the wireless device. The AMF may receive the one or more fourth messages in response to sending the one or more third messages. The one or more fourth message may indicate a successful authentication and authorization for the service.

In an example, an access and mobility management function (AMF) may receive from a unified data management (UDM), subscription information indicating that a wireless device subscribes an aerial communication service. The AMF may receive from UTM/USS, one or more first messages indicating a flight authorization for the aerial communication service. The AMF may send to a base station and in response to receiving the one or more first messages, one or more second messages indicating an activation of an aerial communication for the wireless device.

In an example, the one or more first messages may comprise at least one of: an authorization (authorized) type; an authorization result; an authorization level; authorized flight paths; and/or the like. In an example, the authorization type may indicate a direct command and control communication type, a network assisted command and control communication type, or a UTM/USS navigated command and control communication type. In an example, the authorized flight paths may comprise waypoints and time stamps associated with the waypoints.

In an example, the one or more second message comprises at least one of an authorization type, an authorized flight paths, and/or the like. The wireless device may be an unmanned and/or uncrewed aerial vehicle (UAV).

In an example, the subscription information may further indicate whether an authorization for the aerial communication service is required for the wireless device. The AMF may send to the UTM/USS, one or more third messages requesting an authorization of the aerial communication service for the wireless device, wherein the sending is based on the subscription information. In an example, the reception of the one or more first messages may be in response to sending the one or more third messages.

In an example, the one or more third messages may comprise at least one of a public identifier of the wireless device, a parameter indicating a UAV capability, a UAV identifier, a UAV controller identifier, and/or the like. The public identifier of the wireless device is a generic public subscription identifier (GPSI). The public identifier is allowed to expose to outside of a cellular network. The cellular network comprises the AMF. In an example, the public identifier may be associated with a permanent identifier of the wireless device.

In an example, the AMF may receive a registration request message from a wireless device. In response to receiving the registration request message, the AMF may send one or more fourth messages to the UDM, requesting the subscription information of the wireless device. The one or more fourth messages may be a user equipment context management registration message. The one or more fourth message may comprise at least one of one or more subscription data types, one or more data keys associated with the one or more subscription data types. The one or more subscription data types may comprise at least one of, an aerial user equipment (UE) subscription data, an access and mobility subscription data, a session mobility management function (SMF) selection subscription data, a UE context in in SMF data, a small message service management subscription data, and/or the like. In an example, the one or more data keys may be subscriber permanent identifier (SUPI)s.

In an example, the registration request message may comprise at least one of an identifier of the wireless device, a capability of the UAS (UAV), slice information; or weight of the wireless device, and/or the like. The identifier may not be exposed to out of a cellular network. The identifier may comprise at least one of a subscription permanent identifier (SUPI), a subscription concealed identifier (SUCI), a fifth generation (5G) globally unique temporary identifier (GUTI), a permanent equipment identifier (PEI), and/or the like. The SUCI and the 5G-GUTI may be based on the SUPT.

In an example, the one or more second messages are an initial context setup request messages. The one or more second messages are a user equipment (UE) context modification request messages.

In an example, a base station may receive a first message comprising security information of a wireless device from an access and mobility management function (AMF). The base station may receive a second message indicating an activation of an aerial communication for the wireless device from the AMF. Based on the second message, the base station may send to the wireless device a radio resource control (RRC) message for the aerial communication. The first message may be an initial context setup request message. The second message may be a user equipment context modification request message. The second message may comprise at least one of an authorization type for the aerial communication, an authorization level for the aerial communication, an authorized flight paths for the aerial communication, and/or the like. The RRC message may an RRC reconfiguration message. The RRC message may comprise at least one of first parameters for reporting events associated with heights, a second parameter indicating a height threshold for altitudes reporting, and/or the like.

In an example, a wireless device may send to an access and mobility management function (AMF), a registration request message indicating a UAV capability. The wireless device may receive from a base station, a first radio resource configuration (RRC) message comprising parameters for the UAV. Based on the parameters, the wireless device may send to the base station, a second RRC message comprising measurement results.

In an example, an access and mobility management function (AMF) may receive from UTM/USS, one or more first messages indicating an authorization for an aerial communication of a wireless device. In response to receiving the one or more messages, the AMF may send to a base station and one or more second messages indicating an activation of an aerial communication of the wireless device.

In an example, an AMF may send to a unified data management (UDM), one or more first messages requesting subscription information of a wireless device. The AMF may send to an authorization server, one or more second messages requesting an authorization for a service of the wireless device. The AMF may send to a base station, one or more third messages indicating activation of radio access network (RAN) functions related to the service of the wireless device. The sending one or more third message may be in response to receiving from the UDM, the subscription information indicating that the wireless device is subscribed to the service. The sending one or more third message may be in response to receiving, from the authorization server, one or more fourth messages indicating the authorization for the service of the wireless device. In an example, the service may be an aerial communication service. The RAN functions may be aerial user equipment communication. The one or more third message may comprise at least one of an authorization type, authorized flight paths. The authorization server may UTM/USS server.

In this specification, a and an and similar phrases are to be interpreted as at least one and one or more. In this specification, the term may is to be interpreted as may, for example. In other words, the term may is indicative that the phrase following the term may is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often employed in combination to achieve the result of a functional module. Example embodiments of the invention may be implemented using various physical and/or virtual network elements, software defined networking, virtual network functions. The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever. While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using 5G AN. However, one skilled in the art will recognize that embodiments of the invention may also be implemented in a system comprising one or more legacy systems or LTE. The disclosed methods and systems may be implemented in wireless or wireline systems. The features of various embodiments presented in this invention may be combined. One or many features (method or system) of one embodiment may be implemented in other embodiments. A limited number of example combinations are shown to indicate to one skilled in the art the possibility of features that may be combined in various embodiments to create enhanced transmission and reception systems and methods. In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some embodiments. The purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way. Finally, the Applicant intends that only claims that include the express language means for or step for be interpreted under 35 U.S.C. 112. Claims that do not expressly include the phrase means for or step for are not to be interpreted under 35 U.S.C. 112.

The invention claimed is:

1. A method comprising:
receiving, by a base station from a wireless device, a registration request message, for an access and mobility management function (AMF), comprising:
a capability of an unmanned aerial service (UAS);
an identity of the wireless device; and
one or more single-network slice selection assistance information (S-NSSAI);
sending, by the base station to the AMF, the registration request message;
receiving, by the base station from the AMF, a first accept message, for the registration request message, indicating an authentication and authorization (AA) is pending for the UAS;
transmitting, by the base station to the wireless device, the first accept message;
receiving, by the base station from the AME, one or more messages comprising subscription information of the wireless device indicating one or more functions associated with the UAS is allowed for the wireless device;
transmitting, by the base station to the wireless device, a configuration update message, from the AMF, indicating a result of the AA is successful;
transmitting, by the base station to the wireless device, a user equipment (UE) information request message, requesting one or more flight paths of the wireless device for an aerial UE communication;
receiving, by the base station from the wireless device, a UE information response message comprising one or more waypoints, wherein each waypoint of the one or more waypoints is associated with a time stamp;
receiving, by the base station from the wireless device, a request message, for a protocol data unit (PDU) session establishment request; and
sending, by the base station to the wireless device and based on the UAS being allowed, a second accept message for the PDU session establishment request.

2. The method of claim 1, wherein the one or more functions associated with the UAS comprise height-based measurement reporting.

3. The method of claim 1, wherein the one or more functions associated with the UAS comprise interference detection for aerial communication.

4. The method of claim 1, wherein the one or more functions associated with the UAS comprise location reporting for aerial communication.

5. The method of claim 1, wherein the one or more functions associated with the UAS comprise flight path information reporting.

6. The method of claim 1, wherein the UE information response message further comprises one or more time stamps associated with the one or more waypoints.

7. A method comprising:
sending, by a wireless device to an access and mobility management function (AMF), a registration request message comprising:
a capability of an unmanned aerial service (UAS);
an identity of the wireless device; and
one or more single-network slice selection assistance information (S-NSSAI);

receiving, by the wireless device from the AMF, a first accept message, for the registration request message, indicating an authentication and authorization (AA) is pending for the UAS;

receiving, by the wireless device from the AMF, a configuration update message indicating a result of the AA is successful;

sending, by the wireless device to the AMF, a protocol data unit (PDU) session establishment request for the UAS;

receiving, by the wireless device from a base station, a user equipment (UE) information request message, requesting one or more flight paths of the wireless device for an aerial UE communication;

sending, by the wireless device to the base station, a UE information response message comprising one or more waypoints, wherein each waypoint of the one or more waypoints is associated with a time stamp; and receiving, by the wireless device from the AMF, a second accept message for the PDU session establishment request.

8. The method of claim 7, wherein at least one of:

the registration request message is sent to the AMF via the base station;

the first accept message is received from the AMF via the base station;

the configuration update message is received from the AMF via the base station;

the PDU session establishment request for the UAS is sent to the AMF via the base station; or the second accept message is received from the AMF via the base station.

9. The method of claim 7, wherein the UE information response message further comprises one or more time stamps associated with the one or more waypoints.

10. The method of claim 7, wherein the base station receives subscription information of the wireless device indicating that one or more functions associated with the UAS are allowed for the wireless device.

11. The method of claim 10, wherein the one or more functions associated with the UAS comprise height-based measurement reporting.

12. The method of claim 10, wherein the one or more functions associated with the UAS comprise location reporting for aerial communication.

13. The method of claim 10, wherein the one or more functions associated with the UAS comprise flight path information reporting.

14. A wireless device comprising:
one or more processors; and
memory storing instructions that, when executed by the one or more processors, cause the wireless device to:
   send, to an access and mobility management function (AMF), a registration request message comprising:
      a capability of an unmanned aerial service (UAS);
      an identity of the wireless device; and
      one or more single-network slice selection assistance information (S-NSSAI);
   receive, from the AMF, a first accept message, for the registration request message, indicating an authentication and authorization (AA) is pending for the UAS;
   receive, from the AMF, a configuration update message indicating a result of the AA is successful;
   send, to the AMF, a protocol data unit (PDU) session establishment request for the UAS;
   receive, from a base station, a user equipment (UE) information request message, requesting one or more flight paths of the wireless device for an aerial UE communication;
   send, to the base station, a UE information response message comprising one or more waypoints, wherein each waypoint of the one or more waypoints is associated with a time stamp; and
   receive, from the AMF, a second accept message for the PDU session establishment request.

15. The wireless device of claim 14, wherein at least one of:

the registration request message is sent to the AMF via the base station;

the first accept message is received from the AMF via the base station;

the configuration update message is received from the AMF via the base station;

the PDU session establishment request for the UAS is sent to the AMF via the base station; or the second accept message is received from the AMF via the base station.

16. The wireless device of claim 14, wherein the UE information response message further comprises one or more time stamps associated with the one or more waypoints.

17. The wireless device of claim 14, wherein the base station receives subscription information of the wireless device indicating that one or more functions associated with the UAS are allowed for the wireless device.

18. The wireless device of claim 17, wherein the one or more functions associated with the UAS comprise height-based measurement reporting.

19. The wireless device of claim 17, wherein the one or more functions associated with the UAS comprise location reporting for aerial communication.

20. The wireless device of claim 17, wherein the one or more functions associated with the UAS comprise flight path information reporting.

* * * * *